US007328453B2

(12) United States Patent
Merkle, Jr. et al.

(10) Patent No.: US 7,328,453 B2
(45) Date of Patent: Feb. 5, 2008

(54) SYSTEMS AND METHODS FOR THE PREVENTION OF UNAUTHORIZED USE AND MANIPULATION OF DIGITAL CONTENT

(75) Inventors: James A. Merkle, Jr., Rochester Hills, MI (US); Richard B. LeVine, Marstons Mills, MA (US); Andrew R. Lee, Marlborough, MA (US); Daniel G. Howard, Mashpee, MA (US); Daniel M. Goldman, North Falmouth, MA (US); Jeffrey A. Pagliarulo, West Barnstable, MA (US); John J. Hart, III, Mashpee, MA (US); Jose L. Bouza, Osterville, MA (US)

(73) Assignee: ECD Systems, Inc., Marston Mills, MA (US)

( * ) Notice: Subject to any disclaimer, the term of this patent is extended or adjusted under 35 U.S.C. 154(b) by 465 days.

(21) Appl. No.: 10/142,366

(22) Filed: May 9, 2002
(Under 37 CFR 1.47)

(65) Prior Publication Data

US 2004/0030912 A1    Feb. 12, 2004

Related U.S. Application Data

(60) Provisional application No. 60/309,650, filed on Aug. 2, 2001, provisional application No. 60/294,112, filed on May 29, 2001, provisional application No. 60/290,813, filed on May 14, 2001, provisional application No. 60/289,773, filed on May 9, 2001.

(51) Int. Cl.
*G06F 11/00* (2006.01)
*G06F 12/14* (2006.01)
(52) U.S. Cl. .............................. 726/23; 726/22; 726/24; 726/26; 713/165; 713/167; 713/188; 713/193; 711/6; 711/154; 711/163

(58) Field of Classification Search ............ 726/22–24, 726/26, 27, 32, 33; 713/188, 165, 167, 193; 711/6, 154, 163
See application file for complete search history.

(56) References Cited

U.S. PATENT DOCUMENTS 4,118,789 A    10/1978    Casto et al. ................. 364/900
(Continued)

FOREIGN PATENT DOCUMENTS

WO    WO 98/54713    3/1998
(Continued)

OTHER PUBLICATIONS

"Optical Data Copy Protection" Specification and Drawings of U.S. Appl. No. 09/608,886, filed Jun. 30, 2000, the prosecution history of which is available online at www.uspto.gov.
(Continued)

*Primary Examiner*—Kim Vu
*Assistant Examiner*—Beemnet W Dada
(74) *Attorney, Agent, or Firm*—Mills & Onello LLP

(57) ABSTRACT

A number of systems and methods, alone, or in combination, achieve various levels of protection against unauthorized modification and distribution of digital content. This encompasses at least unauthorized study, modification, monitoring, reconstruction, and any other means for subversion from the originally intended purpose and license model of the digital content. The invention combines a number of techniques that in whole, or in part, serve to protect such content from unauthorized modification, reconstructive engineering, or monitoring by third parties. This is accomplished by means of methods which protect against subversion by specific tools operating on specific platforms as well as general tools operating on general platforms. Specific time domain attacks are identified, code modification can be identified and reversed, and virtual and emulated systems are identified. In addition, identification of in-circuit emulator tools (both software and hardware), debuggers, and security threats to running programs can be achieved.

28 Claims, 22 Drawing Sheets

U.S. PATENT DOCUMENTS

| | | | |
|---|---|---|---|
| 4,278,837 A | 7/1981 | Best | 178/22.09 |
| 4,306,289 A | 12/1981 | Lumley | 364/200 |
| 4,405,829 A | 9/1983 | Rivest et al. | 178/22.1 |
| 4,433,207 A | 2/1984 | Best | 178/22.09 |
| 4,577,289 A | 3/1986 | Comerford et al. | 364/900 |
| 4,593,353 A | 6/1986 | Pickholtz | 364/200 |
| 4,688,169 A | 8/1987 | Joshi | 364/200 |
| 4,799,594 A | 1/1989 | Blackman | 206/626 |
| 4,827,508 A | 5/1989 | Shear | 380/4 |
| 4,864,494 A | 9/1989 | Kobus, Jr. | 364/200 |
| 4,864,616 A | 9/1989 | Pond et al. | 380/25 |
| 4,888,800 A | 12/1989 | Marshall et al. | 380/21 |
| 4,916,637 A | 4/1990 | Allen et al. | 364/513 |
| 4,969,189 A | 11/1990 | Ohta et al. | 380/25 |
| 4,999,806 A | 3/1991 | Chernow et al. | 364/900 |
| 5,014,234 A | 5/1991 | Edwards, Jr. | 364/900 |
| 5,021,997 A | 6/1991 | Archie et al. | 364/900 |
| 5,023,907 A | 6/1991 | Johnson et al. | 380/4 |
| 5,027,396 A | 6/1991 | Platteter et al. | 380/4 |
| 5,033,084 A | 7/1991 | Beecher | 380/4 |
| 5,050,213 A | 9/1991 | Shear | 380/25 |
| 5,081,675 A | 1/1992 | Kittirutsunetorn | 380/4 |
| 5,113,518 A | 5/1992 | Durst, Jr. et al. | 395/550 |
| 5,140,634 A | 8/1992 | Guillou et al. | 380/23 |
| 5,155,680 A | 10/1992 | Wiedemer | 364/406 |
| 5,155,837 A | 10/1992 | Liu et al. | 395/500 |
| 5,155,847 A | 10/1992 | Kirouac et al. | 395/600 |
| 5,166,886 A | 11/1992 | Molnar et al. | 364/479 |
| 5,182,770 A | 1/1993 | Medveczky et al. | 380/4 |
| 5,191,611 A | 3/1993 | Lang | 380/25 |
| 5,199,066 A | 3/1993 | Logan | 380/4 |
| 5,220,606 A | 6/1993 | Greenberg | 380/43 |
| 5,222,133 A | 6/1993 | Chou et al. | 380/4 |
| 5,247,683 A | 9/1993 | Holmes et al. | 395/700 |
| 5,276,311 A | 1/1994 | Hennige | 235/380 |
| 5,313,521 A | 5/1994 | Torii et al. | 380/21 |
| 5,325,433 A | 6/1994 | Torii et al. | 380/30 |
| 5,327,563 A | 7/1994 | Singh | 395/700 |
| 5,337,357 A | 8/1994 | Chou et al. | 380/4 |
| 5,341,429 A | 8/1994 | Stringer et al. | 380/23 |
| 5,351,293 A | 9/1994 | Michener et al. | 380/21 |
| 5,351,297 A | 9/1994 | Miyaji et al. | 380/28 |
| 5,357,573 A | 10/1994 | Walters | 380/25 |
| 5,361,359 A | 11/1994 | Tajalli et al. | 395/700 |
| 5,367,683 A | 11/1994 | Brett | 395/700 |
| 5,367,686 A | 11/1994 | Fisher et al. | 395/700 |
| 5,379,343 A | 1/1995 | Grube et al. | 380/4 |
| 5,379,433 A | 1/1995 | Yamagishi | 395/725 |
| 5,392,351 A | 2/1995 | Hasebe et al. | 380/4 |
| 5,394,469 A | 2/1995 | Nagel et al. | 380/4 |
| 5,410,598 A | 4/1995 | Shear | 380/4 |
| 5,410,703 A | 4/1995 | Nilsson et al. | 395/700 |
| 5,414,850 A | 5/1995 | Whiting | 395/700 |
| 5,421,009 A | 5/1995 | Platt | 395/600 |
| 5,421,017 A | 5/1995 | Scholz et al. | 395/700 |
| 5,473,687 A | 12/1995 | Lipscomb et al. | 380/4 |
| 5,473,690 A | 12/1995 | Grimonprez et al. | 380/24 |
| 5,473,692 A | 12/1995 | Davis | 380/25 |
| 5,490,216 A | 2/1996 | Richardson, III | 380/4 |
| 5,491,804 A | 2/1996 | Heath et al. | 395/275 |
| 5,497,423 A | 3/1996 | Miyaji | 380/30 |
| 5,502,831 A | 3/1996 | Grube et al. | 395/427 |
| 5,509,070 A | 4/1996 | Schull | 380/4 |
| 5,509,074 A | 4/1996 | Choudhury et al. | 380/23 |
| 5,511,123 A | 4/1996 | Adams | 380/29 |
| 5,524,072 A | 6/1996 | Labaton et al. | 380/24 |
| 5,532,920 A | 7/1996 | Hartrick et al. | 364/419.1 |
| 5,544,246 A | 8/1996 | Mandelbaum et al. | 380/23 |
| 5,553,143 A | 9/1996 | Ross et al. | 380/25 |
| 5,555,304 A | 9/1996 | Hasebe et al. | 380/4 |
| 5,557,346 A | 9/1996 | Lipner et al. | 380/21 |
| 5,557,675 A | 9/1996 | Schupak | 380/10 |
| 5,570,291 A | 10/1996 | Dudle et al. | 364/468.01 |
| 5,579,222 A | 11/1996 | Bains et al. | 395/712 |
| 5,579,479 A | 11/1996 | Plum | 395/188.01 |
| 5,585,585 A | 12/1996 | Paulson et al. | |
| 5,592,549 A | 1/1997 | Nagel et al. | 380/4 |
| 5,615,061 A | 3/1997 | Singh | 360/60 |
| 5,615,264 A | 3/1997 | Kazmierczak et al. | 380/4 |
| 5,625,690 A | 4/1997 | Michel et al. | 380/4 |
| 5,625,692 A | 4/1997 | Herzberg et al. | 380/21 |
| 5,638,445 A | 6/1997 | Spelman et al. | 380/21 |
| 5,654,746 A | 8/1997 | McMullan, Jr. et al. | 348/6 |
| 5,671,412 A | 9/1997 | Christiano | 395/615 |
| 5,673,315 A | 9/1997 | Wolf | 380/4 |
| 5,708,709 A | 1/1998 | Rose | 380/4 |
| 5,715,169 A | 2/1998 | Noguchi | 364/474.07 |
| 5,721,781 A | 2/1998 | Deo et al. | 380/25 |
| 5,737,416 A | 4/1998 | Cooper et al. | 380/4 |
| 5,745,879 A | 4/1998 | Wyman | 705/1 |
| 5,754,647 A | 5/1998 | Hsu | |
| 5,754,864 A | 5/1998 | Hill | 395/712 |
| 5,757,907 A | 5/1998 | Cooper et al. | 380/4 |
| 5,758,068 A | 5/1998 | Brandt et al. | 395/186 |
| 5,761,649 A | 6/1998 | Hill | 705/27 |
| 5,790,664 A | 8/1998 | Coley et al. | 380/4 |
| 5,794,230 A | 8/1998 | Horadan et al. | 707/2 |
| 5,796,824 A | 8/1998 | Haseby et al. | 380/4 |
| 5,796,952 A | 8/1998 | Davis et al. | 395/200.54 |
| 5,805,802 A | 9/1998 | Marx | 395/188.01 |
| 5,809,145 A | 9/1998 | Slik et al. | |
| 5,812,662 A | 9/1998 | Hsu et al. | 380/4 |
| 5,812,980 A | 9/1998 | Asai | 705/1 |
| 5,826,245 A | 10/1998 | Sandberg-Diment | |
| 5,835,735 A | 11/1998 | Mason et al. | 395/287 |
| 5,835,911 A | 11/1998 | Nakagawa et al. | 707/203 |
| 5,848,291 A | 12/1998 | Milne et al. | 395/806 |
| 5,883,954 A | 3/1999 | Ronning | 500/4 |
| 5,887,060 A | 3/1999 | Ronning | 380/4 |
| 5,892,900 A | 4/1999 | Ginter et al. | 395/186 |
| 5,892,904 A | 4/1999 | Atkinson et al. | 395/187.01 |
| 5,894,516 A | 4/1999 | Brandenburg | 380/4 |
| 5,903,647 A | 5/1999 | Ronning | 380/4 |
| 5,905,860 A | 5/1999 | Olsen et al. | 395/187.01 |
| 5,907,617 A | 5/1999 | Ronning | 380/4 |
| 5,909,581 A | 6/1999 | Park | 395/712 |
| 5,910,987 A | 6/1999 | Ginter et al. | 380/24 |
| 5,915,019 A | 6/1999 | Ginter et al. | 380/4 |
| 5,917,912 A | 6/1999 | Ginter et al. | 380/24 |
| 5,920,861 A | 7/1999 | Hall et al. | 707/9 |
| 5,930,828 A | 7/1999 | Jensen et al. | |
| 5,933,497 A | 8/1999 | Beetcher et al. | 380/4 |
| 5,933,498 A | 8/1999 | Schneck et al. | 380/4 |
| 5,940,504 A | 8/1999 | Griswold | 380/4 |
| 5,943,422 A | 8/1999 | Van Wie et al. | 380/9 |
| 5,949,876 A | 9/1999 | Ginter et al. | 380/4 |
| 5,953,502 A | 9/1999 | Helbig, Sr. | 395/186 |
| 5,978,482 A | 11/1999 | Dwork et al. | 380/21 |
| 5,982,891 A | 11/1999 | Ginter et al. | 380/4 |
| 5,991,399 A | 11/1999 | Graunke et al. | 380/4 |
| 5,991,876 A | 11/1999 | Johnson et al. | 713/200 |
| 6,006,190 A | 12/1999 | Baena-Arnaiz et al. | 705/1 |
| 6,006,328 A | 12/1999 | Drake | 713/200 |
| 6,006,332 A | 12/1999 | Rabne et al. | 713/201 |
| 6,009,274 A | 12/1999 | Fletcher et al. | 395/712 |
| 6,009,401 A | 12/1999 | Horstmann | 705/1 |
| 6,012,144 A | 1/2000 | Pickett | |
| 6,038,316 A | 3/2000 | Dwork et al. | 380/25 |
| 6,041,411 A | 3/2000 | Wyatt | 713/200 |
| 6,052,780 A | 4/2000 | Glover | 713/193 |
| 6,067,416 A | 5/2000 | Fraser | 395/712 |
| 6,073,124 A | 6/2000 | Krishnan et al. | 705/59 |
| 6,081,794 A | 6/2000 | Saito et al. | |
| 6,112,181 A | 8/2000 | Shear et al. | 705/1 |

| | | | | | | |
|---|---|---|---|---|---|---|
| 6,138,119 | A | 10/2000 | Hall et al. .................. 707/9 | 2001/0018745 A1* | 8/2001 | Laczko et al. ............ 713/200 |
| 6,148,402 | A | 11/2000 | Campbell ................ 713/200 | 2001/0034846 A1 | 10/2001 | Beery ..................... 713/201 |
| 6,151,618 | A | 11/2000 | Wahbe et al. ................ 709/1 | 2001/0037450 A1 | 11/2001 | Metliski et al. ........... 713/152 |
| 6,157,721 | A | 12/2000 | Shear et al. ............. 380/255 | 2001/0037456 A1 | 11/2001 | Levy ..................... 713/176 |
| 6,164,841 | A | 12/2000 | Mattson, Jr. et al. ... 395/500.02 | 2001/0041989 A1 | 11/2001 | Vilcauskas, Jr. et al. ..... 705/1 |
| 6,178,509 | B1 | 1/2001 | Nardone et al. ........... 713/200 | 2001/0044782 A1 | 11/2001 | Hughes et al. .............. 705/59 |
| 6,185,683 | B1 | 2/2001 | Ginter et al. ............. 713/176 | 2002/0001690 A1 | 1/2002 | Selinfreund et al. |
| 6,185,686 | B1 | 2/2001 | Glover ................... 713/190 | 2002/0002468 A1 | 1/2002 | Spagna et al. .............. 705/1 |
| 6,188,995 | B1 | 2/2001 | Garst et al. .................. 705/59 | 2002/0003881 A1 | 1/2002 | Reitmeier |
| 6,192,475 | B1 | 2/2001 | Wallace .................. 713/190 | 2002/0010863 A1 | 1/2002 | Mankefors ............... 713/189 |
| 6,223,288 | B1 | 4/2001 | Byrne | 2002/0016918 A1 | 2/2002 | Tucker et al. ............. 713/190 |
| 6,226,618 | B1 | 5/2001 | Downs et al. | 2002/0035688 A1 | 3/2002 | Kutaragi et al. ........... 713/168 |
| 6,226,747 | B1 | 5/2001 | Larsson et al. ........... 713/200 | 2002/0120871 A1* | 8/2002 | Watkins et al. ........... 713/201 |
| 6,233,567 | B1 | 5/2001 | Cohen .................... 705/59 | 2002/0146121 A1 | 10/2002 | Cohen |
| 6,236,727 | B1 | 5/2001 | Ciacelli et al. | 2003/0147339 A1 | 8/2003 | Selinfreund et al. |
| 6,243,468 | B1 | 6/2001 | Pearce et al. ............. 380/255 | 2005/0050343 A1 | 3/2005 | Selinfreund et al. |
| 6,243,692 | B1 | 6/2001 | Floyd et al. ................ 705/59 | 2005/0063256 A1 | 3/2005 | Selinfreund et al. |
| 6,249,870 | B1 | 6/2001 | Kobayashi et al. | 2005/0083829 A1 | 4/2005 | Selinfreund et al. |
| 6,272,636 | B1 | 8/2001 | Neville et al. ............ 713/189 | 2005/0084645 A1 | 4/2005 | Selinfreund et al. |
| 6,286,041 | B1 | 9/2001 | Collins, III et al. ........ 709/221 | 2005/0153109 A1 | 7/2005 | Drew et al. |
| 6,289,455 | B1 | 9/2001 | Kocher et al. ............ 713/194 | 2005/0268338 A1* | 12/2005 | van der Made ............ 726/24 |
| 6,295,613 | B1 | 9/2001 | Bates et al. ................. 714/43 | 2006/0023600 A1 | 2/2006 | Selinfreund et al. |
| 6,327,652 | B1 | 12/2001 | England et al. ............... 713/2 | 2006/0031686 A1 | 2/2006 | Atallah et al. |
| 6,330,670 | B1 | 12/2001 | England et al. ............... 713/2 | 2006/0107070 A1 | 5/2006 | Rice et al. |
| 6,334,189 | B1 | 12/2001 | Granger et al. ........... 713/200 | | | |
| 6,343,280 | B2 | 1/2002 | Clark .................... 705/55 | | | |
| 6,351,813 | B1 | 2/2002 | Mooney et al. | | | |

FOREIGN PATENT DOCUMENTS

| | | |
|---|---|---|
| WO | WO 98/44402 | 8/1998 |
| WO | WO/9844402 | 10/1998 |
| WO | WO9854713 | 12/1998 |
| WO | WO 01/17163 | 3/2001 |
| WO | WO0117163 | 3/2001 |
| WO | WO 0202301 | 1/2002 |
| WO | WO 0203106 | 1/2002 |
| WO | WO 0203386 | 1/2002 |

| | | | |
|---|---|---|---|
| 6,460,023 | B1 | 10/2002 | Bean et al. |
| 6,501,905 | B1 | 12/2002 | Kimura |
| 6,589,626 | B2 | 7/2003 | Selinfreund et al. |
| 6,611,812 | B2 | 8/2003 | Hurtado et al. |
| 6,638,593 | B2 | 10/2003 | Selinfreund et al. |
| 6,744,905 | B1 | 6/2004 | Horiike |
| 6,816,972 | B1* | 11/2004 | Kutaragi et al. ........... 726/26 |
| 6,838,145 | B2 | 1/2005 | Drew et al. |
| 6,859,535 | B1 | 2/2005 | Tatebayashi et al. |
| 6,931,540 | B1* | 8/2005 | Edwards et al. ........... 713/188 |
| 6,947,973 | B2 | 9/2005 | Shimura et al. |
| 6,957,341 | B2 | 10/2005 | Rice et al. |
| 6,973,578 | B1* | 12/2005 | McIchionc ............... 713/188 |
| 6,981,140 | B1 | 12/2005 | Choo |
| 6,981,279 | B1* | 12/2005 | Arnold et al. ............... 726/22 |
| 7,010,697 | B2 | 3/2006 | Byrne et al. |
| 7,069,491 | B2 | 6/2006 | Sollish et al. |
| 7,124,114 | B1 | 10/2006 | Hollar |
| 7,150,045 | B2* | 12/2006 | Koelle et al. .............. 726/26 |
| 7,178,166 | B1* | 2/2007 | Taylor et al. ............... 726/25 |

OTHER PUBLICATIONS

"Method and Apparatus of Controlling Access to Storage Media" Specification and Drawings of U.S. Appl. No. 09/631,505, filed Aug. 3, 2000, the prosecution history of which is available online at www.uspto.gov.

Schneier, "Applied Cryptography", 1996, John Wiley & Sons, Inc. 2nd Edition., pp. 176-177.

Andrew S. Tanenbaum: "Systemas Operativos Modernos", Premtice Hall 1993, pp. 93-97. Mexico.

* cited by examiner

SYSTEMS AND METHODS FOR THE PREVENTION OF UNAUTHORIZED USE AND MANIPULATION OF DIGITAL CONTENT

RELATED APPLICATIONS

This application claims the benefit of U.S. Provisional Application No. 60/289,773, filed May 9, 2001, U.S. Provisional Application No. 60/290,813, filed May 14, 2001, U.S. Provisional Application No. 60/294,112 filed May 29, 2001, and U.S. Provisional Application No. 60/309,650, filed Aug. 2, 2001.

BACKGROUND OF THE INVENTION

1. Field of the Invention

This invention is related to the protection of digital information in various forms from unauthorized distribution, use or modification. The protective systems and methods described herein are intended to detect or prevent successful deployment and utilization of many of the tools and techniques of such unauthorized use when applied to executable content, or other digital content, on a computing device.

2. Description of the Related Art

The digital content industry has been aware for some time of the problem of unauthorized use and distribution of digital content and unauthorized subversion of control mechanisms designed to control the distribution of such content. Such control mechanisms take the form of protective systems that control the installation or usage of such content. The control mechanisms may authenticate locally and/or remotely, and may refuse to allow the usage of unauthorized copies and/or report such usage. Such subversions can include modification of licensing control logic (i.e. making a copy work) or the complete stripping and modification of digital content to remove all licensing and protective logic from it.

Before subversion becomes possible, the protective system for the digital content is disabled. This form of attack usually begins by using tools that provide an understanding of the protective system, and from that understanding, successful alterations and subversions of system functions become possible. The problem is exacerbated by the fact that many of the more significant tools used for subversion are powerful and legitimate tools commonly used in the software and hardware development industry; for example In Circuit Emulation (ICE) tools, debugger tools, and disassembly tools. Such tools are legal to own, easy to obtain, and continue to become more advanced and effective. Examples of these widely known and deployed tools include SoftIce, available from NuMega, any of the debuggers available from Microsoft or Borland, the powerful protection-removal tool ProcDump, a shareware tool available free by download on the Internet, and many others.

A number of mechanisms are currently available that may be used to limit or prevent the execution of certain tools, such as debuggers and ICE tools. The primary method of detection of a subversion tool is usually tool-specific, where overt aspects of a specific version of a specific tool are known (filenames, in-memory file signatures, execution-time strings in system data structures) and actively sought.

The most popular among methods that use techniques such as those described above are only marginally effective today. In one example, a popular implementation of a protective system searches for the NuMega SoftIce tool by such overt means. There exists a specially crafted stealth-layer known as "Frogs Ice" that is created solely to hide SoftIce. When this popular protective implementation is debugged with SoftIce when hidden by Frogs Ice, the protective system fails to see the threat and is subverted.

Conventional implementations of some significance that protect digital content using other approaches include methods that obfuscate the operation of a system and related data payload. This is usually accomplished by means of sophisticated encryption and/or information hiding schemes, some involving client-server models. These approaches are usually quite strong in the areas of encryption and hiding, but may be compromised by the skilled memory lifting of the information after it has been found and decrypted during the legitimate-use operation of the protected component. Information is most vulnerable when it has been made ready for normal usage because it is much more complete and immediately usable in that form.

Despite such developments, no current mechanism of this type has proven to be entirely effective. The reasons for this are apparent; while encryption is an important part of any protective system, it should not represent the sole, or primary, method of protection, since encrypted content must at some time be decrypted for use, and may, for example, be subject to piracy following decryption. Such methods, when used as the sole protective means, are vulnerable to approaches that analyze and then modify the mechanism, and over time, with some persistence, can be broken. Any changes to the algorithm (cracking the decryptor for example) or attacks directly on the encrypted payload (using a computer system to crack the encryption), although theoretically effective, are not the attack of choice when a payload is of interest to an intruder; these approaches are much more challenging and take much more time than simply stealing the data after it has been decrypted by the protective system during normal use. The common denominator of successful attacks against such protective mechanisms come in the form of tools that attack this weakest link in the chain, as in the "ProcDump" memory-lifting tool, or other memory lifters or memory dumpers. This class of web-distributed enhanced dumping tools have a great many features which include the ability to steal-after-decryption any 32 bit executable on any Windows-based operating system, to restore the Import table and PE header, reoptimize lifted executable, and even establish a client-server relationship with a second dumping tool which is awaiting the (specifically timed) opportunity to lift a target executable. These functions require some degree of sophistication to understand and use but enable a somewhat experienced intruder to steal almost any such protected payload at the moment of authorized usage of the payload. Tools such as memory lifters or memory dumpers are an example of the kinds of attack mechanisms that have rendered most content protection schemes for digital content, especially executable content, much less effective. This is true especially since 1998, when these tools and associated reverse-engineering techniques became widely disseminated on the World Wide Web.

In view of the fact that digital piracy is a widespread problem, and one that has been around since the ability to copy or record digital information has been provided to consumers, there are a large number of historic countermeasures of varying degrees of effectiveness. Each generation of these solutions has a causal effect on the creation of reverse engineering tools and techniques to counter it. In most cases these anti-piracy methods have been subverted, or easily compromised when desired, by such opponent "hackers" tools and techniques. Over the years, the tools and techniques of such attacks have improved to the point where much of contemporary anti-modification technology can be bypassed by determined intruders within hours, or at most, days. Any number of public domain references to these reverse engineering tools and techniques, even entire groups of people dedicated to the task of reverse engineering and defeating protective inventions such as those described herein, may be found on the World Wide Web simply by typing such phrases as "reverse engineer" or "disassemble executable" into any search engine.

SUMMARY OF THE INVENTION

The present invention is directed to systems and methods for the protection of digital content that overcome the limitations of the conventional approaches. The systems and methods of the present invention encompass a number of approaches, which, alone, or in combination, achieve various levels of protection against unauthorized modification and distribution of digital content. This encompasses at least unauthorized study, modification, monitoring, reconstruction, and any other means for subversion from the originally intended purpose and license model of the digital content.

This system combines a number of techniques that in whole, or in part, serve to protect such content from unauthorized modification, reconstructive engineering, or monitoring by third parties. This is accomplished by means of methods which protect against subversion by specific tools operating on specific platforms as well as general tools operating on general platforms. Specific time domain attacks are identified, code modification can be identified and reversed, and virtual and emulated systems are identified. In addition, identification of in-circuit emulator tools (both software and hardware), debuggers, and security threats to running programs can be achieved.

As described above, subversive In Circuit Emulator and debugger tools allow an intruder to interactively observe a system, in some cases by emulating the system and observing the execution from the perspective of a hardware system the code is executing on, and also provide the power to penetrate the operation of the system and modify it during operation. These are significant threats to security programs because they can allow an intruder to render the security system ineffective. The protection systems and methods of the present invention respond to intruders or threats by taking action in any of a number of ways. The preferred action in many cases is to respond by exiting from operation in an irrevocable immediate, or non-deterministic deferred, fashion, at any time. This is based on the principal that an exit may leave the intruder confused and unsure of the cause of the exit, which may cause an intruder to give up over time. An overtly aggressive response, such as killing the intruder's tools, can also be deployed.

In one aspect of the present invention, the presence of in-circuit emulators, virtual machines, or other emulation systems are detected, for example, by means of analysis of the operating environment. This includes, but is not limited to, enumeration and detailed study of devices and system bus and component information. This may, for example, include PCI bus and device "walking", where each device in turn is discovered and analyzed. This approach includes, but is not limited to, such techniques as analyzing the configuration BIOS memory of the emulated PCI cards of such a system. Certain in-memory information is provided to the host computer by each device attached to the system bus during system startup. This information is stored within the device, in an area of memory sometimes referred to as "BIOS" or "BIOS ROM". Within these areas of memory are fields denoting the type of device, some number of device attributes, and manufacturer's identifying information for the device. The emulated or virtual devices that populate the target emulated or virtual environments usually present some of these items correctly, but often omit some, or present inappropriate or unreasonable information in such fields, which can be determined to be false upon analysis and comparison with both stored known data and actual system performance or behavior.

In another aspect of the present invention, a system exists that obscures and obfuscates the flow of certain critical data items between entities (whether process, thread, task, or device driver), and by means of this data transmission, provides an additional, and equally important, function of detection and notification of system tampering, monitoring, modification or subversion. A deferred or immediate response to such detection can be initiated. This aspect of the invention comprises components including, but not limited to, a constant data flow message passing process in which the data is passed from entity to entity in a predetermined, or dynamically arrived at, secure ordering. This can be accomplished regardless of point of origin or intended recipient, with the messages encrypted and securely time stamped, passed between each and every such authorized and designated entity of a given system, with a known periodicity, such that late arrival of the message, missing messages, out of sequence messages, or forged or improperly encrypted messages, all indicate that a subversion may be in process. In response the system may be disabled with respect to the transmission of further messages, or may otherwise be labeled by an entity elsewhere in the entity chain that the system has been compromised. The response to a detected intrusion can be passive or active, implicit or explicit.

In another aspect of the present invention, a secure time stamp and comparison process is created and used to detect by analysis of time domain effects, evidence of system tampering, monitoring, modification and subversion. This aspect, may, for example, utilize timers and timing services which are always present on certain systems (for example Intel-processor-compatible systems), and cannot be subverted by manipulation of trivially settable time values such as the system clock. An immutable, non-arbitrarily settable, aspect of one such hardware feature is, for example, used as the cornerstone of the measuring process.

In another aspect of the present invention, a system and method for secure data flow through a system are provided. This aspect is based on the principal that since the flow of communication and data cannot be hidden, they should instead be passed openly, but in a way that the flow is not made evident. Therefore, this aspect utilizes a constant data flow, a data transfer method by which the data is passed in the same manner between all recipients, in the same order regardless of origin or intended recipient so that data flow parameters such as content, origin, and destination have no bearing on the flow. In this manner, no external analysis of the data flow will result in an understanding of system behavior, as all messages of any kind are always passed between all members of the message-passing network.

In another aspect of the present invention, a system and method are provided to reverse modification of any such protected content. Reversal of modification can be done repeatedly, with a frequency and redundancy that greatly increases the difficulty of imparting effective modification to the content. In an alternative embodiment, intentionally corrupted content can be reverse-modified just in time for execution, on a non-page basis, then re-corrupted following execution. In this manner, this approach can defeat memory lifting by having any amount of memory content, up to entire pages or sections of memory, in some cases pre-processed and corrupted in advance of execution, and then upon execution, each such memory location or group of locations may be corrected just-in-time for the executing process to use them, but when accessed by any other process in the system they are left uncorrected, so that in the event of a memory-lift or other unauthorized access, the pages are simply not corrected. Through this passive approach (i.e., doing nothing in the event of unauthorized access) the memory lift is rendered ineffective.

In another aspect of the present invention, a system and method detect the modification of any such protected content. In one example, modification of certain protected elements in digital content is detected and a response is initiated. The response may take any of a number of different forms, including, but not limited to, initiation of a system exit event, and/or other responses.

In another aspect of the present invention, access to input devices such as the mouse and keyboard is controlled. Such access is locked out at will, on multiple levels, including at the operating system level, at the device level, or at the application level. For example the mouse and keyboard can be permitted to interact only with desired secure windows on the desktop, and, even then, certain keying or mouse activity can be prevented.

In another aspect of the present invention, direct action is taken to halt or disable the discovered execution of unauthorized programs by actions that include, but are not limited to, directly killing the program, disabling input and output capabilities, disabling or hindering display capabilities, or otherwise interfering with normal usage. The discovery process includes, but is not limited to, enumeration of running tasks and processes via standard operating system interfaces and privileged interfaces and tools.

In another aspect of the present invention, the in-memory fingerprints of known "adversarial" system debug and analysis tools are known, and are, for example, stored in encrypted form in system memory, such that they may not be recognized by outside entities. In this aspect, a process is activated that has access to all system memory, and that continuously searches through that memory for any such fingerprints. The search process and associated comparisons can be, for example, performed in an encrypted environment such that the target strings are encrypted and a special encrypted-comparison routine is used so that the desired match is less likely to be visible to an outside process.

In another aspect of the present invention, the in-memory effects of virtual machine, emulator, and debugging tools are detected. Such detection is accomplished through the analysis and study of the partitioning of the system's physical memory as dictated by the operating system. It is made possible by examining the lowest level of system memory, below any tools or instrumented operating system constructs that may be in place. Low level assembly language commands such as those that are always present on Intel-processor-based systems are employed, for example the EAX command. These assembly language commands and other programming techniques used in this fashion are not restricted in the timing of their use, whether initiated early or late in the running history of the machine. They may be initiated at boot up, during normal operation, or at any time.

In another aspect of the present invention, large amounts of obfuscating saturation traffic are generated, which can be used to overwhelm the usefulness of debugger, or logging, monitor and journaling tools. This service is adjustable to the needs of the system and can vary the intensity of such traffic across desired interfaces on demand.

In another aspect of the present invention, enhanced hardening in the generation of highly secure executable content for high security applications and environments is provided. This is accomplished by various types of modifications to executable code, performed in environments including but not limited to the compilation environment, and also as a post process to existing executable code as needed. In one example, certain elements of the code can be processed and replaced with synonymous code (that performs the same function as the original) and said code synonym is selected, or designed, to have as a secondary attribute, a negative effect on the process of disassembly (it may be inherently difficult to disassemble) or may have other attributes that make it difficult to debug. For example, it may be intentionally confusing in its design, may obfuscate data flow or program flow, or may defy casual observational debugging.

In another aspect of the present invention, security oriented detection of software emulation and virtualized-machinery-based system environments and their associated emulated system hardware features is achieved. This is accomplished by the creation of sections of self-modifying code that induce system memory access timing and execution performance anomalies which can be detected and contrasted with the expected performance of such systems. Any code that attempts to do so under this architecture will be at a tremendous and measurable speed disadvantage. This aspect includes, but is not limited to, a security-oriented detection of hardware-based in-circuit emulators and hardware-CPU-based hybrid in-circuit emulators. This is accomplished by time domain analysis of performance anomalies which can be detected and contrasted with the expected performance of such systems. Systems that are not burdened by subversive instruments are capable of, for example, processing rates on the order of billions of instructions per second; however, memory access is orders of magnitude slower. However, in the In Circuit Emulator scenario, when being journaled, these differences are not as extreme and the performance of the processor and memory will be measurably closer to each other. In this manner, such subversive tools are detected by their performance effect on the system, providing an additional level of detection.

In another aspect of the present invention, digital content is security-married to a unique computer system signature such that it may only be used and/or run on that system thereafter. This aspect includes, but is not limited to, performing an analysis of the purported physical characteristics of the machine. Multiple encryption-component entities can be utilized; each such component being responsible for a physical aspect or attribute of the delivery platform to be authenticated against. Any physical (non-virtual) system device that has any unique attributes may be used, and all such devices are first authenticated to be actual, non-virtual devices (for example using techniques described elsewhere in this specification) before being considered for such use. Each component arrives at an encrypted value representing the state and identity of its target hardware device and encrypts that value in order to then send it to other components of the system. These assorted device signatures are accumulated during this process and merged algorithmically into a single value which represents the summation of all such devices. Some or all of these values, or the final merged aggregate value, may be used to generate encryption or decryption keys to secure content to a particular system, or may be used to form part or all of a secure identifier used to authenticate content on the specific system, such as being passed as part of a network handshaking protocol which authenticates the system and executing content.

In another aspect of the present invention, it is ensured that encrypted content, once decrypted, cannot be "lifted" or "dumped" in a trivial manner from system memory with successful results. Content is modified by a process, to make certain data elements, usually on the boundary of the system page size and location in multiples of page size, "incorrect" (corrupted) or "correct" (usable as intended) depending on their prior state. Memory on such a system may be thought of as being organized into pages or groups of memory bytes, where for example a byte is 8 bits, bytes may be grouped into groups of 1024 bytes (k-bytes) and these k-bytes may be grouped into pages of 512 k-bytes. The operating system may choose to move data into and out of memory (from the hard disc or other media to memory, then back to the hard disc at times) in units of one or more pages at a time for efficiency. This aspect includes, but is not limited to, two complementary approaches; one in which pages (for example a grouping of memory bytes, 512 units of 1024 bytes each, otherwise referred to as 512K) are made correct just-in-time for licensed usage, or another where pages are made incorrect just-in-time when being lifted or dumped, to deter unlicensed usage. In all cases, the original content stored on the original media, or on hard disc, when not in use, may be wholly or partly correct in nature, and may be wholly or partly encrypted. In an example, given a program foo.exe, the program may be preprocessed such that it is divided up into N segments of 512K each, and the $3^{rd}$ and $34^{th}$ of these pages may be copied to another location, and the original pages overwritten with junk data. The foo.exe program is then packaged and sold to a consumer on CD, with the now-modified foo.exe and the $3^{rd}$ and $34^{th}$ pages hidden in an archive on the same CD. When foo.exe is run, the process and system of the present invention note access to the $3^{rd}$ page and, before it is needed, replaces the page in memory with the correct $3^{rd}$ page taken from the archive where it was previously stored. When the page is no longer needed, it is then modified back to the original state it was in on the distribution CD. When the $34^{th}$ page is needed, it too is corrected just in time, and it is then copied back to the damaged state it was in on the distribution CD. In this manner, there is no time at which the program foo.exe is ever in a state where all pages in memory are entirely correct, such that if the program were memory lifted or dumped at least one or more pages are in an incorrect state.

In another aspect of the present invention, there is provided a cooperative function between at least two interoperating systems, for example a secure installer that binds or marries the content to an authorized machine or machines, the protective features of which include, but are not limited to, the protective features described elsewhere in this specification. This aspect of the invention also includes a cooperating network service entity that tracks the number of authorized installations, for example on a per-product and/or per-user and/or per-machine basis. In this manner, this aspect of the present invention allows for the binding of an instance of a product to an instance of a machine, securely, and also allows for the tracking of a total number of such instances, so that in a corporate setting for example, a vendor could track the installations of their product and account for licensing fees based on the number of installed instances.

In another aspect of the present invention, an interface layer provides device specific, device class specific and device bus specific access through a generalized mechanism, which may also serve as a proxy mechanism between levels of operating system interface and function access and authorization. Non-device-aware-access is thus provided to specific device features and commands that would otherwise be inaccessible to all except device driver levels of privilege and interface access. This therefore allows for the authors of application programs to have access to lower level device features which would otherwise be hidden from them by the device drivers themselves. For example, if an attempt is made to read from a drive, the low level driver may retry any number of times until success, without the operator's request or even knowledge. However, it is possible to formulate a command wherein only a single attempt is made for a read operation, or wherein a read succeeds despite the presence of warnings or errors that might otherwise invoke a retry. Typically only a skilled device driver engineer would know of these features or how to use them. This aspect of the invention exports these powerful features to a level of high abstraction so that they may be used both by the other approaches described herein, or as a standalone utility so that any program may employ them.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention

DETAILED DESCRIPTION OF PREFERRED EMBODIMENTS

Figure 1:
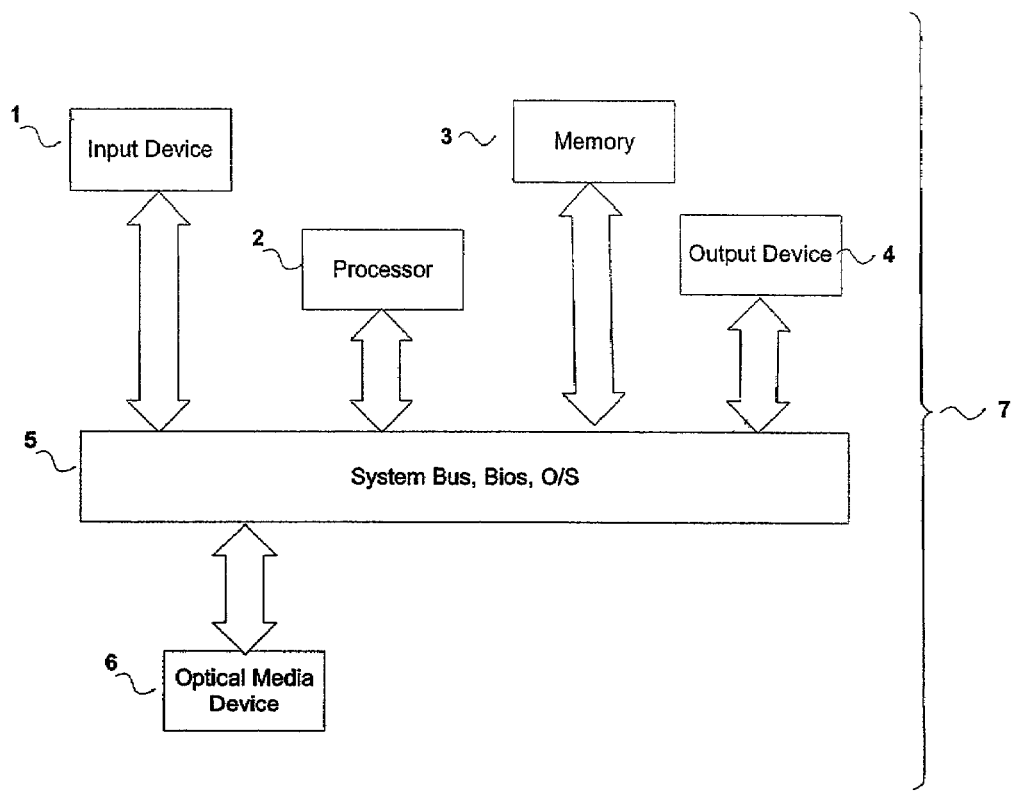
FIG. 1 is a block diagram of a computer system or consumer-computerized appliance, in accordance with the present invention.

The systems and methods of the present invention and various embodiments thereof may be implemented on any of a number of media reading device platforms, including, for example, a personal computer or general purpose digital computer 7 as shown in FIG. 1, including, but not limited to, single- or multiple-processor-based Windows™, Linux™ or Macintosh™ desktop computers such as those found with increasing frequency in contemporary homes and offices. Embodiments of the invention may optionally be implemented on firmware or a digital processing circuit, including, but not limited to, those found in CD and DVD consumer audio/video appliance components or systems, game consoles and other appliance devices, in stationary and mobile applications. Embodiments of the invention may alternatively be deployed on other computing appliance devices such as hard-disk or random access memory based video and audio entertainment appliances.

As shown in FIG. 1, a computer system consists of one or more input devices 1 that allow an operator, or user, to direct certain tasks and provide data. The computer transfers these inputs and data between components by means of a variety of system bus connectivity paths 5 and consumes or analyzes them by means of computer instructions executing on the processor 2 or processors. These processors 2 make use of system memory 3 (both volatile and nonvolatile random access memory and magnetic disc-based memory storage formats), and may also read or write data to a variety of external devices such as optical media devices 6. These devices and others comprise a typical computer system 7 and or entertainment appliance. Content that is used on such devices typically has a value and as such is sold in accordance with the content creator's licensing model. Consumers may attempt to subvert such licensing enforcement by duplicating the content using media devices 6, or by modifying the content or its protective mechanisms by using input devices 1, instruction modifications executed on the processor 2, instruction modifications or instruction duplication from memory 3, or observation of system behavior via output devices 4 such as cathode ray tube or liquid crystal displays. The systems and methods of the present invention protect content from unauthorized manipulation or observation by means of these computer components, and can be effective at defeating unauthorized access thereof.

Figure 2:
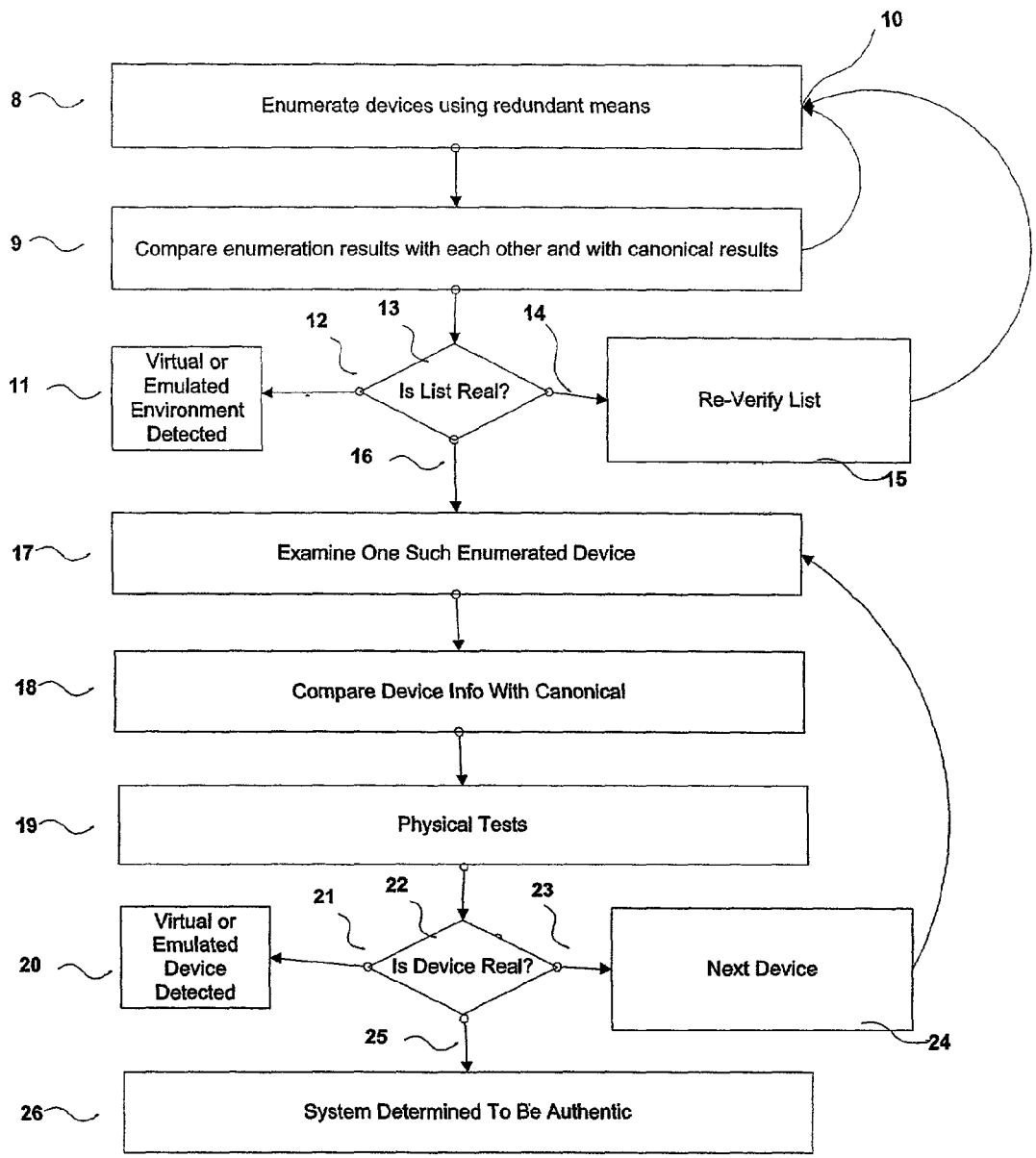
FIG. 2 is a flow diagram illustrating the operation of a system and method that detect the presence of security threats, such as virtual and emulated system components and entire systems, in accordance with the present invention.

FIG. 2 is a flow diagram of a system and method that detect the presence of possible 30 system security threats, such as emulated, virtual, and in-circuit-emulation (ICE) systems. Products such as Connectix Virtual PC fall in the virtual machine category, for example, and products such as NuMega SoftIce fall in the in-circuit-emulator category. An ICE, virtual machine, or system emulator will typically incorporate a population of virtual or emulated PCI devices. These include virtual or emulated sound and video cards, typically lowest-common-denominator devices such as a "generic sound blaster compatible sound card" or "generic VGA video card 640×480×16" but may also have emulations of name brand devices of various vintages such as "ATI RAGE V2.0 PCI Video Card 16MB" or "Ensoniq 24 Bit Sound Card with Digital I/O". This includes but is not limited to a mechanism that verifies that such apparent system devices are in fact real physical non-virtual devices, of the exact manufacture and model and version information as they purport to be. The operation of this aspect of the present invention therefore provides conclusive evidence to the system that the system environment itself is an authentic non-virtual environment, as purported, rather than an emulated system that may be used to subvert the digital content.

As a first step, the process attempts to ascertain the identities and configuration information relevant to each device attached to or within the system. It does so by enumerating the devices 8 by means of operating system services and device registration information stored by the computing device's operating system in various forms and locations. Each such enumerated device is selected and is queried for configuration information, and the stored configuration information about the device maintained by the operating system is also considered as the device's apparent characteristics are compared 9 to known, or canonical, emulated device characteristics and to the results of the redundant device query. Using this preliminary screening of information for each device gathered by means of this system-wide survey 8,9 a decision is made 13 as to whether the device is an obviously emulated device 12, a device which is suspicious but may be real 16 or a device whose configuration information was incomplete or garbled 15. In this latter case 15 the device or list of devices are re-enumerated 8 and re-queried 9 to provide the system with another opportunity to prove or disprove definitively 12, 16 that the device is, or is not, virtual. If the device is deemed to be a definitive virtual or emulated device 12 it triggers a defensive response case 11, which may consist of an exit response, or any number of subtle (for example memory corruption) or direct responses (for example an immediate or deferred exit, or a process kill, or a input or output device manipulation) which are discussed elsewhere in this specification.

In the case in which the device is suspicious, but may in fact be a real device 16, the device is tested further to determine whether it is in fact real. Closer examination of the device is initiated 17, and the device is called upon to report its status, firmware version if any, and memory configuration if any, and these values are compared with known canonical real values for such devices 18. Certain physical tests 19 are initiated. These tests 19 may include, but are not limited to, the attempted loading or execution of certain elements of canonical or common device drivers iteratively (where it is known that only the real device can possibly support a load and execution of an actual device-specific driver in properly, or execute a broad range of device specific commands properly, and that a failure of device X to load the current driver for device X, or to execute commands that would normally succeed on a real device X is deemed to indicate a flawed virtual or emulated device and or system) for that class of device, as well as performance and time-domain related tests discussed in more detail below with reference to FIG. 14. Such tests 19 may also include the execution of obscure or seldom-used device commands or settings, as emulated or virtual devices rarely implement every aspect of a device fully or properly.

The results of the canonical device comparison, physical and device driver loading tests, command and parameter setting tests, and performance test (FIG. 14) are used to determine 22 whether the device is virtual 21, in which case a defensive response is triggered 20 as above in step 11, or whether the device is determined to be a real device 23, in which case the next such enumerable or discoverable device is considered 24, until no further devices remain to be examined 25. If each such device has been determined to be real and no such device is found to be an emulated or virtual device 25 the system is determined to be free of the threat of virtual or emulated devices and is therefore deemed authentic 26.

An example of the system and process described in FIG. 2 is discussed below in numbered list form to illustrate the principals of the mechanisms that, as described above, enumerate the devices and validate device information. In this example, components of the system's hardware PCI bus are being enumerated and examined:

1. Locate each bus component one at a time by scanning all possible memory locations that may contain PCI bus device information.
2. Do the scan by examining system memory, for example, by setting a local sector of memory equal to the contents of a selected area of system memory and then examining the contents of the local copy.
3. Ensure the memory just copied seems to contain a valid PCI bus data structure. If not, and if the number of memory locations examined thus far do not put the next scan outside the range of possible locations, then repeat step 2 above.
4. Search within this local copy of the sector of system memory for (parts of, or entire) data structures that match the known format and contents of a valid PCI bus data structure. Note if this is the last such structure for future reference.
5. Read the local copy of this now-known-to-be-a PCI device's memory and use the information there to then query the actual PCI Configuration ROM of the actual device. In many cases this will be accessible by means of a pointer found in this structure, or may have been copied to this structure in whole or in part during boot up.
6. Compare the values in this ROM to known canonical values for known devices, identifying hardware vendor, model and part number information, version information and various device attributes such as memory, memory speed, firmware version and features, etc.
7. Note any obviously fake or spoof PCI devices or configuration ROMs on PCI devices that just don't seem to be correct based on comparison with canonical devices:

The exemplary functional steps as discussed below illustrate the principal of using such PCI ROM configuration information to determine in a more specific sense whether a device is virtual or emulated, or is in fact real. It may be considered a more detailed explanation of the steps 6 and 7 from the list above in which devices physical attributes are not only compared to absolute canonical information, they are also intelligently compared to known device qualities (like memory latency) and if the values are simply impossible or unlikely for a real device, because of their range or implied performance deficit or performance advantage of a real world device, they are treated as a warning sign that the device is emulated. In this sub-example of device examination invention, the Configuration ROM's recorded value for device memory latency is used:

i. Examine PCI Device Configuration ROM for memory latency values for device memory
   ii. If, for example, device memory latency is different than any canonical device of this type and or vendor, and there otherwise is a match of device and vendor, it is declared to be a virtual or emulated device. This is an advantageous technique for determining the validity of a PCI card, because even though it is possible for emulated devices to report exact values for all parameters, they often do not because they must report truthfully in order to operate properly. Another example is, for instance, assuming the device were an emulated video card, the performance of which, if actual hardware, would be capable of supporting 1600×1200 resolution, and is only capable of running 800×600 as an emulated device, it would be unwise to report 1600×1200 because the system may try to invoke that mode and would cause a catastrophic failure.

iii. And if memory latency is orders of magnitude slower than any canonical device known iv. Then, the device is a false device, emulated or virtual in nature 8. Declare the PCI bus to be suspicious if any such device information doesn't compare as expected.

9. If the end of the list of possible PCI devices was determined in step 4 above, then quit and return a status indicating whether any valid or invalid devices were found, otherwise return to step 2.

Figure 3:
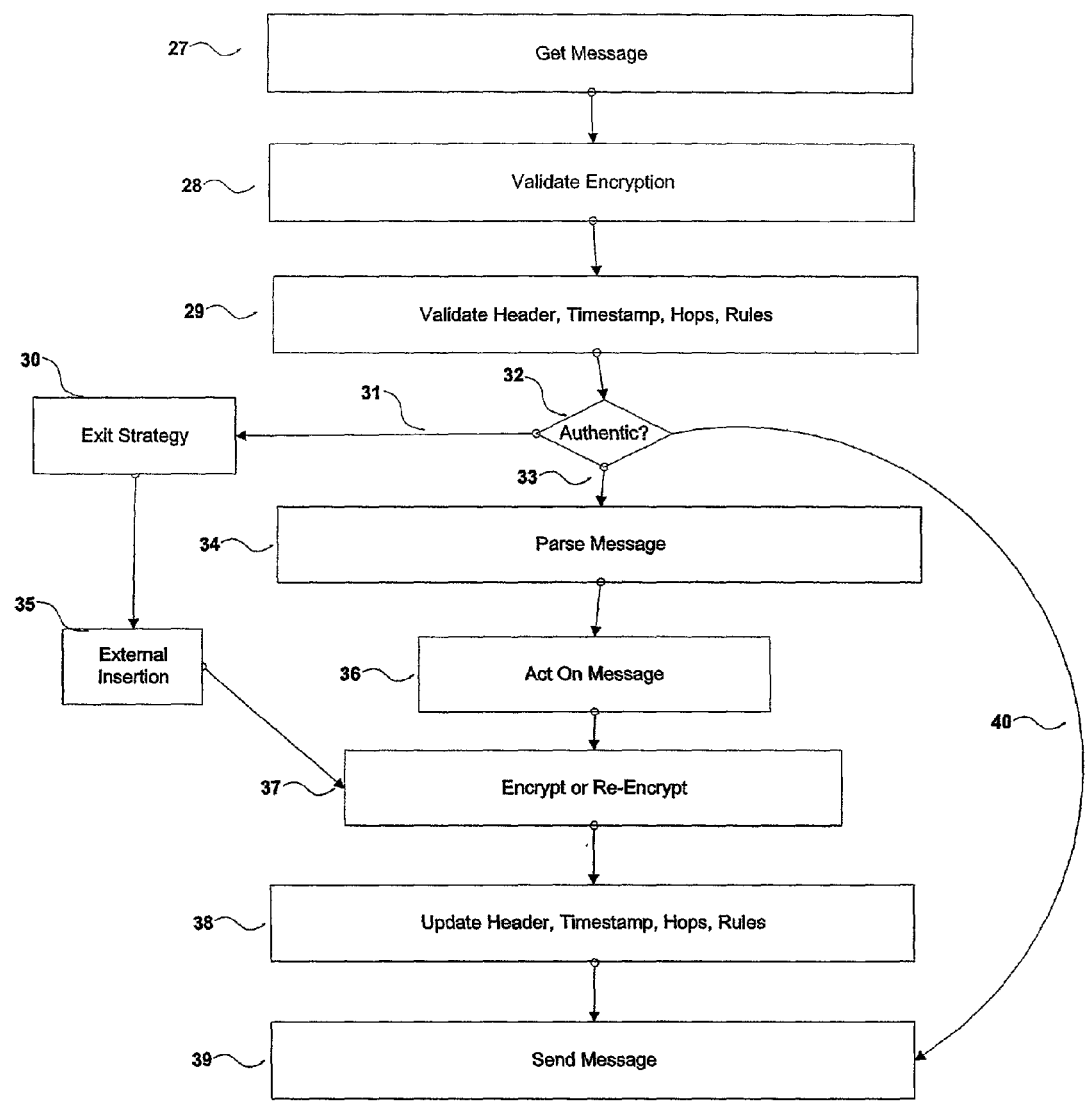
FIG. 3 is a flow diagram illustrating the operation of a system and method that serve the dual role of providing alternative data transmission mechanisms within a system, and simultaneously provide detection of certain classes of intrusive tools and attacks, in accordance with the present invention.
Figure 14:
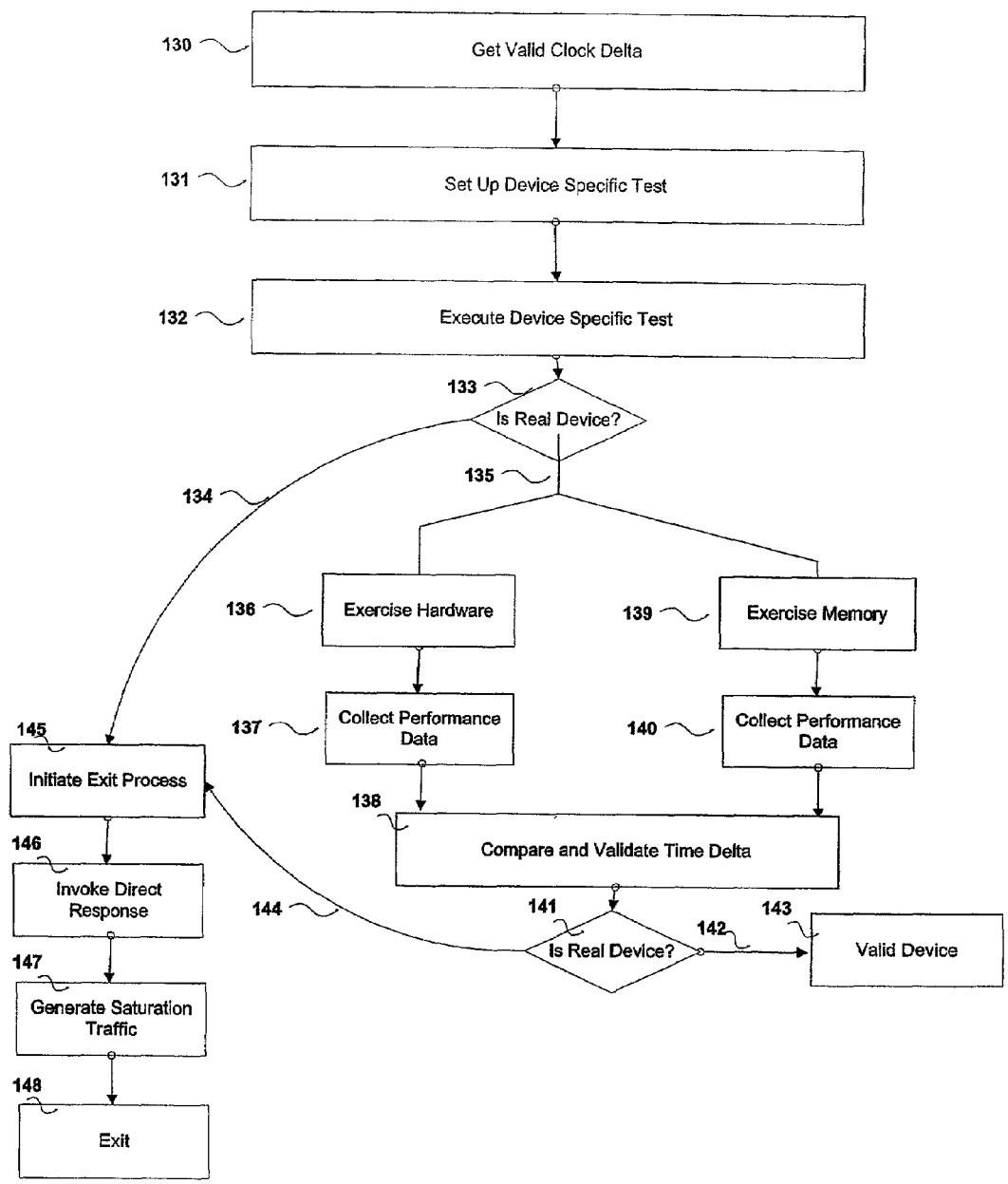
FIG. 14 is a flow diagram of the detection of the presence of emulated, virtual and in-circuit-emulation (ICE) systems by means of analytical and comparative performance measures, in accordance with the present invention.

FIG. 14 is a flow diagram of a system and process for detection of the presence of emulated, virtual and In Circuit Emulation system components by means of analytical and comparative performance measures of such emulated or virtual system component emulation functions. Such comparisons may include, but are not limited to, purported device processor versus purported device memory data flow and execution rate tests, which will have expected differences for real-world, real-hardware canonical studies, and vastly different time differences and overall performance attributes than such canonical data. Valid secure clock information 130, such as the non-resettable hardware "uptime" counters found on most contemporary CPUs (a specific technique for validating system clock and timing integrity is further discussed in the detailed description of FIG. 4 and associated descriptions), is captured and stored, and then device specific tests are enabled 131, such as a rendering rate or polygon rate or frame rate test for a purported video card, or a sampling rate test for a purported audio card, or a data transfer rate test for a purported SCSI card. An initial simple case of such a test is executed 132 and the test results (for example rate or timing results) are used to determine via such initial screening 133 if the device is an emulated or virtual device 134 in which case exit 145 and defensive response processes (such as a direct response 146, generation of saturation traffic 147 or an exit response 148) are initiated. Such exit responses may take the form of an immediate system wide exit or a deferred exit (such as by means of a deferred exit propagation through the messaging-system-deferred exit mechanisms as shown in FIG. 3) In the case where the device is deemed by the system 133 to be possibly a real, physical device 135, a series of performance tests 136, 139 are initiated on the purported device's hardware 136, if any, and memory 139, if any. Performance data from such testing (for example, frame rate data from a purported video card, and other data and status information retrieved by the testing process, such as the Boolean status of the test being successfully executed) is gathered 137, 140 and then compared 138 to canonical data for successful tests performed on real hardware. Absolute and relative time values are compared 138, based on the initial secure sampling of secure system timing data 130. The comparison yields a decision 141 by the system as to whether the device is emulated or virtual 144 (leading to exit 145 and defensive response processes), or whether the device is deemed to be a valid device 142, in which case, its validity is communicated to the rest of the system 143.

FIG. 3 is a flow diagram of a system and method that serve the dual role of providing alternate data transmission mechanisms within a system, and simultaneously providing detection of certain classes of intrusive tools and attacks upon the system. This approach is based upon a model of optionally encrypted message passing between a predictable, predetermined or dynamically arrived at numbering and ordering of system entities, where the absence of a message in excess of a specific time interval, or the corruption of any aspect of a message, can make the system aware of intrusion. In an embodiment of this aspect of the invention, some, or all, functional system components or entities incorporate logic as in FIG. 3 in which the components send 39 and receive 27 such messages. The integration of this mechanism makes it ubiquitous throughout the system and makes it difficult or impossible to remove, slow down, or stop for debugger examination or other purposes any component of the system, because of the side effect of delaying or aborting a message in transit.

The mechanism operates as follows, with reference to FIG. 3: a message passing component waits for an incoming message 27 from any other appropriate message passing component (appropriateness later determined in steps 28, 29) and also tracks a timer. Should the timer expire prior to a predetermined maximum message passing interval with no incoming message arriving, a self-destruct message is generated 27 and passed to the encryption validation system 28, where it is decrypted, its header examined 29, and the header instructions to initiate an exit 30 based in timestamp and other embedded commands result in a decision 32 that an invalid (in this cases null) message was received (in this case auto-generated locally) 27 and a decision is reached to treat the message as a damaged or unauthorized message 31. The exit process is initiated 30, which may include any elements of a system defensive response as detailed elsewhere in this specification, and a message is generated to be passed to the other subsequent message passing components in the system. The message may, for example, command a deferred exit, and may be inserted 35 into the outgoing message queue, where it is 320 first encrypted 37, an appropriate self-destruct header is generated and applied 38, and it is passed 39 to the next message passing entity in the appropriate sequential order. Similarly, any incoming message 27 is decrypted 28 and parsed 29 and any discrepancy in the message other than an overt self destruct command (such as a time stamp invalidity, bad time delta, or evidence of time-clock tampering (see FIG. 4)) may also trigger a failed 31 authentication 32.

If however the message and its header are not deemed a threat, they may either be immediately forwarded to the next entity in the message passing sequence 41 and transmitted directly 39, or they may be parsed in detail 34, contents acted upon 35 (there may be commands in the message, or encrypted data needed by the system, or it may simply command the message passing entity to re-package and re-encrypt the message either modified in content or unchanged 37, reset the header values (timestamp, allowed hops before message destruction, any header-embedded handling rules) appropriately 38, and send on 39). The system then waits 27 for either the next message event or an appropriate timeout event in the absence of a next message.

An example embodiment of this message passing process begins with a set of computer instructions which initiate the first message passing sequence entity/process. The process then waits for the next entity in the message passing sequence to be created; each message passing sequence/entity process in turn can then initiate the next process in the message passing sequence, if desired. Then, each message passing entity in turn creates the message passing buffer where each listens for messages. At creation time, each such entity is provided with its own optional decryption key, as well as the optional decryption keys of the message passing system entity directly following it in the ordered sequence. All such messages are decrypted using the local message buffer decryption key, then re-encrypted using the recipient buffer's encryption key, and then passed to the recipient buffer. Messages are sent to an entity within a specified time period, and any such message contains certain authenticating information that confirms it was sent by the correct preceding entity and that its destination is valid. In one embodiment, the initiator of a message waits for the message to propagate through the sequence for the first time, in order to ensure message passing sequence completeness, and proving that the message passing system is fully operational.

In a preferred embodiment, only one such entity or process owns each message passing buffer, and after creating the message passing buffer to which it listens (and which each such previous member of the message passing sequence is waiting for) it then tries to pass an initial message to the next member of the message passing sequence's message passing buffer. Each entity then sends a message that directs each other message passing sequence member to be alerted to its identity and to take action should the entity that initiated the contact exit from the system or otherwise "disappear" from the system (for example if it were "killed" by a malicious intruder or entity), in which case the whole message passing sequence comes to a halt and may trigger any number of system defensive responses, including a system-wide exit response as discussed elsewhere in this specification.

Invention mechanisms that provide capability for deferred or delayed exits or propagation of such exit activities may be implemented in this aspect of the invention. Such mechanisms include the accumulation of "Watch Lists" of processes to watch. These may be passed during normal execution as messages. In the event of the disappearance of any such process, the watching process itself will choose to exit. In addition there are "Kill Lists" which are used during the exit process, whose entries are also accumulated by means including, but not limited to, passing these identifiers as messages to one, some, or all members of the message passing system, in which processes are listed and some or all of them are killed by an exiting entity before it itself exits. The message passing sequence may also choose to send a self-destructive system-wide kill message to the next process in the message passing system. Such a message may be acted upon, resulting in the message being passed to the next entity, the process choosing to kill others, itself, or some or all of these actions.

Figure 4:
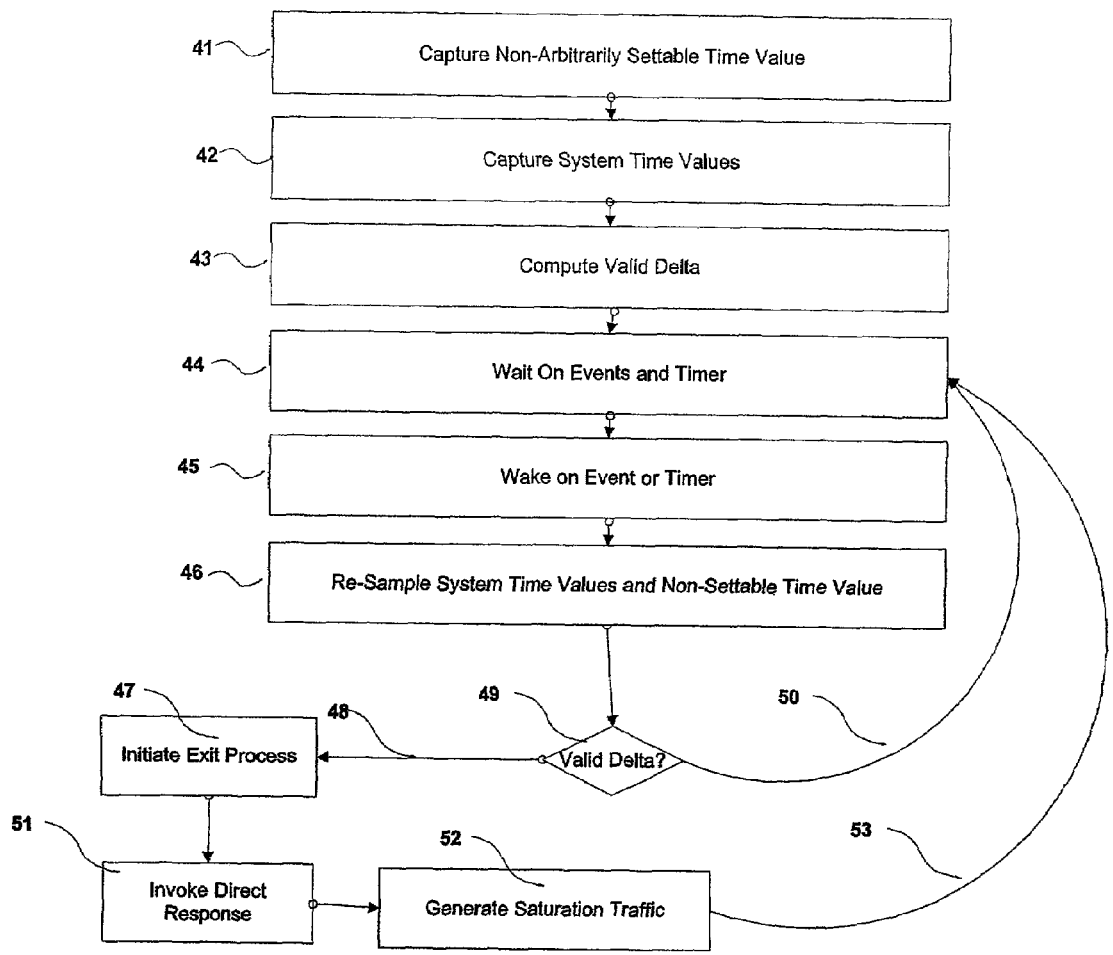
FIG. 4 is a flow diagram that illustrates detection of the intrusive action of broad classes of threats by time-domain means, in accordance with the present invention.

FIG. 4 is a flow diagram of a system and method for the detection of an intrusive action of broad classes of threats through the use of time-domain techniques. This is accomplished by a number of approaches including, but not limited to, a comparison of relative and absolute differences, or deltas, between a known secure timer and other system-available time, time-stamping, or clock values.

In one embodiment, a non-resettable time value is recorded 41. An example of such are the non-resettable timers found in Intel and AMD processors, which tally CPU uptime from last boot and may only be reset to 0, never arbitrarily reset, regardless of the system clock state or setting capabilities. Various system time values are captured 42 and an initial delta is computed 43 based on the non-resettable uptime and the (somewhat arbitrarily settable) system clock values available through various programmatic interfaces on various operating systems and computing devices. This process then waits on a number of externally set event triggers 44, which may be set for instance by the message sending system of FIG.3, and, upon waking 45, re-samples the same timers 46 as previously recorded above in steps 41 and 42 and evaluates whether the delta has changed 49 to a significant degree between a critical number of these time samples. If it has changed significantly enough according to the system's design criteria 48 then a determination is made that the system clocks have been reset or tampered with, and an exit process or other threat-negating process 47 is triggered, which may include the sending of a self-destruct message as in FIG. 3 to trigger a system-wide exit. A direct response 51 may also optionally be invoked which may attempt to find and disable, cripple, kill or otherwise hamper the intruding process or the intruding set of tools. Saturation traffic is generated 52 (see FIG. 12 for more on saturation-type defensive mechanisms). After these defensive response steps are initiated, the system again waits on the external event triggers 44 as above. Alternatively, if the system did not exhibit a time-delta discrepancy, the system sees no threat 50, and again it waits on the external triggers 44 as above.

An embodiment of such time-domain ratio delta validation as shown in FIG. 4, which illustrates the detection of attacks by measuring time-domain deltas, ratios and other related means.

When initialized and initially launched, capture the current counter value for the secure system uptime counter. Store that value in a variable, referred to in this example as "Uptime1". Capture the current system time value using the system's System Clock time service. Store that value in a variable, referred to in this example as "SysClock1". Re-Capture the current counter value for the secure system uptime counter. Store that value in a variable, referred to in this example as "Uptime2". Re-Capture the current system time value using the system's System Clock time service. Store that value in a variable, referred to in this example as "SysClock2". Compute the following ratio: (Uptime2−Uptime1) divided by (SysClock2−SysClock1). Store that resultant division (ratio) value in a variable, referred to in this example as "Ratio1". Save Ratio1 for future reference.

Then, when called subsequently (for example when the message passing system described elsewhere in this document needs to validate the elapsed time and uptime as accurate and non-tampered) perform the following computational steps: capture the current counter value for the secure system uptime counter. Store that value in a variable, referred to in this example as "Uptime3". Capture the current system time value using the system's System Clock time service. Store that value in a variable, referred to in this example as "SysClock3". Re-Capture the current counter value for the secure system uptime counter. Store that value in a variable, referred to in this example as "Uptime4". Re-Capture the current system time value using the system's System Clock time service. Store that value in a variable, referred to in this example as "SysClock4". Compute the following ratio: (Uptime4−Uptime3) divided by (SysClock4−SysClock3). Store that resultant division (ratio) value in a variable, referred to in this example as "Ratio2". Compare Ratio1 and Ratio2; if they are equal, or if they are close within a specified tolerance (this allowable difference may be set by the system's implementers and may vary based on the system's expected loading and other performance attributes) then a status is provided to indicate that the system clock and uptime counter have not been tampered with. If they are outside the expected range of equivalence, then a status is provided that indicates that the system clock and or the uptime counter have been tampered with. Such tampering is a strong indication that debugging or other intrusive unauthorized tampering activity is ongoing or has occurred since the first time Ratio 1 was captured. Save Ratio 1 for other future comparisons as needed in the case where no tampering was detected.

Figure 5:
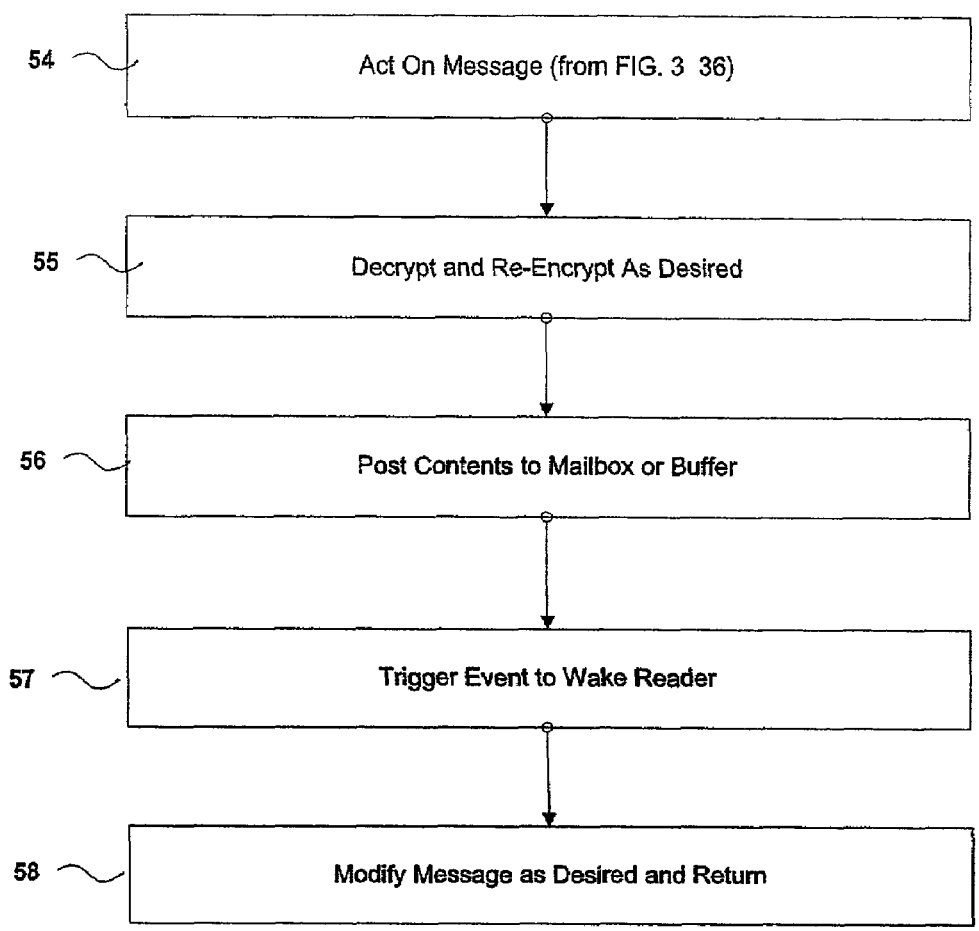
FIG. 5 is a flow diagram of broad data flow obfuscation across a system to deter reverse engineering of the system's functions and elements, in accordance with the present invention.

FIG. 5 is a flow diagram for a system and method that provide broad data flow obfuscation across a system to deter reverse engineering of the system's functions and elements. This is achieved by methods including, but not limited to, a generalized system-wide data flow where critical data is passed through many intermediate handling processes, and where all data may travel more or less the same route regardless of sender or intended recipient. This is not particularly time or resource efficient but can serve to eliminate the ability to gain an understanding of the system by observing data flow and inter task and process communication. The message passing system as illustrated in FIG. 3 is used by way of example here; a message is passed between entities, continuously, until the system decides it is no longer needed, and then it is disposed of. As in FIG. 3, step 36, a message is eventually read and acted upon in some manner by each entity in turn that handles it. As shown in 54, the message is acted upon, which may include decrypting it, extracting meaningful content, and then re-encrypting it or modifying it and then re-encrypting it 55, and then providing the extracted contents to an intended recipient or recipients using means other than the message passing mechanism 56, optionally triggering an event so that the intended recipient is instructed to retrieve the content 57. In an optional final step, the message is modified as desired, and the process returns to the message passing function at FIG. 3 step 37. The same message may be handled by a number of recipients. In addition, this process may be used to pass small amounts of otherwise critical data around the system such that interruption of the message passing system results in certain critical elements being absent from, for example, a decrypted message or content, so that successful decryption cannot complete, or is impossible due to utterly missing data, even if the rest of the system is compromised by subversion tools.

The following example of the process of FIG. 5 is used when decrypting a mass of data, where some of it may be selected to be sent by more secure or alternate transmission means to the intended recipient. Some number of data items are sent through the message passing system rather then simply being read by the intended recipient, and then re-united with the data which is provided in whatever standard manner the system desires, and are reassembled into a complete and usable collection of data. This has the added benefit of concealing the path by which some or all of the data is sent and may also serve to confuse an examining system as to exactly which entity is the intended recipient, because all system entities will receive and pass this data along via the data flow obfuscation system. One or more blocks from a mass of encrypted data are read into a local public buffer. The data may remain encrypted at this time. Some number of blocks are removed from this buffer and may be copied to a private local buffer; the process by which they are selected may be random, pseudo-random, or algorithmic and deterministic. The remaining blocks are provided directly to the intended recipient, by any normal data transmission means, and may be done completely "in the clear" with no attempt to hide or obscure origin or destination or contents, for example they may be copied directly to the recipient's buffer or a pointer provided to the recipient so the recipient can pull the data as needed from the public local buffer. At this point the recipient is still missing the data that was removed and placed in the local private buffer (and so is anyone who may be debugging the recipient or the entire system). These remaining blocks, which for example may be 512 K-bytes of data each, where one K-byte is 1024 8-bit bytes of data, had been temporarily stored in the local private buffer as above, and are taken one at a time, and whether encrypted or not in original form, are handed off to a member of the message passing system, and the block is encrypted with the appropriate message transmission encryption key for the sender, and sent through the system. The data is identified with header information, also encrypted, indicating that the block's destination is the recipient of the other previously-removed data as indicated above. As each entity in the system that is a member of the message passing system must handle the message and encrypted block, the flow of this critical data is obscured. The intended recipient eventually retrieves it from the message passing system, but note that the message and its encrypted payload continue around the message passing system until they are eventually received by the original message sending entity, at which point the circuit of the message is completed. Note that in one embodiment, the message header contains encrypted information that allows each handler in turn to recognize whether it was the originator of the message, and also contains information about how many such entities are allowed to handle the message before it must be deleted. One such approach is to allow one full circuit of the message around the system through all such message passing entities, another is to allow N full circuits of the message around the system, and another is to allow N entities to handle it before discarding it. In all cases it is optimal and recommended in order to maximally obscure the data flow that the intended recipient entity is not the final stop of the message; however a message can be deleted at any time if the header criteria for the number of message passing handler entities or complete circuits or time are met.

Figure 6:
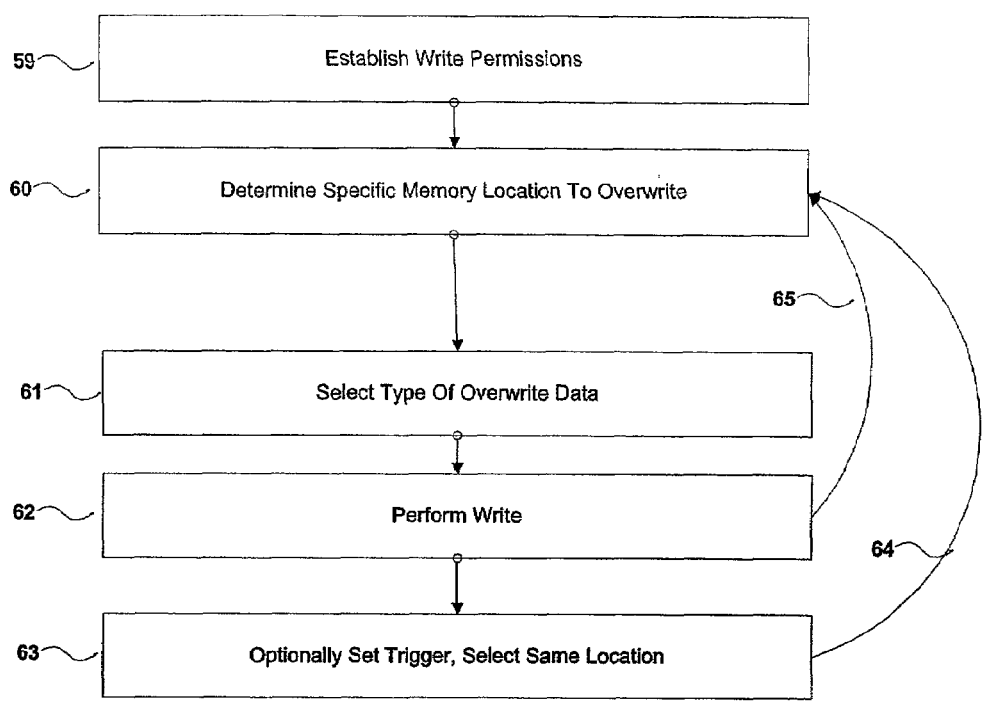
FIG. 6 is a flow diagram of a system and method that reverse any unauthorized modification of protected content, in accordance with the present invention.

FIG. 6 is a flow diagram of a system and method of the present invention that reverse any unauthorized modification of protected content. A primary purpose of this aspect is to render unauthorized modification moot by causing any modified sections to revert to their previous state. A secondary benefit of this aspect, when performed in a just in time manner, is that memory lifting or memory dumping as described below (using, for example, ProcDump or other such tools) may be rendered less effective. This is accomplished by repeatedly overwriting the protected content with a known good copy of the same protected content, previously stored elsewhere in a secure fashion, so that no modification can be done without reversal at the next overwrite. Overwrites of sufficient frequency serve to render any modification process powerless.

In the example of FIG. 6, permissions and privileges are attained in order to write to the location where the protected content is being held in memory prior to or during execution 59 in order to avoid errors while writing. For example if the writing were to occur to a given section of protected code, the location of that code in memory would be determined, in this case the code would be determined to reside within the bounds of a given page of memory, and the appropriate write and access permissions would need to be set with respect to that page before it can be accessed. Failure to set these permissions can result in a crash or other undesirable result. Specific locations are found within this page which are to be corrected 60, and the correct overwrite data for each location is selected 61. The write is then performed 62, overwriting that location with a known appropriate data value, without the necessity of determining whether the location previously contained the correct data value or not, and then may either be performed again 65 as soon as possible 60, or performed again later at a time determined by the occurrence of an event trigger such as a timer or other event 63. When such a "write again" event occurs, for example a timer being triggered 63, then the next overwrite location and overwrite data value can be selected 64 and performed 60. In one embodiment, such content can be intentionally corrupted or incorrect prior to execution, corrected just-in-time immediately prior to that line of code or section of code in memory being executed, and is re-corrupted immediately afterwards, in order to maintain the state that the program is not correct in its entirety at any one time during execution. This reduces the likelihood of the program being memory lifted or memory dumped by tools such as ProcDump discussed earlier in this specification.

In other words, using an analogy of an English sentence rather than a stream of assembly language executable code so that the reader may more easily understand the concept of just in time overwrite as protection against memory lifting; if the sentence to be secure was "Mary had a little lamb" and this sentence was pre-processed or "pre-corrupted" for security purposes to be "Fred ate a big cheeseburger", this system and method of the present invention would determine that the sentence was about to be read, and would correct each word of the sentence just-in-time right before it was to be read, such that, for example, immediately before the word "big" were to be read, this invention would overwrite it with the word "little" in a just-in-time fashion. When the next word "cheeseburger" was about to be read it would be changed to "lamb" and at that same invocation time the word "little" (having already been read and no longer required to be correct" would be changed back to "big", or may in fact be changed to any other incorrect value like "red"). Thus if memory is lifted at any time, the memory lift or dump performed at any time would be one of "Mary ate a big cheeseburger", "Fred had a big cheeseburger", "Fred ate a little cheeseburger" or "Fred ate a big lamb" but could never be "Mary had a little lamb" at any one point in time. This concept of just-in-time correction of values followed by just-in-time "re-corruption" of them can be applied to data at any granularity (bits, bytes, blocks of bytes of arbitrary size, entire pages of memory, multiple pages of memory) to thwart memory lifting or dumping.

Following is a description of an example embodiment of a self-correcting overwrite process as expressed in FIG. 6. This illustrative process includes the capability of setting up the system memory to allow the write, obtaining the correct value to be written, and writing the value.

The first step is to retrieve the enumerated function number (for example this concept of enumeration refers to an indexed location within a program, the $4^{th}$ function entry point for example which defines the start location of the area of concern), the exact start address within that location, the exact end address of the area of concern, and the encryption key, for each location of memory to be just-in-time corrected and just-in-time corrupted after such correction. All of the correct data that will be needed to overwrite these pre-processed, pre-corrupted locations is placed in an archive location, optionally encrypted, in a relatively safe place like a driver, vxd, or sysfile as part of a post-processing step. Using the "Lamb" example above, the content "Mary hade a little lamb" would be copied during a pre-processing step as the protected product was being prepared for distribution, and each word encrypted and placed in such an archive for later use. The location formerly occupied by that sentence would be filled with "Fred ate a big cheeseburger". Where and as needed, any file-specific checksum is recomputed to make it a valid file despite this pre-processing substitution. As the just-in-time substitutions occur, the appropriate (usually Microsoft required) checksums as needed are again re-modified to avoid any errors during execution. As each modification occurs, or once prior to any such modification, code such as the example below is executed to ensure the writing/modifying process has appropriate error-free access to the area of memory where the write is intended to occur:

```
//Non-Privileged method to get pages ready for Just-In-Time-Overwrite
  void AllowWriteAccess( int CONTENTVALIDATIONNum )
  {
    CodeChunkInfoExe_t* ContentValidationData = (CodeChunkInfoExe_t *)s_cciDb;
    DWORD        dwNewProtect;
    DWORD        dwOldProtect;
    DWORD        dwOriginalProtect;
    MEMORY_BASIC_INFORMATION mbi;
    // get page properties from mbi
    // Get to the correct entry in the ContentValidationData struct
    while (CONTENTVALIDATIONNum != ContentValidationData->ContentValidationNum)
    {
      ContentValidationData ++;
    }
    // Get the current protection attributes of the page we will be manipulating
    VirtualQuery((void *)ContentValidationData->ContentValidationStartAddress, &mbi, sizeof(mbi));
    dwOriginalProtect = mbi.Protect;
    if (ContentValidationData->ContentValidationStartAddress != 0)
    {
      //verify that we are in a valid address range
      if ( (ContentValidationData->ContentValidationStartAddress >> 20 == 0x04)     &&
           (ContentValidationData->ContentValidationEndAddress >> 20 == 0x04)     &&
           (ContentValidationData->ContentValidationEndAddress > ContentValidationData-
>ContentValidationStartAddress) )
```

```
        {
            //This will be the new protection to allow us to write in the code segment
            dwNewProtect = PAGE_READWRITE;
            // Change protection attributes to readwrite
            if (!VirtualProtect((void *)ContentValidationData->ContentValidationStartAddress,
                  (ContentValidationData->ContentValidationEndAddress - ContentValidationData-
     >ContentValidationStartAddress),
                  dwNewProtect,
                  &dwOldProtect))
            }
        }
        return;
} // End AllowWriteAccess( )
```

As shown below, the stored correct code ("Mary had a little lamb") is removed from storage, un-encrypted, and then the pre-process-corrupted location ("Fred ate a big cheeseburger") is overwritten with the correct information. Note: all storage buffers are preferably destroyed after the overwrite occurs so that the correct data isn't lingering, waiting to be stolen by other means.

```
NTSTATUS UnCorrupt(int CONTENTVALIDATIONNum)
{
    NTSTATUS        ntStatus = STATUS_SUCCESS;
    //static struct containing all the key data start, end, encrypted code . . .
    APPCODEINFO*    ContentValidationData = (APPCODEINFO*)s_aciDb;
    unsigned int    encryptBlockLength,
    int      iAmountEncrypted;
int       iLengthToEncrypt;
int       jj;
 void* pEncrBlock = NULL;
 BYTE*      tempBuffer;
    char*    badCodeBuff;
    char*    inp_bKey;
 unsigned int    in_cbKey;
// create a encryption object using the key we filled in at post process
// pEncrBlock = new CEncryptionEncryptor(twoKey);
//encryptBlockLength = pEncrBlock->BlockSize( );
//use the extern c wrapper to create a encryption object
EncryptionEncryptorConstructor(&pEncrBlock, twoKey, 16);
encryptBlockLength = 16;
// Check status so far
if (NULL == pEncrBlock)
{
    memset(twoKey, 0, sizeof(twoKey));
    return;
}
//Get to the correct entry in the ContentValidationData struct
while (CONTENTVALIDATIONNum != ContentValidationData->ContentValidationNum)
{
    ContentValidationData ++;
}
if (ContentValidationData->ContentValidationStartAddress != 0)
{
 if ( (ContentValidationData->ContentValidationStartAddress >> 20 == 0x4)    &&
       (ContentValidationData->ContentValidationEndAddress >> 20 == 0x04)    &&
       (ContentValidationData->ContentValidationEndAddress >
       ContentValidationData->ContentValidationStartAddress) )
{
 // Overwrite all methods with a correct copy of the code.
 // First we need to decrypt the code in a temp buffer
iLengthToEncrypt = ContentValidationData->ContentValidationEndAddress -
        ContentValidationData->ContentValidationStartAddress + 1;
iAmountEncrypted = 0;
// Decrypt the buffer
    tempBuffer = (BYTE*)ExAllocatePool(PagedPool,encryptBlockLength);
    memset(tempBuffer, 0, encryptBlockLength);
    for (jj = 0; jj < iLengthToEncrypt; jj += 16)
```

```
    {
      if ( (iLengthToEncrypt == 0) || (iLengthToEncrypt > iAmountEncrypted) )
      {
        //Decrypt the encryption block
        EncryptionEncryptorDecryptBlock(pEncrBlock,
          &(ContentValidationData->myCode[jj]),tempBuffer);
        iAmountEncrypted += encryptBlockLength;
        memcpy(&(tmpCode[jj]), tempBuffer, encryptBlockLength);
      }
    }
    // Zero the temp buffer now that we are done with it
    memset(tempBuffer, 0, encryptBlockLength);
    ExFreePool(tempBuffer);
    // overwrite the invalid code with the good code.
    memcpy((void *)ContentValidationData->ContentValidationStartAddress, tmpCode,
       ContentValidationData->ContentValidationEndAddress-ContentValidationData-
>ContentValidationStartAddress);
    // Zero the full buffer of decrypted code now that we are done
    memset(tmpCode, 0, sizeof(tmpCode));
    }
  }
  ContentValidationData = (APPCODEINFO*)s_aciDb;
 return ntStatus;
} // End UnCorrupt( )
```

In this example embodiment, when the process has completed, the content can be re-corrupted back to an invalid state using the driver-level "Corrupt" process illustrated below. This process is used to fill the code space with garbage (e.g. "Fred ate a big cheeseburger" from the example above) just after the corrected data is read by the operating system. In this example the space is filled in with zeros, but any incorrect/corrupted/irrelevant value may be overwritten at this point.

```
static void Corrupt( int CONTENTVALIDATIONNum)
{
  APPCODEINFO*    ContentValidationData = (APPCODEINFO*)s_aciDb;
  memset(encrapBuffer, 0, sizeof(char) * MAX_CODE_LEN_EXE);
  //Get to the correct entry in the ContentValidationData struct
  while (CONTENTVALIDATIONNum != ContentValidationData->ContentValidationNum)
  {
    ContentValidationData ++;
  }
  memcpy((void*)(ContentValidationData->ContentValidationStartAddress),
      (void*)(encrapBuffer),
      (ContentValidationData->ContentValidationEndAddress-ContentValidationData-
>ContentValidationStartAddress));
  return;
} // End Corrupt( )
After we are finished altering the code space we must return it back to a read only state. We use our
RemoveWriteAccess( ) method to perform this task.
//This method alters the page attributes for the pages that we overwrite back to the original read only state
void RemoveWriteAccess( int CONTENTVALIDATIONNum)
{
  CodeChunkInfoExe_t* ContentValidationData = (CodeChunkInfoExe_t *)s_cciDb;
  DWORD        dwNewProtect;
  DWORD        dwOldProtect;
  DWORD        dwOriginalProtect;
  MEMORY_BASIC_INFORMATION
        mbi;    // get page properties from mbi
  // Get to the correct entry in the ContentValidation Data struct
  while (CONTENTVALIDATIONNum != ContentValidationData->ContentValidationNum)
  {
    ContentValidationData ++;
  }
  // Get protection attributes
  VirtualQuery((void *)ContentValidationData->ContentValidationStartAddress, &mbi, sizeof(mbi));
  dwOriginalProtect = mbi.Protect;
  if (ContentValidationData->ContentValidationStartAddress != 0)
```

```
{
   if ( (ContentValidationData->ContentValidationStartAddress >> 20 == 0x04)  &&
      (ContentValidationData->ContentValidationEndAddress >>20 == 0x04)      &&
      (ContentValidationData->ContentValidationEndAddress >
      ContentValidationData->ContentValidationStartAddress) )
   {
     dwNewProtect = PAGE_READONLY;
     // Change protection attributes to readwrite
     if(!VirtualProtect((void *)ContentValidationData->ContentValidationStartAddress,
        (ContentValidationData->ContentValidationEndAddress -
        ContentValidationData->ContentValidationStartAddress),
        dwNewProtect,
        &dwOldProtect))
     }
   }
   return;
} // End RemoveWriteAccess( )
```

Figure 7:
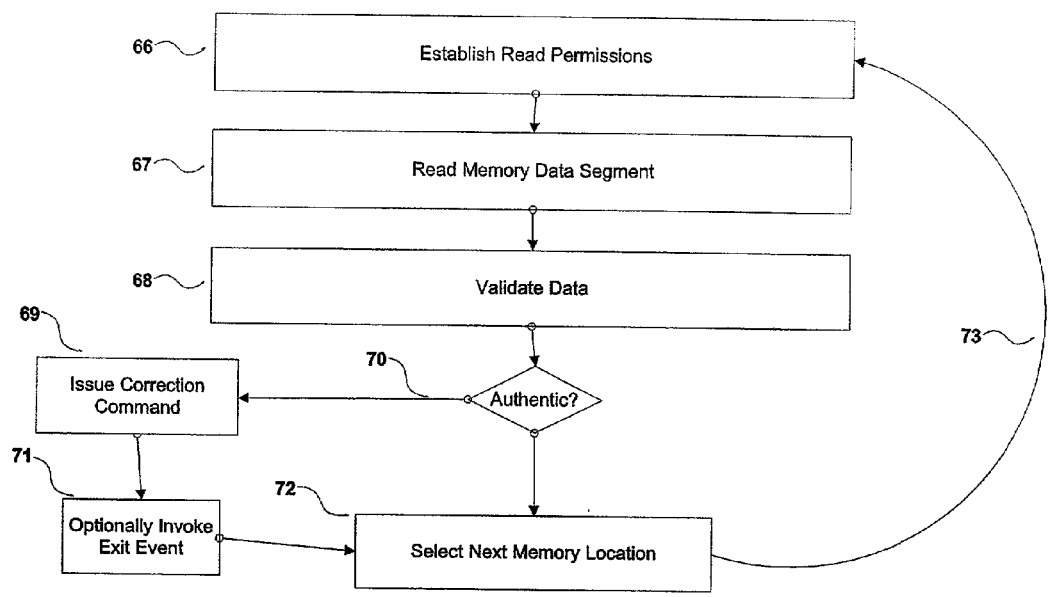
FIG. 7 is a flow diagram of a system and method that detect unauthorized modification made to protected content, in accordance with the present invention.

FIG. 7 is a flow diagram of a process and method for the detection of unauthorized modifications made to protected content. First, the necessary permissions and privilege level are attained (for example using Ring 0, VxD, or driver methods and techniques of access on Windows operating systems in some cases) 66 so that the protective process can access the memory location where the protected content is being stored prior to, or during, execution. The protected memory data segment is read 67 and a comparison is performed between some aspects of the protected data and a stored copy of valid data 68. In the event that the read data is authentic 70 then no defensive action is triggered, and the system selects the next memory location 73 (which may be the same or other location) to scan. In the event the authentication 70 yields evidence of tampering, the data may optionally be corrected 69 (a process such as the overwrite process illustrated in FIG. 6 may be used) and the system may optionally trigger an exit or defensive event 71 as described elsewhere in the present specification, including but not limited to the exit of one or more system processes, the transmission of a self destruct message through a message passing system FIG. 3 or other overt or subtle defensive response. In any event, the system then selects the next location 72 and the process begins as before in step 66.

Below is an embodiment of the invention as described in FIG. 7, namely modification-detection comparison code that detects if the target data has been modified. The first step in the modification-detection code takes place in attribute-detector which runs as a post process step. This mechanism generates an attribute match for later comparison. Such an attribute match may include but not be limited to the application of summation or other mathemtatical functions to the desired protected data byte values, counting the total number of bytes, direct byte by byte comparison from a known good copy to the actual "live" target, or other valid means of comparing bits, bytes or other aggregations of computer data. While executing within the protective system, the Modification-Detection comparison code is called and used on a continual basis.

```
//Init detectable change attribute context
detectionInitial(&detectioncontext);
//take the detection from ValidationAttributeStartAddress to ValidationAttributeEndAddress
detectionUpdate(&detectioncontext,
        (unsigned char *)ValidationAttributeData->ValidationAttributeStartAddress,
        ValidationAttributeData->ValidationAttributeEndAddress-ValidationAttributeData-
>ValidationAttributeStartAddress + 1);
detectionFinal(&detectioncontext);
memcpy(detectionattribute, detectioncontext.attribute, detection_attributesize);
attributeLen = detection_attributesize;
// compare detection attribute to the stored detection , put up error if different
if(CompareMemory(detectionattribute, ValidationAttributeData->ValidationAttributeCode, attributeLen) !=
0)
     {
        //take appropriate action if the attributes are not the same.
          PerformDefensiveResponseActions(DeferredOrImmediate);
     }
```

Figure 8:
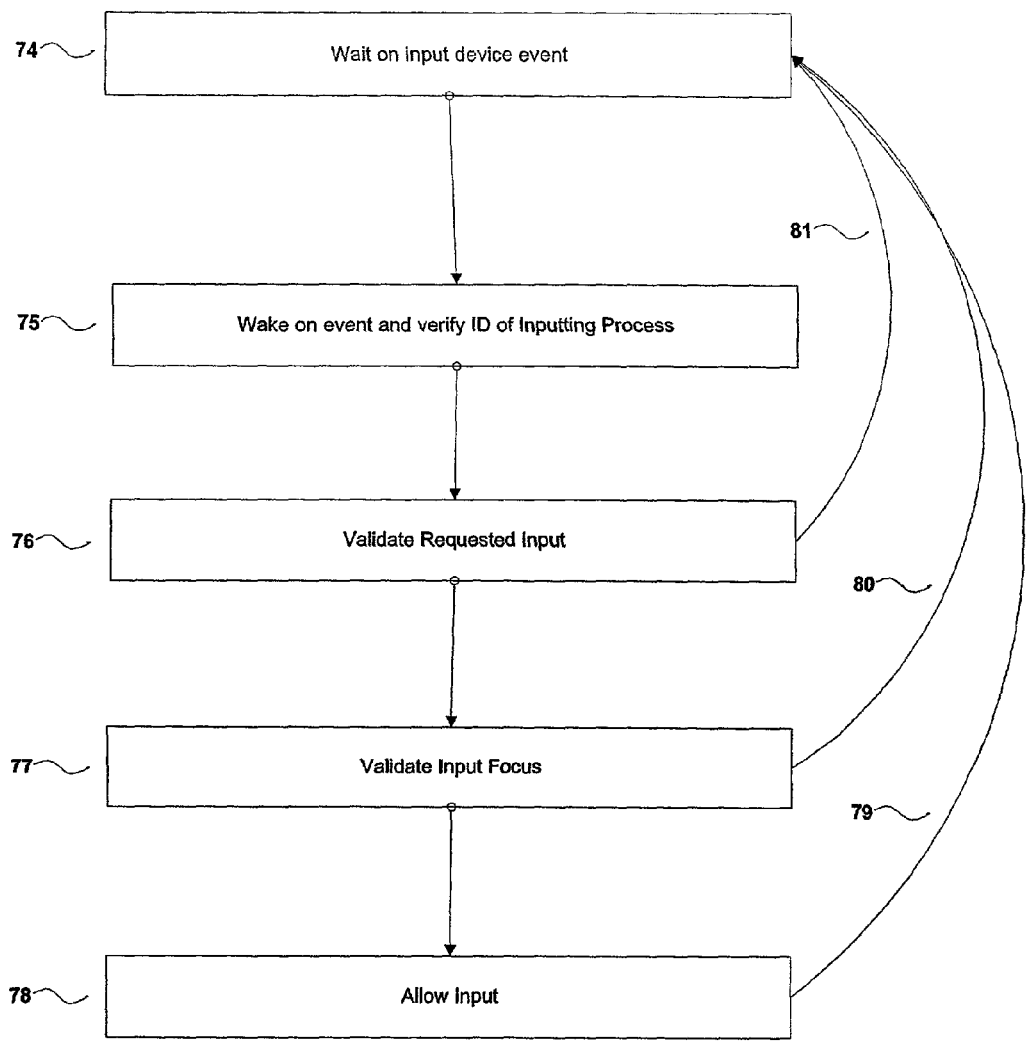
FIG. 8 is a flow diagram of a system and method that contextually filter input from devices such as keyboard and mouse as a security measure, in accordance with the present invention.

FIG. 8 is a flow diagram of a system and method for a security measure in accordance with the present invention that contextually filters input from input devices such as a keyboard and mouse. An input device such as a mouse or keyboard typically generates an event with each click or keystroke. System processes wait on such events and process them. The defensive process and system in this case inserts itself between the input device and the standard driver for that device, and is therefore in a position to intercept the event of a click or keystroke. This component therefore waits on an input device event 74, and wakes upon the occurrence of any such event 75 and the process invoking the event is identified. A validation is made as to whether the input is permitted at all (certain classes of inputs such as system reboot command Control-Alt-Delete are disallowed) 76, and if it is disallowed, the event is discarded (in this case the keystrokes are ignored and never passed through to the underlying operating system) and the process returns to a waiting state 74 for the next input. If the event is of a permitted type in general, it is next tested to determine if the target window focus is an allowed window focus 77. If not, it is disallowed and the event is discarded and the process returns to a waiting state 74 for the next input. If it is an allowed input focus, however, it is passed unmodified to the standard input device driver 78 and the process returns to a waiting state 74 for the next input.

Figure 9:
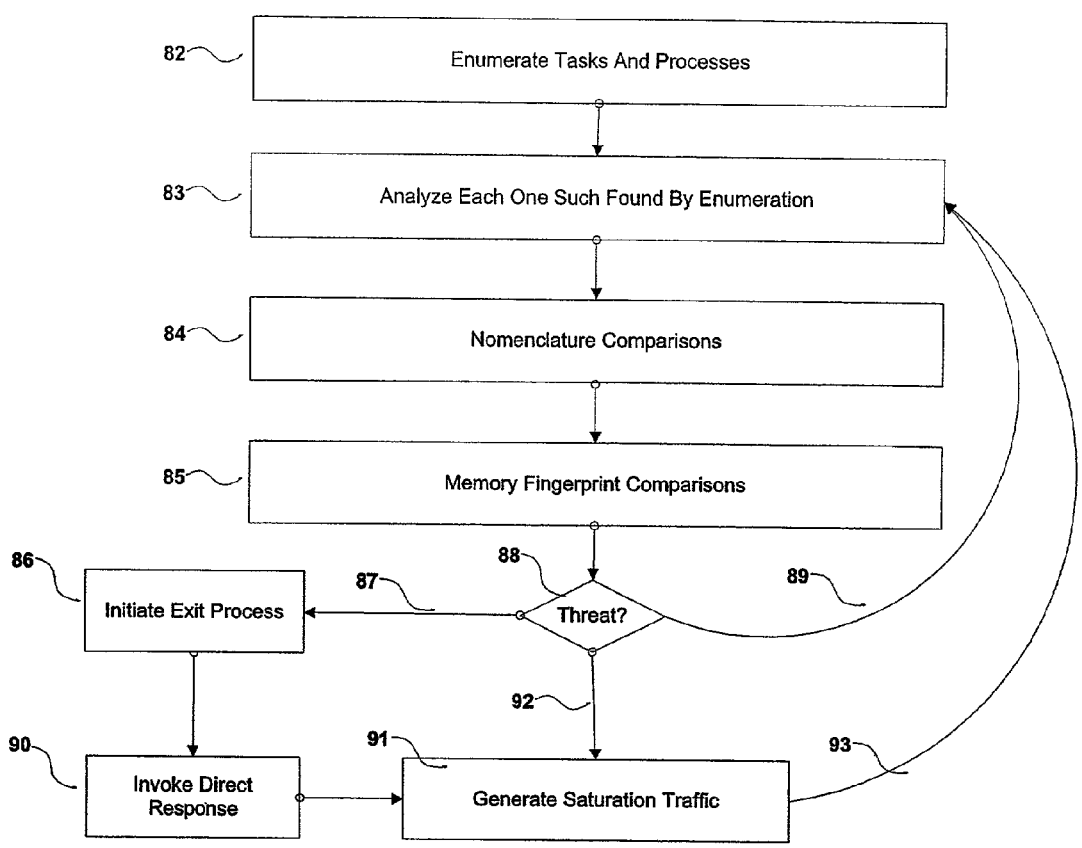
FIG. 9 is a flow diagram of the detection of execution of overt intrusion-threat programs, in accordance with the present invention.

FIG. 9 is a flow diagram of a system and method that discover and detect the execution of overt intrusion-threat programs. These overt threats may be known entities, such as specific tools or families and classes of tools, and may be recognized by such simple "nomenclature" or string attributes as file name, file properties, or query-enabled string values (such as registry entries) that can be determined while, or before, they are actively running. This system and process therefore enumerates all system tasks and processes 82, analyzes and scans each one found 83, compares string, name, and configuration values 84 with canonical values of known threat entities, and compares certain aspects of the in memory signature (see FIG. 10 for more detail on in-memory entity fingerprint detection process; certain bit patterns in selected locations within the potential threat entity) with canonical in memory signature values of known threat entities. An analysis is performed 88 to determine whether the currently selected entity is a potential threat. If not 89 then the next such entity is chosen for analysis 83. If it is deemed to be a threat 87 by virtue of a match in terms of string values, nomenclature values, configuration values, or in memory bit fingerprint values, a defensive or exit response is optionally initiated 86, as well as optional direct response (such as an immediate exit of the scanning process, which may in turn indirectly trigger a message-system-based system exit FIG. 3 if the scanning process also has a secondary messaging role, as in FIG. 3), and the next such entity is chosen for analysis 83.

The various examples below illustrate invention mechanisms that search the system for a signature in a particular process. There are two different types in this example; namely, an all-at-once mechanism that scans all system processes in one call by using process SearchProcMemory repeatedly. There is also a less intrusive example, which scans a certain number of bytes before returning, and continues where it left off on the next call.

The data structures used to store the signatures of threats and tools that are later looked for during the scan of memory for such intrusive tools can be represented as follows:

```
typedef struct
{
    BYTE sig[100];
    int length;
}SIGENTRY;
```

The loading of signature data into the above defined data structures used to store the signatures of threats and tools is exemplified as follows:

```
static SIGENTRY signatures[ ] =
{
    // "A nasty memory lifting tool"
    { "\005\047\366\066\104\127\326\007", 8},
    // "A popular disassembly tool"
    { "\045\124\145\224\045\164\224\344", 8},
    // "A monitoring logging tool"
    { "\045\124\164\324\364\344", 6},
    // "Another such logging tool"
    { "\144\224\304\124\324\364\344\000", 8},
    // "Another disassembler"
    { "\106\026\067\326", 4},
    // "A monitoring and profiling tool"
    { "\145\105\127\346\126", 5},
    // "A monitoring and logging tool"
    { "\005\145\226\126\167\000", 6},
    // "A monitoring tool for NT"
    { "\05\45\364\64\124\205\05", 7},
    // "A scary monitoring tool"
    { "\024\005\224\065\007\227", 6},
    // "A sneaky monitoring tool"
    { "\204\026\346\106\306\126\124\207\000", 9},
    // "A pirate's dream ICE"
    { "\105\045\165\043\003\003\003", 7},
    // "A file access monitoring tool" (NT)
    { "\104\126\147\226\66\126\105\47\126\126", 10}
};
```

The exemplary embodiment below searches the entire random access memory of a system for the signatures of threat or intrusion tools and system components:

```
// SearchProcMemory
static BOOL SearchProcMemory(
    DWORD pid,
    char*  exeName,
    BOOL   searchIncremental = FALSE,
    int    ringPosition = 0
)
{
    //static HANDLE hMutex =INVALID_HANDLE_VALUE;
    BYTE      byBuf[BUFSIZE + MAXLENGTH – 1];
    DWORD     cbRead =0;
    BOOL      fMemoryRead = FALSE;
    HANDLE    hMutex;
    HANDLE    hProc =NULL;
    DWORD     ii;
    DWORD     jj;
    BYTE*     pMemBase =(BYTE *)0x00400000;
    char      szMutex[32] = "\326\127\107\126\207\362\326\226\067\066";//"mutex/misc"
    if (searchIncremental)
```

-continued

```
{
  pMemBase = s_pMemBaseStart[ringPosition];
}
}
if (pid == GetCurrentProcessId( ))
{
  if (s_setupExeStr[0] == 0)
  {
  strcpy(s_setupExeStr, exeName);
  strupr(s_setupExeStr);
}
  return FALSE;
}
// Create a named mutex so that only one process at a time can read the
//   address space of a given process
ii = strlen(szMutex);
SimpleCrypto_cpy(&szMutex[ii], &szMutex[ii], strlen(&szMutex[ii])); // obscure proc id
hMutex = CreateMutex(NULL, FALSE, szMutex);
hProc = OpenProcess(PROCESS_VM_READ, FALSE, pid);
if (!hProc)
{
  CloseHandle(hMutex);
  return FALSE;
}
fMemoryRead = TRUE;
while (fMemoryRead)
{
  WaitForSingleObject(hMutex,INFINITE);
  fMemoryRead =ReadProcessMemory(hProc,
  (void *)pMemBase, byBuf, BUFSIZE + MAXLENGTH − 1, &cbRead);
  ReleaseMutex(hMutex);
  if (!fMemoryRead)
  {
    break;
  }
  // Adjust address for next read
  pMemBase += cbRead;
  if (searchIncremental)
  {
     s_numBytesScanned[ringPosition] += cbRead;
  }
  for (ii = 0; ii < cbRead; ii++)
  {
    for (jj = 0; jj < NUMSIGS; jj++)
    {
      // SimpleCrypto_CompareMemory un-obscures the string before comparing
      if ((((ii + signatures[jj].length) <= cbRead)      &&
         (SimpleCrypto_CompareMemory(&(byBuf[ii]),
         signatures[jj].sig, signatures[jj].length) == 0))
    {
      // Threat Found . . . Need to exit the App?
      CloseHandle(hMutex);
      // Kill the app? (Only when utterly sure.)
      if (jj < 10)
         {
         KILLPROCESS(pid);
         }
      CloseHandle(hProc);
      return TRUE;
      }
      // Scan the memory of the processes
      processInfoPtr = sp;
      GetParentProcessInfo(processInfoPtr->ProcessId, &parentProcessID, processName);
      while ( (processInfoPtr != 0)&& (!fFound))
      {
      // Search the memory space of this process for signatures
      if (GetCurrentProcessId( ) == processInfoPtr->ProcessId)
      {
         fFound = SearchProcMemory(processInfoPtr->ProcessId, processName);
      }
      // Do the next process
     if (processInfoPtr->RelativeOffset != 0)
         {
            processInfoPtr = (PSYSTEM_PROCESS_INFORMATION)
            (((char *)processInfoPtr) +processInfoPtr->RelativeOffset);
            GetParentProcessInfo(processInfoPtr->ProcessId,
            &parentProcessID, processName);
         }
```

```
    else
    {
      processInfoPtr = NULL;
    }
  }
}
```

The following embodiment scans memory in a less intrusive fashion than the complete scan example shown above, and does so in time slices, incrementally, so that it doesn't interfere as much with normal system usage:

```
static_forceinline BOOL ProcMemScanIncremental( int ringPosition)
{
BOOL        bStat = TRUE;
BOOL        fFound;
    // Init
    s_pe[ringPosition].dwSize =sizeof(s_pe[ringPosition]);
    fFound = FALSE;
    s_numBytesScanned[ringPosition] = 0;
ULONG       n = 0x100;
NTSTATUS    status = 0;
DWORD       parentProcessID = 0;
char        processName[100];
        // Get a snapshot of the current process table
        if (s_procInfoBase[ringPosition] == NULL)
            {
            // Take a process tree snap shot
            s_procInfoBase[ringPosition] = new SYSTEM_PROCESS_INFORMATION[n];
            status= (s_ntQuerySystemInformation)(SystemProcessesAndThreadsInformation,
            s_procInfoBase[ringPosition], n * sizeof(SYSTEM_PROCESS_INFORMATION), 0);
            if (status != 0)
            {
            delete s_procInfoBase[ringPosition];
            s_procInfoBase[ringPosition] = NULL;
            return FALSE;
            }
            // Scan the memory of the processes
            s_procInfoPtr[ringPosition] = s_procInfoBase[ringPosition];
            GetParentProcessInfo(s_procInfoPtr[ringPosition]->ProcessId,
                            &parentProcessID, processName);
            s_pMemBaseStart[ringPosition] = (BYTE *) 0x400000;
        }
        else
        {
            if (s_pMemBaseStart[ringPosition] == (BYTE *) 0x400000)
        {
        // Do the next process
        if (s_procInfoPtr[ringPosition]->RelativeOffset != 0)
            {
                s_procInfoPtr[ringPosition] = (PSYSTEM_PROCESS_INFORMATION)
                (((char *)s_procInfoPtr[ringPosition]) + s_procInfoPtr[ringPosition] >RelativeOffset);
                GetParentProcessInfo(s_procInfoPtr[ringPosition]->ProcessId,
                &parentProcessID, processName);
            }
            else
            {
                s_procInfoPtr[ringPosition] = NULL;
            }
        }
        else
            {
                GetParentProcessInfo(s_procInfoPtr[ringPosition]->ProcessId,
                &parentProcessID, processName);
            }
        }
        }
        else
        {
                if (s_procInfoPtr[ringPosition])
            {
            fFound = SearchProcMemory(s_procInfoPtr[ringPosition]->ProcessId, processName,
            TRUE, ringPosition);
            }
        }
```

-continued

```
while ( (!fFound) && (s_procInfoPtr[ringPosition] != 0)    &&
        (s_pMemBaseStart[ringPosition] == (BYTE *) 0x400000))
{
        if ((s_procInfoPtr[ringPosition] !=0) && (s_pMemBaseStart[ringPosition] ==
        (BYTE *)0x400000))
{
        // Do the next process
        if (s_procInfoPtr[ringPosition]->RelativeOffset != 0)
{
s_procInfoPtr[ringPosition] = (PSYSTEM_PROCESS_INFORMATION)
(((char *)s_procInfoPtr[ringPosition]) + s_procInfoPtr[ringPosition]->RelativeOffset);
GetParentProcessInfo(s_procInfoPtr[ringPosition]->ProcessId, &parentProcessID, processName);
}
else
{
        s_procInfoPtr[ringPosition] = NULL;
        continue;
}
}
}
```

Figure 10:
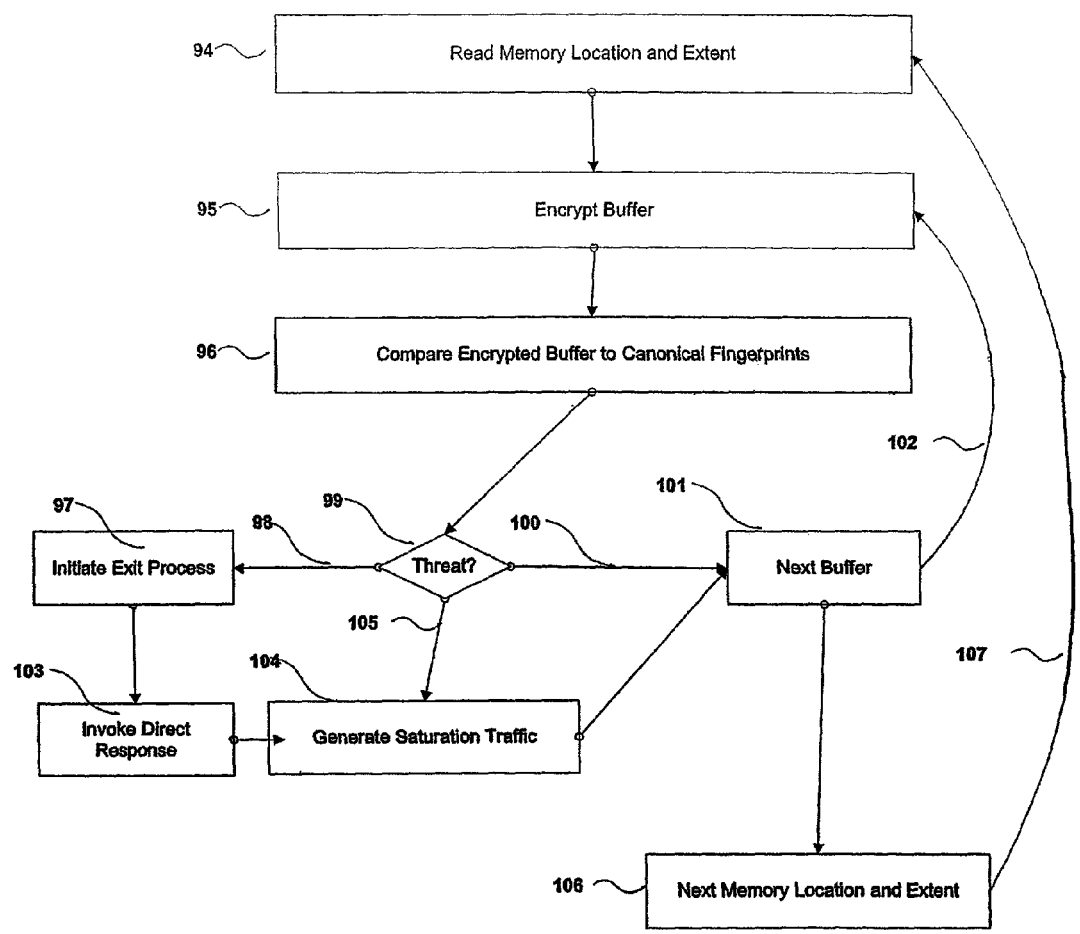
FIG. 10 is a flow diagram of the detection of the execution of other, more stealthy intrusion-threat programs, in accordance with the present invention.

FIG. 10 is a flow diagram of a system and method for the detection of the execution of currently running, system-taskbar-resident threat programs. As in FIG. 9 above, areas of memory may be bit-compared for a match to known patterns of known threat entities. As shown in step 94, the memory location to be so analyzed is read and encrypted 95. This encrypted buffer is compared to a similarly encrypted buffer of canonical, or known, fingerprint data items 96. This comparison is preferably done in encrypted form so that it is not readily apparent to an observer process as to which exact data items are being compared. A determination is made by the system as to whether the comparison 96 yielded evidence of a threat or not 99. If not 100 then the next buffer is read 101 and compared via the same process 95, 96 until a point at which, if no threats are found, discerned or detected, the next such memory location 106 is selected and the process repeats 94. This continues until all desired memory has been scanned and then may optionally be repeated infinitely throughout the execution process. In the event that a threat is tested 99 and found 98, an exit and/or defensive process is initiated 97, and a direct response 103 may optionally be invoked. The alternative process described below with reference to FIG. 11 is an even more powerful improvement on this memory protection scanning process in which the presence of very subtle tools and environments, even very well emulated or virtual environments, can be detected.

In an illustrative embodiment of this aspect of the present invention, the process scans memory for threats but does so not by a system-wide scan of all memory, but rather by examining the operational items in the operating system's Taskbar. As the taskbar usually represents applications launched by the user, such tools as debuggers and logging tools will certainly be among them if launched. Even more subtle tools such as ICE tools may have processes that have display windows and these windows can be found and then the eventual-creation or ownership of these windows traced back to the original threat-source. In another embodiment, the process of this aspect of the present invention further controls user access to Ads any launched applications on the system during this time, minimizes any and all open windows it finds, and disables any ability of the user to restore them from a minimized state until desired by the process. No hacker tool, the signature of which is known, will survive this process, nor will any such program already run be useful before it is killed because it is, for example, minimized and locked from user keyboard and mouse access. Note that the order of the tasks is not critical; they may be done in any of a number of orders, or in parallel.

Top level windows currently being displayed are enumerated. Their position and current state (size, etc) are recorded for later use when they are restored to that state. The windows are all minimized, and the minimize/maximize box is removed from all windows enumerated so that even if the user is able to click on them, they cannot be re-maximized. All sizing and scrolling controls are removed from all windows. It is then determined if each such enumerated window should be added to the list of processes to later be scanned in more detail (for example is it a VISIBLE window or an invisible dummy window with no user utility as some applications use merely to have a hook to the desktop window for other purposes). The system process tree is evaluated to determine the name and memory location of any and all processes that may own any of these enumerated windows or that may have any relationship to any of these windows (for example by inheritance, or by having a common handle context, or by any other means discernable). All memory associated with the windows or related discerned system tasks are examined to search for memory patterns or signatures of known threats. The operating system window caption is searched for a match to known threat window captions. If any threat is detected, action is taken (as with many of the processes specified herein, no particular action is mandated; however it is likely that the actions will include but not be limited to some or all of: exiting the protected entity, killing the threat window, and or notifying the system or user of the threat presence. When this detection is complete, the system remains in the locked down state until the protection task is deemed to be finished and it is deemed safe to allow access to all such windows. The same protective operations are performed on any new window that is spawned, and the protection operations are re-executed optionally at intervals against all enumerable windows and related system tasks to ensure that no subversion processes evade the detection system. Then, when the need to protect the system is no longer relevant, all windows are restored to their prior settings, and all window controls are restored.

Figure 11:
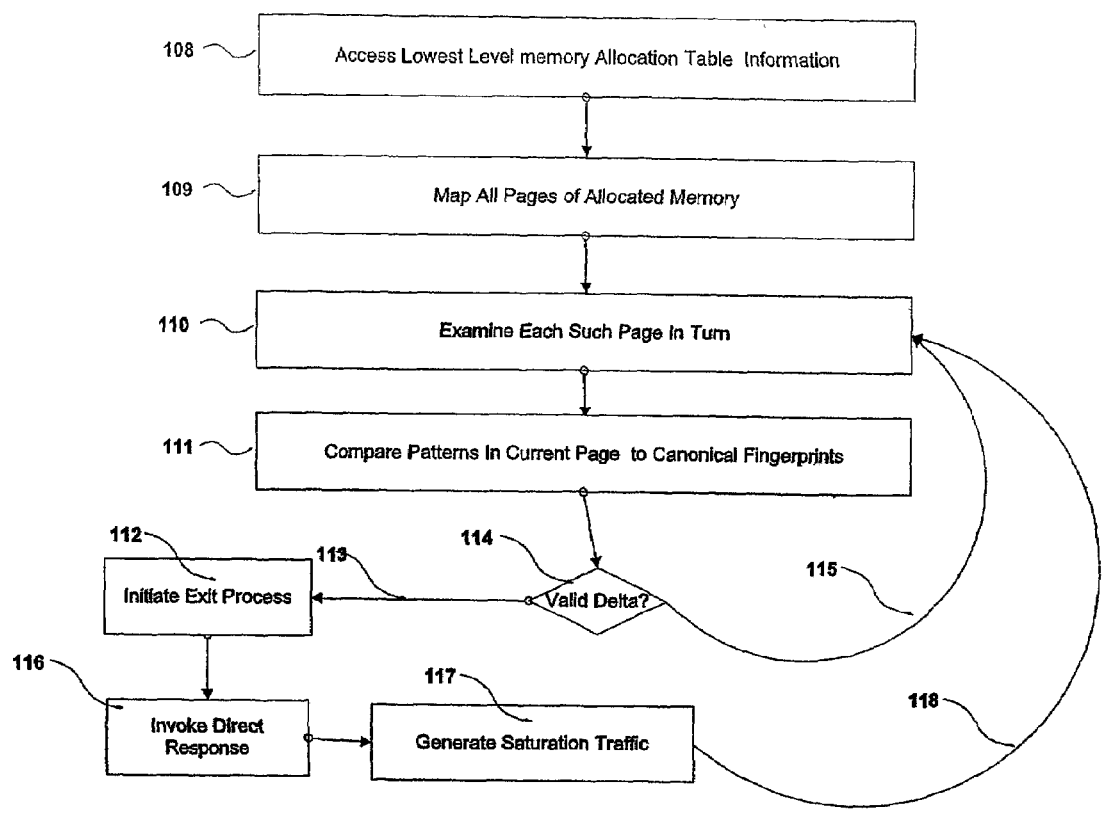
FIG. 11 is a flow diagram of the detection of the presence of broad classes of security threat tools and systems by memory table partitioning and contents analysis, in accordance with the present invention.

FIG. 11 is a flow diagram of a process and system for the detection of broad classes of security threat tools and systems by memory table partitioning and contents analysis. In contrast with the approach described above with respect to FIG. 10, which attempts to work backward from the known windows displayed on the system to their likely associated system tasks, or the approach described in FIG. 9 which scans all of memory looking for pattern matching of memory contents in terms of data with identical sections of bits, the approach of FIG. 11 takes a lower-level approach and scans all of system memory, optionally in a repeated cyclical fashion, seeking the partitioning signatures (for example, the amount of memory the item uses, in what allocations, with what sort of pattern of allocation and usage, with less regard for content of the memory and more regard for the "shape" of the memory usage) of known threats and classes of threats across all system memory and all system memory allocation recording locations. Certain classes of entities such as virtual machines may have very low level memory allocation and page descriptor table signatures which may be recognized.

With reference to FIG. 11, the lowest level memory allocation table information stored in system memory or in system configuration files on disk or through system interfaces are accessed 108, and all current memory page's allocations are examined 109 and mapped, in such a manner that all of the low-level settings that control the memory pagination for each such page are also examined 110. Note that in current computing devices, at some level, each page, and each attribute possible to each page, are represented in memory by single bits, or combinations of small numbers of such bits, and that certain threat entities have specific types of such bit signatures in the way they allocate certain pages of memory upon their startup, or upon the system's startup, with the signatures present. For instance certain in-circuit emulator and machine emulator tools have specific memory allocation signatures in their initial memory pages and/or among their last memory pages. All such patterns are compared to canonical or known patterns for known threats 111, and a decision is made 114 by the system as to whether a threat, possibly a very well hidden and subtle threat, is present 113 or is not present 115. If such a threat is not present 115 then the next such page is examined in turn 110 until all pages are examined. If such a threat is indeed deemed to be present 113, then an exit or defensive process 112 may be initiated, a direct response may be invoked 116, and saturation 117 (see also FIG. 12) or other overt countermeasures may be initiated. Following any or all of these responses to the threat, the next such page is examined in turn 110, until all pages are examined.

As shown in FIG. 11 and embodied in this aspect of the invention, the following example demonstrates the detection of one class of virtual machine products. Each available system register or similar low level construct is forcibly loaded with bit level representations of memory page allocation, and examined in turn, with a known pattern of allocations for a specific threat tool and compared against the bit values found there. Each such threat is compared with the contents of each such register. The principal is that individual bits in a register may in some cases be abstracted representations of the disposition of a page of memory (pages discussed elsewhere in this document) and a pattern of 1's and 0's in a register may represent the absolute and or relative disposition and allocation of a number of memory pages. Thus, if a specific threat product had a known pattern of allocating three contiguous pages of memory of the first five pages of memory in the system, then a pattern of 11100 or 01110 or 00111 in a register whose contents had been previously loaded with the bits representing the page allocations of the first five pages of memory in a system would be a suspicious indicator of such a threat. Thus such an embodiment may be implemented by the following logic: a) save the contents of the register for later restoration; b) copy the bit patterns representing the memory allocation of the first N pages of memory into that register (where N is the maximum number of bits-representing-pages that can be fit in the register); c) perform an XOR (exclusive OR operation) against that register with a mask that is comprised of the pattern of a known threat, or is comprised of multiple such patterns previously logically ANDed together; d) if a match occurs this is a strong indication of a threat (depending on how unique the mask is believed to be, which, in turn, depends on the nature of the typical page allocation of the threat; e) the remainder of memory allocation bits for the remainder of system memory may be compared in the same manner and further suspicions logged (this is not necessarily an ordinal next step, as it may be appropriate for the system to scan memory content to confirm any of the earlier suspicious allocation matches; f) multiple suspicious matches increase the likelihood of the threat being real rather than perceived.

Figure 12:
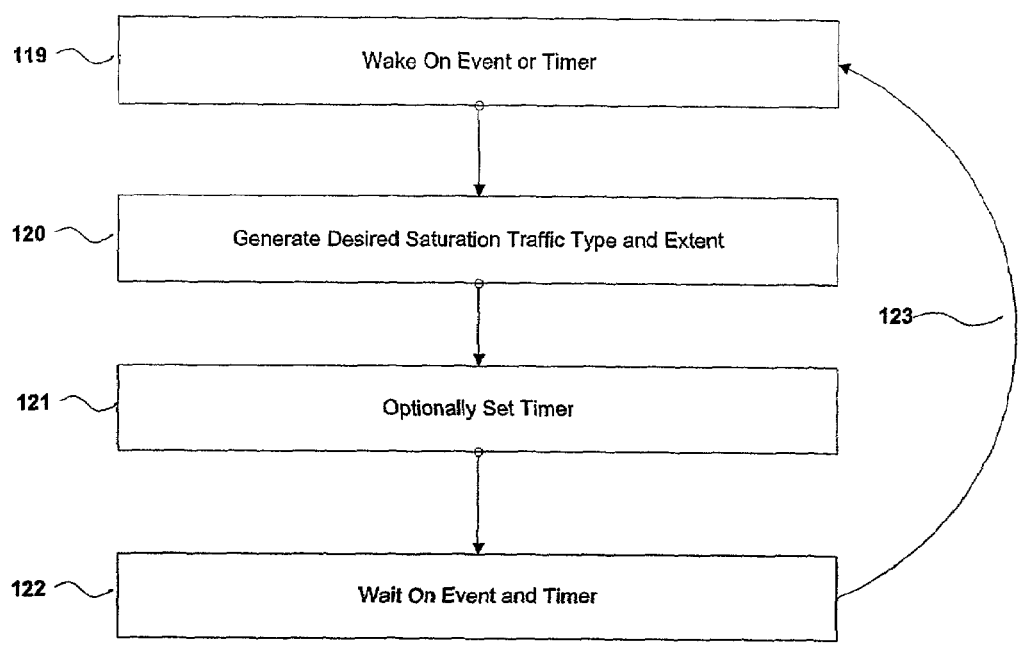
FIG. 12 is a flow diagram of a system and method that provide a system service that can produce desired volumes of desired classes of logging and journaling saturation traffic, in accordance with the present invention.

FIG. 12 is a flow diagram of a system and process for providing a system service that can produce desired volumes of desired classes of logging and journaling saturation traffic, as disclosed in U.S. patent application Ser. No. 09/960,610, filed Sep. 21, 2001, and U.S. patent application Ser. No. 09/989,910, filed Nov. 20, 2001, the contents of each being incorporated herein by reference. A system event or timer is used as an event trigger 119, and upon awakening or being triggered by any appropriate event, the saturation process selects the desired type of saturation traffic (the type may be provided as a parameter and consumed upon the event of awakening, for example) and the desired extent, or amount, of such saturation. In a preferred embodiment, the generated traffic consists of many different kinds of legitimate-appearing, but pointless, activity, and the saturation effect is produced by the effect that this activity has on various classes of debugging and system monitoring tools, which, in turn, attempt to generate reports and provide insights into system activity. In the embodiment of FIG. 12, the saturation is throttled or gated by a sleep/wake mechanism which allows for a desired amount of activity per waking cycle 120, and then generates the desired amount and type of such traffic. Upon completion, the inventive process optionally sets a timer to be awakened upon in the absence of triggering events 121, and then an event-driven wait upon that timer and any other desired system event is performed 122 until the next such event triggers another saturation cycle 119. In one embodiment, the parametric values for each waking cycle may be queued and consumed in order with each such cycle, or may be determined by other means, including, but not limited to, pure or pseudo randomization, configuration file information, or an external input, for example.

As shown in FIG. 12 and embodied in this invention, the following are illustrative examples of various mechanisms that generate system traffic or have system effects which in turn can reduce the effectiveness of, or saturate, the logging and monitoring abilities of debugging tools and logging tools. Such methods may include, but are not limited to, the following methods, and may be used in combination or individually, in series or in parallel. One such approach is to produce system saturation through excessive system calling using system call interface routines, such as interfaces that provide system configuration information or system time information. Another such approach provides saturation through excessive file system usage, such as creation, open, close, read, write, delete and delete file operations on files that are not actually needed by the system. Another such approach provides saturation through excessive paging in memory, to overrun the page tracking abilities of most debuggers, this can be invoked by jumping between locations, each of which are more than the size of a memory page apart, and spread across multiple pages such that the page cache of a debugger may be exceeded and the ability to extract history or trend data from the logging of such operations is rendered less effective. In another embodiment, saturation is achieved through excessive system register and primitive function usage (like bitwise shifting and rotation, and low-level bit-oriented logical operations like mask anding and or-ing). Saturation through excessive number generation is also useful, and may be achieved by excessive use of system random number generation functions and or mathematical functions such as Sin, Cos, Tan, etc. Another such is saturation through excessive Windows, or other operating system, registry manipulation, such as registry key or subtree enumeration, creation, deletion, as well as read and write operations on individual elements. Many logging tools track registry access in detail because in some cases it can reveal significant aspects of system usage. This approach obfuscates such actual usage by burying it in a sea of false-usage patterns. Another approach is that of saturation by misleading; loading and later using system calls, for example, to system standard encryption routines not actually or necessarily used for any real purpose in this system. One such saturation approach is to saturate the ASPI layer, obscuring any valid access to these devices in a mass of invalid or irrelevant accesses. These invention mechanisms create a large amount of traffic on the same bus as any many storage devices reside upon, which can make it very difficult for an observer to discern which I/O data on the bus are relevant.

Figure 13:
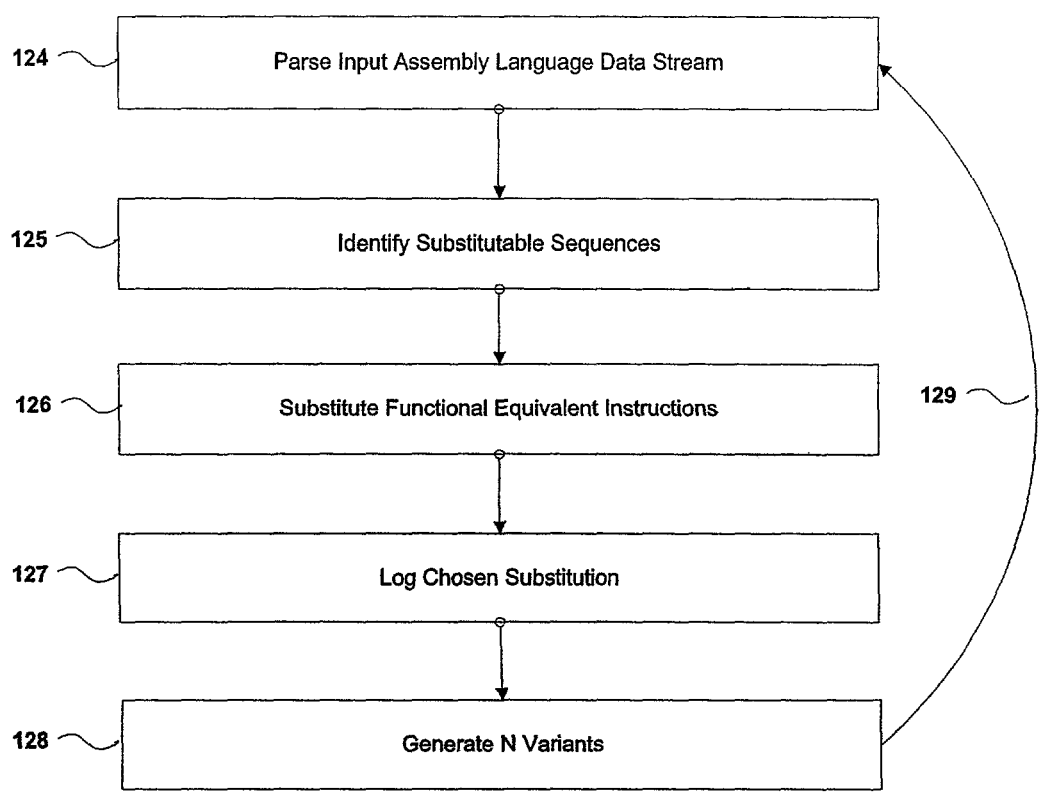
FIG. 13 is a flow diagram of the enhancement of the security of arbitrary executable content by substituting variably synonymous instructions of varying degrees of complexity and efficiency, making such code more difficult to search, debug and disassemble, in accordance with the present invention.

FIG. 13 is a flow diagram of a system and method that enhance the security of arbitrary executable content by substituting variably synonymous instructions of varying degrees of complexity and efficiency, making such code more difficult to search, debug, visually comprehend, and disassemble. Any assembly language stream (or high level language such as C) may be consumed 124 by this approach and parsed; the syntax, lexicon, and logical flow understood as needed in order to divide the stream up into functional components. The most effective results in the approach are likely to be achieved by performing such substitutions on assembly language code.

In one example, the system and method of this aspect focus on synonymous replacement of comparison operations where equality, greater than, or lesser than, qualities are tested, and each are broken out as functional unit of "equality testing". Appropriate substitution sequences of logical equivalence are selected 125, for example an equivalence test of "If A=B" could be converted to the logical equivalent "C=A−B" combined with "If(NOT(C))" where the Boolean value 0 for false, 1 for true is assumed implicitly. One such sequence is selected and the substitution 126 is performed. This function can optionally be performed in assembly language, or as a compiler plug-in, or as a higher-level language substitution or macro-substitution. The chosen substitution is logged 127 against future conversions of the same logical construct so that if repetition is not desired, and if variability within releases and between releases is desired, it can be attained by establishing substitution rules that prohibit the same substitution occurring on the next similar construct. The next such set of instructions are parsed 124 and the process continues until all of the input has been processed.

In an approach exemplified below, modifications are made to the assembly language of a program so that it is more difficult to disassemble. A number of variations of this approach are possible 128. For example, "jmp" or Jump commands that are not used by the normal logical flow of the code can be added. Alternatively, the jump call can be replaced by a sequence with a synonymous outcome, such as a push followed by a return.

This line of assembly language is auto disassembly prone (weak):
  stmt JUMP2V(addrjmp) "\tjmp\t%0\n" 3

This line of assembly language is auto disassembly resistant (stronger):
  stmt: JUMPV(addrjmp) "\tpushl\t$%0\n\tret\n" 3

Alternatively, a jump command can place execution flow into the middle of an instruction:

```
/* Output the anti-disassembly code   */
/* Based on the following code        */
/*"mov ax,0FF05h "                    */
/*"jmp short $-2h "                   */
/*"mov ax,0FFFFh "                    */
/*"jmp short $-07eh "                 */
{
    unsigned char randomBytes[10];
    int i;
    char buf[100];
    for (i=0;i<4;i++) {
        randomBytes[i] = rand( ) % 256;
    }
    sprintf(buf, "\t.byte 0x66, 0xb8, 0x05, 0x%.2x\n",
    randomBytes[0]); /* mov */
    print(buf);
    sprintf(buf, "\t.byte 0xeb, 0xfc\n"); /* jmp */
    print(buf);
    sprintf(buf, "\t.byte 0x66, 0xb8, 0x%.2x, 0x%.2x\n",
    randomBytes[1], randomBytes[2]); /* mov */
    print(buf);
    sprintf(buf, "\t.byte 0xeb, 0x%.2x\n",
    randomBytes[3]);   /* jmp */
    print(buf);
}
```

Figure 15:
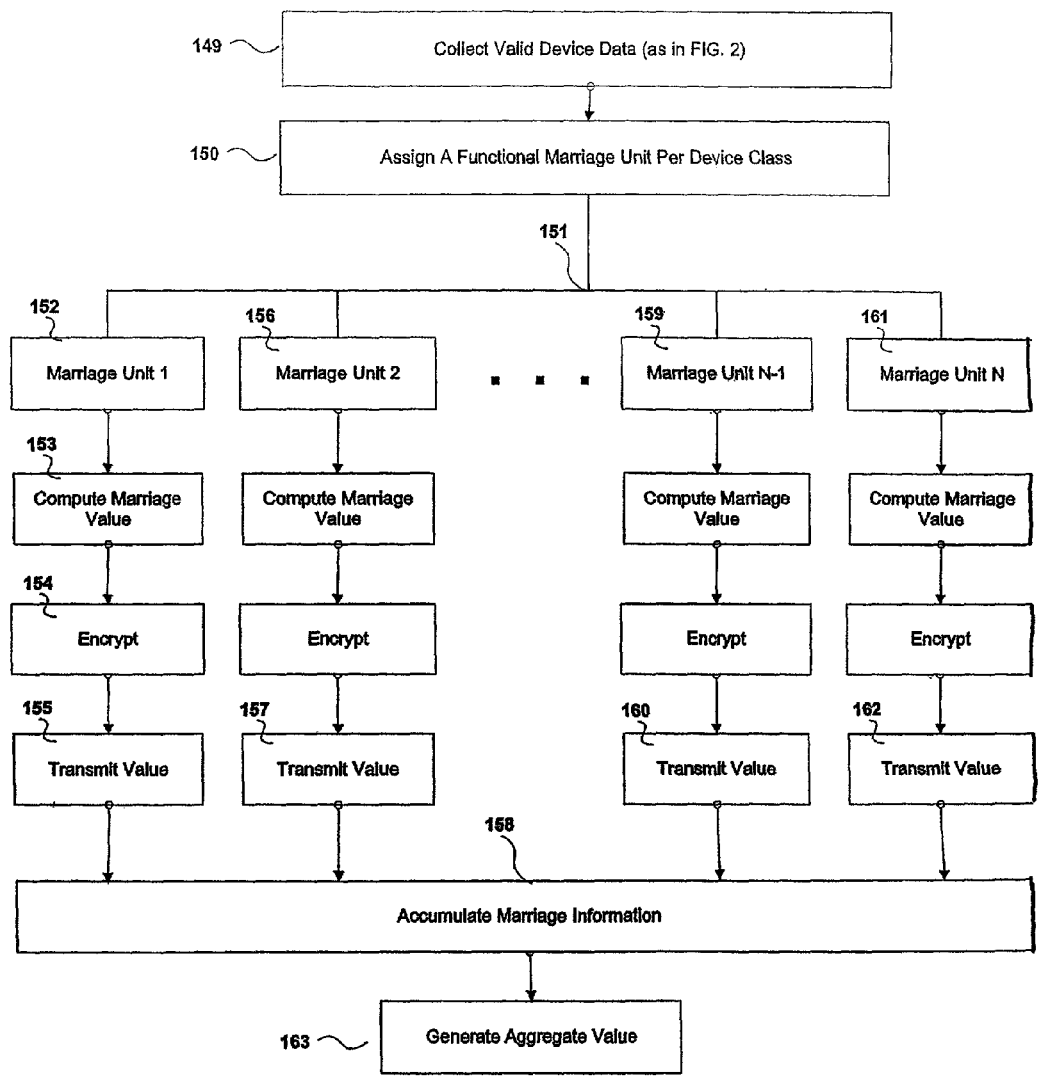
FIG. 15 is a flow diagram of the marriage of digital content to a target machine, by analyzing its component makeup in detail, and which resists being spoofed by virtual or emulated systems or components by validating their authenticity and by performing diverse measurements under cryptographic and other security umbrellas, in accordance with the present invention.

FIG. 15 is flow diagram of a system and method that marry certain key elements of a protected unit of digital content to a target computing device or similar machine, by analyzing the target computing device's configuration and component makeup in detail. This approach resists being compromised by virtual or emulated systems or components by validating their authenticity and by replicating this function throughout the protective system and requiring inter-component communication to perform diverse combinatorial authentication measurements under cryptographic and other security umbrellas. As in FIG. 2, system devices are enumerated and verified as being real or virtual. Virtual devices are not considered for the purposes of this aspect of the invention and may, in fact, cause an exit or defensive response if and when detected. If, however, the enumerated devices are all determined to be actual devices, the known characteristics of some or all of them may be employed to create a binding tie between digital content and the target system.

Preliminary device data is collected, comprising a complete enumeration and list of all real devices on the system 149 and an individual entity, for example, one per device, is spawned for each device 150. Each such entity 152, 156, 159, 161 is an identical embodiment of the present process and system that utilize the attributes of the target hardware device 152 such as firmware version, memory capacity, configuration strings, cpu clock speed, bus speed, and any all other device-related values that can vary by and between devices, to generate a whole or partial value to be later used by the system 153. That value is encrypted for transmission 154 and then transmitted (for example via a messaging system as depicted in FIG. 3) 155, 157, 160, 162 to an aggregator of such data, until all, or a sufficient amount, of such information is collected, decrypted, and combined 158 into an aggregate value 163, which may then be used by other components of the system as a partial or complete encryption or decryption key for digital content, such that any such content could only be decrypted by such key generation occurring on the same system with the same collection of physical devices configured.

The following example illustrates the principles of this aspect of the invention in an embodiment that matches the components interfacing with the system's PCI bus to the content in such a way that the content is bound to the aggregate values resulting from the detailed examination of these devices. In this example, the hardware examination process in intended to yield a numeric value of 64 bits (any number of bits may be used in the actual implementation, depending on the application) by examining multiple devices on the PCI bus. Note that any system bus service may be examined (SCSI, USB, 1394 FireWire, and others); however, PCI is a suitable example since most readers are familiar with the PCI bus found in their own computers and the cards typically found on that bus. In the case of this example, the 64 bit value will be arrived at by finding a number of cards or devices on the bus and having the examination of these cards or devices yield separate values of some number of bits each. The number of bits per component in this example is dependent upon how many devices are discovered on the bus and how many total bits the desired aggregate multi-device result is desired to be. The devices on the PCI bus in this example are enumerated and four are found, so the total number of desired aggregate bits is divided by the number of devices. A value of 16 bits is therefore derived from each of the four devices. Each device is examined in detail, in turn, either by the same "marriage" entity or by a device-specific "marriage" entity dispatched per device. In the case where a specific entity is dispatched per device, each such entity may be armed with a unique encryption key known only to the dispatching entity and the individual marriage entity which may serve afterwards as an aggregator of the arrived at values per device. Each such PCI device 14 in turn is examined in detail, the examination, for example, taking the form of several levels of data gathering. Much of the data is gathered from the device's configuration read only memory, which may be shadowed or stored in structures associated with the PCI bus. At the first level of data gathering, the device's class, subclass, type (for example sound card) and vendor (for example "Creative Labs") are recorded. At a deeper level of data gathering, numeric details such as the device's bus latency, total memory, memory speed, device processor family and speed (if any), and other factual information about the device are gathered. During this process, bus device validity analysis as per the embodiments described above with respect to FIG. 2, FIG. 14, and FIG. 3 is performed to ensure that the device is real and not emulated. If emulated, the marriage routine(s) may optionally initiate a defensive response or execute a defensive exit as discussed elsewhere in this document. Once all of the data related to a device is gathered, the data is manipulated by the marriage entity such that it is converted into, in the case of this example, a 16-bit numeric value.

Such manipulation can take the form of converting the individual values reported back to 16-bit segments and performing logical operations on them, for example ANDing and or OR-ing them together to create an aggregate 16-bit value that uniquely represents the analyzed discovered PCI bus device/card. Any set of operations may be performed as desired to create this value, so long as the process produces repeatable values when provided with the same inputs. Even a simple conversion to ASCII and then addition of all the values as their numeric ASCII table equivalents, modulo the largest possible 16-bit number would be a viable approach in this regard. Each such PCI card in turn is analyzed and the related attributes are rendered down into a 16-bit value in this fashion.

The resulting four 16-bit values are then concatenated, either by the monolithic marriage entity in the case of a monolithic approach, or by the dispatching entity after being decrypted by the dispatching entity on a per marriage-entity-key basis. Alternatively the final 64-bit value represented in this example may be arrived at by having each such examined device produce an output value of 64 bits, and all four of these values may be aggregated into an aggregate 64-bit value by means of, for example, logical operations such as AND and OR. This 64 bit value may be deemed to be the "marriage value" for the system and may be considered reasonably unique. It may then be used as an encryption/decryption key for any content which is desired to be encrypted in a fashion specific to this target marriage system, based on the principal that the decrypting entity may use the same algorithm to arrive at a decryption key on the fly and successfully decrypt the information. This approach is rendered even more secure by means of is the detection of virtual machines and emulations as discussed above and elsewhere in this document, because such emulated or virtual machines may otherwise be used to spoof such a marriage concept and cause nearly any system (including emulators) to appear to be the specified marriage system. Further, as discussed below, there may be ties to network authentication routines that may themselves provide some of the necessary bits to create the final value, adding 23) an extra layer of security and some ability to account for content usage on a per-system basis, as desired.

Figure 16:
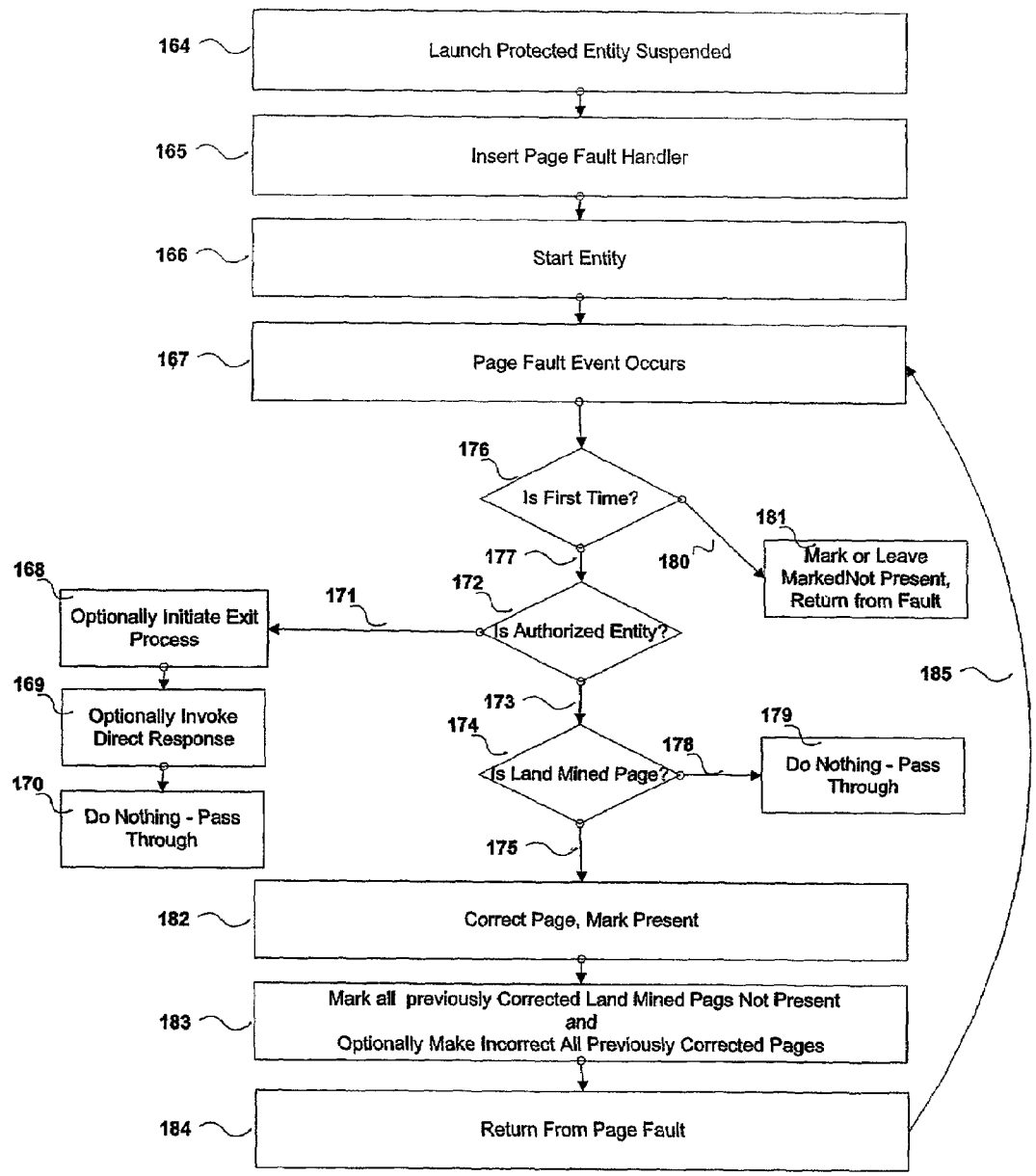
FIG. 16 is a flow diagram of the protection against memory lifting or dumping of digital content and by default poses serious obstacles to its effectiveness, in accordance with the present invention.

FIG. 16 is a flow diagram of a system and method for protecting against memory lifting or dumping of digital content, and in operation, poses serious obstacles to the effectiveness of memory lifting. Any entity that is intended for such protection is to be modified and or pre-processed so that certain key pages are replaced with incorrect, irrelevant, corrupted or garbage content (hereinafter "corrupted" content), and are stored elsewhere outside the entity for later use. The entity is then launched or invoked by this system 164 and is so invoked in a suspended state so that it cannot yet execute its first instruction. A special defensive page fault handler, referred to below as a "custom page fault handler", or "custom handler", is added to the system 165 targeted at certain protected pages of this protected entity. The protected entity is then initiated 166, and its execution and paging process begins.

Paging, or "Page Faulting" is a term used when discussing the behavior of operating systems that use virtual memory, for example Vax/VMS, BSD and System V Unix, Linux, and other operating systems. In the present specification, when page faulting is discussed, the mechanisms referred to in some detail are those of the various Windows operating systems. The concept of a page fault itself is straightforward, even though the mechanics of implementation may be detailed. The operating system creates the external appearance of unlimited memory available to the application, and this "virtually unlimited", or virtual memory, is managed by the operating system in a manner such that the application, when running, thinks it is entirely present in memory. In fact it may not be, but as parts of it are needed in memory the operating system seamlessly provides them just before they're needed. Usually this is done on a page-by-page basis where a page represents an arbitrarily sized allotment of memory. Thus if the available memory was 4 pages and an application consumes 8 pages, only 4 of the pages would fit in memory at any one time. In that case, if pages 1, 2, 3, and 4 are present in memory, and the system requires page 5, and attempts to use page 5, the system at that time experiences a "page fault".

One way in which the page can be known to be not present and therefore worthy of such page fault handling is that each page may have a data structure associated with it, which indicates whether the page's content is present in memory or whether it needs to be paged in by the operating system. This may be referred to as the "page-not-present" bit in some contexts. If page-not-present is true, a request of the page when results in a page fault. In any event, the requesting entity is never made aware the page desired is not present, since a powerful low-level subsystem of the operating system "handles" the fault and provides the page immediately in a manner that makes it appear as though the page had always been present. The system entity that commonly deals with page faults may be referred to as a "page fault handler", and it is well-known how to usurp the role of the page fault handler and replace it temporarily with a custom page fault handler.

Figure 17:
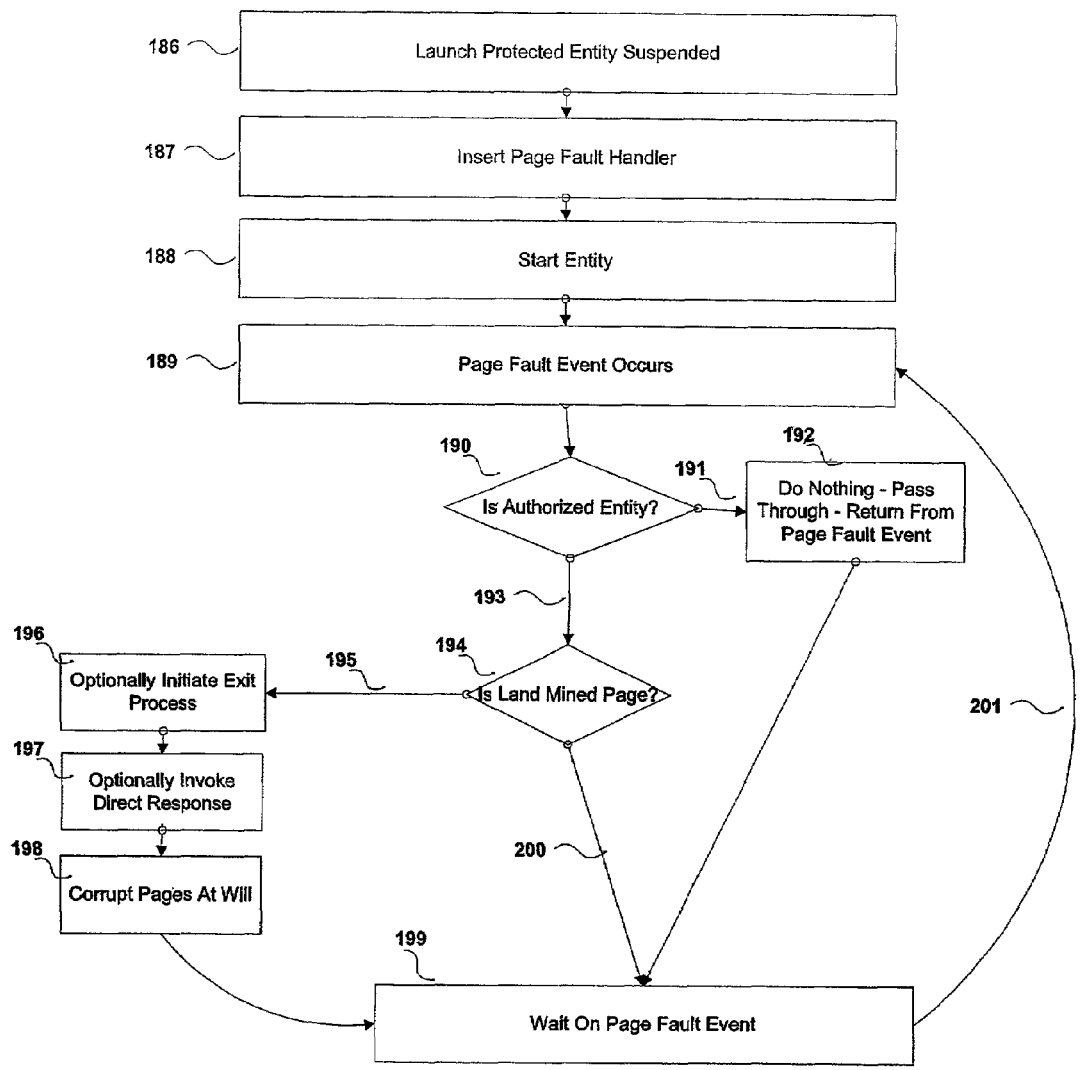
FIG. 17 is a flow diagram of the detection of memory lifting or dumping of digital content and overt disabling of its effectiveness, in accordance with the present invention.

In the present invention of FIGS. 16 and 17, the page fault handler's function is selectively replaced temporarily with a custom handler that implements the system and process of the invention. Thus, when a page fault event occurs 167, the page fault is first handled by the custom defensive handler, and, if the page has faulted for the first time 176, it is assumed to be an initial loading request 180, so the page may not be touched 181 and the corrupted content is not corrected 181 (the not-present mark is allowed to persist). Therefore the page is deemed by the operating system to be not-present and any future access to the page will result in the page fault for that page occurring.

If it is not the first time 177 this page has been faulted upon 176, it is next determined whether the accessing process is an authorized entity or not 172. In this context, the executing program itself is referred to as the authorized entity; for example, if the protected is "foo.exe" and the 345$^{th}$ page of foo.exe had been corrupted as a defensive countermeasure to memory lifting by a subversion device, the only entity for which the custom page fault handler would perform a corruption-removal or correction is the authorized "foo.exe". If the entity is not authorized 171, then the system may optionally initiate a defensive or exit response process 168, may optionally invoke a direct response 169, or may do nothing 170. In all such unauthorized-entity cases the page is not touched and the incorrect, irrelevant, corrupted or garbage content is not corrected 170 (the not-present mark is allowed to persist 170). As explained above, the "not-present" bit or marker or flag indicates that the page is not in memory and any subsequent access to the page will require a successful page fault and in-memory page placement in order to proceed.

If it is determined 172 that the entity is authorized 173 and the requested page is 174 determined to be one which was not pre-processed to be corrupted in content, or not "land mined" (the term "land mined" is used within this document interchangeably with "corrupted", in that a corrupted page will "blow up", or cause a crash, if execution is attempted without the corruption being corrected), then it is not modified, but is marked as present 179 and allowed to pass through to the requesting process. In addition, any previously corrected, and "present"-marked, pages may be made corrupted at this time, and may be marked "not-present" as well at this time. In this manner, the next time the page is requested for access, it will be necessary to invoke a page fault and re-load the page through the mechanism of the custom defensive page fault handler. Following this, the handler compleseets its process and returns.

If, however, it is determined that the requesting entity is authorized 173 and that the page was indeed one which was pre-processed to be corrupted in content 175, then the page is corrected 182 by overwriting it (for example as in FIG. 6) with the stored correct value in a just-in-time manner, immediately before use. In addition, all previously corrected pages may at this time be restored to their corrupted state and marked "not present" 183. The system then returns from the page fault handler 184.

Following is an example illustrating the invention of FIG. 16 in detail. This code example is crafted to match the diagram and description above in a fashion that illustrates the inventive principals, which may be summarized as a just-in-time correction of intentionally corrupted memory on an as-needed basis, followed by a re-corruption immediately after use.

```
int main( )
{
    CreateProcess("E:\\MyApp\\MyApp.exe",
        NULL, NULL,
        NULL, FALSE,
        CREATE_SUSPENDED,
        NULL, NULL,
        &infoStartup,
        &infoProcess));
    // Sends our driver information about the ALLOWED process giving us a way
    // to identify the safe process.
    DriverSendProcInfo( );
    // Inserts a global fault handler and sets us up to use our fault handler if necessary
    DriverSetLandmine( );
    ResumeThread(infoProcess.hThread);
    return 0;
}
```

-continued

```
//////////////////////////////////////////////////////////////////
//This is where we insert our fault handler. Invoked by app level
// DriverSetLandmine( ) call.
static void SetLM(
//
//
//
)
{
  // Hook interrupt 14 (Page-Fault Exception) and set our function, OnPMException
  // to be called on an occurrence of int14.
  Assert((pPMPrev = Hook_PM_Fault(14, OnPMException,&PMThunk)) !=(PVOID)-1);
  return;
}
//////////////////////////////////////////////////////////////////
//Exception Handler Routines that get hooked into the front of chain
//using the Hook_PM_Fault.
//Exception Handler called when Specified Exception Occurs.
//
PVOID_stdcall OnPMException(
//
//
//
  VMHANDLE hVM,
  PCLIENT_STRUCT pcrs
)
{
  DWORD*      pCtxt;
  DWORD*      pPdb;
  //******GET the Current Context******************
  //This we compare with the process information that we passed to the driver
  //from our app level code with DriverSendProcInfo( ). This is how we will know
  //if we should consider this an Authorized entity or not below.
  _asm    pushfd
  VWIN32_GetCurrentProcessHandle( ),
  _asm    mov    esi,eax
  _asm    mov    pPdb, esi
  // pointer to context member in Process Database struct
  _asm    mov    EAX,DWORD PTR [esi+1Ch]
  _asm    mov    pCtxt,eax
  _asm    popfd
  // This is the decision point where we decide if we are going to handle the
  // exception and fix up the page or just pass it down to the next handler
  // for normal system processing.
  // This decision is based on the following:
  // A) By comparing the process info obtained earlier with the current
  //    faulting process information.
  // B) Checking the linear page location of the faulting instruction to see if it is in the
  //    list of landmined pages.
  // C) If (A) and (B) hold true, checking if this is the first fault on the landmined page (caused by
  //    the act of the system paging in the application which we will ignore) or if it is a
  //    subsequent access request from an authorized process
  // findPageInList( ) function searches though a stored set of pages structure that holds
  // info on landmined pages to see if the page exists in
  if ( ((DWORD)pPdb == dwpidLmApp) && findPageInList(pcrs->CRS.Client_ESI) )
  {
    // Check if this is the first fault or not for the page
    if(!isFirstFault(pcrs->CRS.Client_ESI))
    {
      OurFaultHandler( );
    }
    else
    {
      // Mark the page in the list as having faulted one time
      // and return null so the system does not page it in
      MarkFirstFault(pcrs->CRS.Client_ESI);
    }
    //Mark as handled by returning NULL
    return NULL;
  }
  return pPMPrev;
} // End OnPMException( )
//////////////////////////////////////////////////////////////////
//
//
```

-continued

```
static void OurFaultHandler(
//
//
//
)
{
  DWORD dwPage;
  // We need to handle the fault and restart the instruction
  // load the page addr into the pte and reset the present flag
  // Set the 3rd bit user/supervisor
  pDwPteBase[dwPteIndex]= 0x1;
  // Write good stuff to the page
  fixPageInMemory(pDwPteBase[dwPteIndex]);
  // Make sure the present bits are cleared from landmined pages so we trigger faults and
  // can make the decision of fixing or passing through to the system handler.
  // Note: The current page being fixed must still have its present bit set.
  removePresentAttributes(pDwPteBase[dwPteIndex] );
  // Make sure that we corrupt the previously fixed up page
  corruptPrevPage(s_dwPrevPage);
  // We need to invalidate the current page_table entry in the TLB (transition Lookaside Buffer)
  // to invalidate a specific PTE use the INVLPG instruction
  __asm
  {
    //We need to invalidate the TLB to clear buffer cache
    //we can reload the cr3 register to clear the entire buffer
    //another method is to use the INVLPG mem instruction
    push eax;
    mov eax, cr3;
    mov cr3, eax;
    pop eax;
  }
  //__asm invlpg dwPage;
  return;
} //      End OurFaultHandler( )
```

FIG. 17 is a flow diagram of a system and process that protect against memory lifting or dumping of digital content and pose serious obstacles to the effectiveness of memory lifting. This approach provides for just-in-time corruption of digital content as it is processed, in the event that it is determined that a subversive process is operating in the system. The intended protected entity is launched or invoked by this system 186 and is so invoked in a suspended state so that it cannot yet execute its first instruction. A customized and defensive page fault handler is added to the system 187, targeted at certain protected pages of the protected digital content. The protected entity is then started 188 and its execution and paging process begins. When a page fault event occurs 189, in the case where the system desired to read or execute a page from memory that was not currently present in memory, the page fault is first handled by the defensive handler, and it is examined to determine whether the accessing process is an authorized entity 190.

If the requesting entity is authorized, then the customized page fault handler does nothing and returns from the fault 192, allowing the standard paging handlers to access the page for the requesting entity as needed. If it is not an authorized entity and is not a targeted "land mined" page for monitoring 200, then the system does nothing and returns from the fault allowing the standard paging handlers to access the page for the requesting entity as needed.

If the requesting entity is not authorized, and if the page is in fact a targeted page for monitoring 195, then a defensive and or exit response may be invoked 196, a direct response may be invoked 197, or pages as yet untouched by the unauthorized process may be rendered incorrect, irrelevant, corrupted or garbage in content in advance of any future contact so as to make any unauthorized access (such as a memory dump or lift in progress), when detected, actively trigger destruction of critical data before lifting can occur to all pages.

In other words, given the example from the previous section of this document of an 8-page executable foo.exe, of which some pages are in memory, when an unauthorized entity touches any of the in-memory pages, or causes a page fault on any not present pages, a defensive response occurs. Assume, for example, that pages, 2, and 4 are in memory, and a memory lifting tool begins to lift the executable code. It may successfully copy page 1 and 2 because they are present in memory and are not corrupted. However, when the memory lifter tries to touch page 3, page 3 is not present, a page fault occurs, and the defensive page fault handler of FIG. 17, upon page fault invocation, determines the entity is a) not the executing foo.exe; or b) a known threat tool (such as by examining the in-memory signature or other attribute as discussed elsewhere in this invention document with respect to defensive mechanisms). Page 3 is permitted to be paged in; however, it is corrupted in the process 198. The defensive handler may also choose to corrupt page 4 in memory and may choose to corrupt and subsequent pages as they are paged into memory. In this manner, the memory lift captures 6 of the 8 pages in a corrupt/broken/land-mined state, in which any attempt to execute is guaranteed to produce results (such as crashing the foo.exe or even the operating system) that are not desired.

Following is a code example illustrating the invention of FIG. 17 in detail. This code example is crafted to match the diagram and description above in a fashion that illustrates the inventive principals, which may be summarized as a just-in-time corruption of digital content stored in memory on an as-needed basis, following any detected attempts at tampering or lifting.

```
int main( )
{
    CreateProcess("E:\\MyApp\\MyApp.exe",
            NULL, NULL,
            NULL, FALSE,
            CREATE_SUSPENDED,
            NULL, NULL,
            &infoStartup,
            &infoProcess));
    // Sends our driver information about the ALLOWED process giving us a way
    // to identify the safe process.
    DriverSendProcInfo( );
    // Inserts a global fault handler and sets us up to use our fault handler if necessary
    DriverSetLandmine( );
    ResumeThread(infoProcess.hThread);
    return 0;
}
/////////////////////////////////////////////////////////////////////////////////
//This is where we will insert our fault handler   Invoked by app level
// DriverSetLandmine( ) call.
static void SetLM(
//
//
//
)
{
    // Hook interrupt 14 (Page-Fault Exception) and set our function, OnPMException
    // to be called on an occurrence of int14.
    Assert((pPMPrev = Hook_PM_Fault( 14, OnPMException,&PMThunk)) !=(PVOID) −1);
    return;
}
/////////////////////////////////////////////////////////////////////////////////
//Exception Handler Routines that get hooked into the front of chain
//using the Hook_PM_Fault.
//Exception Handler called when Specified Exception Occurs.
//
PVOID_stdcall OnPMException(
//
//
//
    VMHANDLE hVM,
    PCLIENT_STRUCT pcrs
)
{
    DWORD*      pCtxt;
    DWORD*      pPdb;
    //****** GET the Current Context******************
    //This will be compare with the process information that we passed to the driver
    //from our app level code with DriverSendProcInfo( ). This is how we will know
    //if we should consider this an Authorized entity or not below.
    _asm    pushfd
    VWIN32_GetCurrentProcessHandle( );
    _asm    mov     esi,eax
    _asm    mov     pPdb, esi
    // pointer to context member in Process Database struct
    _asm    mov     EAX,DWORD PTR [esi+1Ch]
    _asm    mov     pCtxt,eax
    _asm popfd
    // Now we want to check if there is an unauthorized process attempting to access one
    // of our landmined pages in the high linear address range.
    if ( ((DWORD)pPdb !=dwpidLmApp) && findPageInList(pcrs->CRS.Client_ESI) )
    {
        // Lets initiate the memory intrusion respone by handling this fault
        // ourselves
        OurFaultHandler( );
        // Mark as handled by returning NULL
        return NULL;
    }
    // We made it here so our process is accessing our pages in memory, we will
    // continue normally by passing on to the system fault handler
    return pPMPrev;
}   // End OnPMException( )
/////////////////////////////////////////////////////////////////////////////////
//
//
```

-continued

```
static void OurFaultHandler(
//
//
//
)
{
    DWORD dwPage;
    // We need to handle the fault and restart the instruction
    // load the page addr into the pte and reset the present flag
    // Set the 3rd bit user/supervisor
    pDwPteBase[dwPteIndex] |= 0x1;
    // Make sure the present bits are cleared from landmined pages so we trigger faults and
    // can make the decision of fixing or passing through to the system handler.
    // Note: The current page being fixed must still have its present bit set.
    removePresentAttributes(pDwPteBase[dwPteIndex]);
    // Now we have the choice to corrupt pages in our memory, to exit quietly, or to
    // change small amounts of data so the durning application will successfully dump
    // our process, but it will be rendered useless.
    InvokeResponse( );
    // We need to invalidate the current page_table entry in the TLB (transition Lookaside Buffer)
    // to invalidate a specific PTE use the INVLPG instruction
    __asm
    {
        //We need to invalidate the TLB to clear buffer cache
        //we can reload the cr3 register to clear the entire buffer
        //another method is to use the INVLPG mem instruction
        push eax;
        mov eax, cr3;
        mov cr3, eax;
        pop eax;
    }
    //__asm invlpg  dwPage;
    return;
}   //   End OurFaultHandler( )
```

Figure 18:
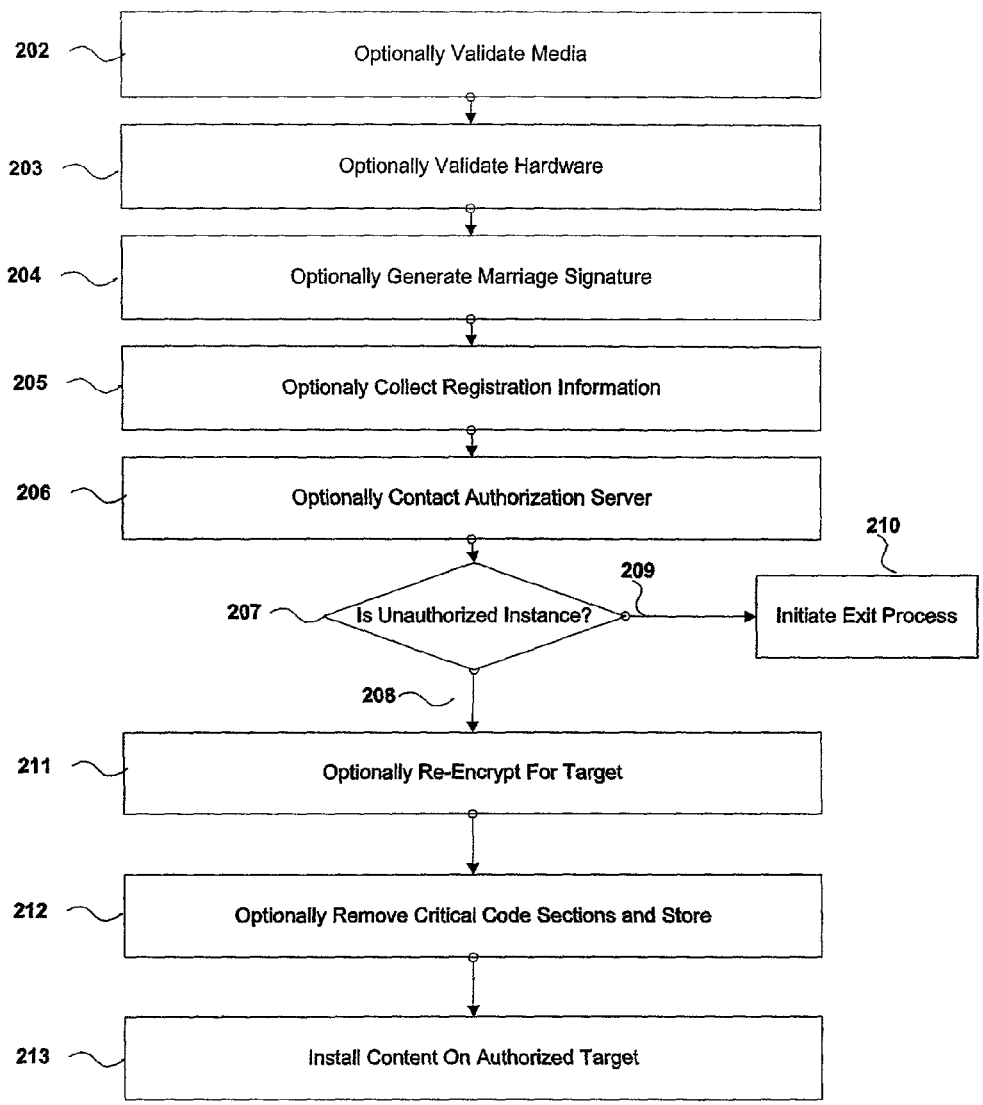
FIG. 18 is a flow diagram of a system and method that combine the approaches described herein into a client-side system that serves to enable secure installation of digital content, in accordance with the present invention.

FIG. 18 is a flow diagram of a system and method that combine many of the aforementioned techniques into a client-side system that serves to enable secure installation of digital content. This system supports all models, from single-user-single-disc to broad-site license models. Digital content may be delivered, for example, over a network or on hard media. If on hard media, the content may authenticate the media as a valid original installation medium 202, for example according to the techniques described in U.S. patent application Ser. No. 10/062,400, filed Feb. 1, 2002, the contents of which are incorporated herein by reference. Otherwise if the installation medium is a network 202, this transaction may be validated by network means as described in U.S. patent application Ser. No. 09/960,610, filed Sep. 21, 2001, and U.S. patent application Ser. No. 09/989,910, filed Nov. 20, 2001, each incorporated herein by reference above. Optionally the system's hardware may also be validated (as in FIG. 2 and FIG. 14) 203 and a marriage signature 204 may also be optionally generated (as in FIG. 15). The user may optionally be queried for registration information which may be collected by the system 205. An optional network connection may be initiated to a secure server 206 and a determination made 207 based on the combined validation results of any or all of the media test, hardware validations, marriage signature, and or registration information items. This authentication process may result in a determination of a non-authorized instance 209 of the installation or initial use of this digital content, and an exit and or defensive process 210 may be initiated. Alternatively, this initial usage or installation instance of this item of digital content may be authorized 208 and the usage may result in the optional encryption of certain sections of this content 211 using a key based on any or all of the media test, hardware validations, marriage signature, remote server authentication response data, and or registration information items. As part of this process, certain critical content data segments may be removed from the content 212 and replaced with incorrect or irrelevant content, and the original data can be stored locally or on a remote authentication server as part of the authentication transaction, encrypted with a key based on any or all of the media test, hardware validations, marriage signature, remote server authentication response data, and or registration information items. Once authenticated, and selected sections encrypted and hidden locally or remotely, the content may be installed 213 on the target system. This process is flexible and may or may not require a network connection to be considered complete.

Figure 19:
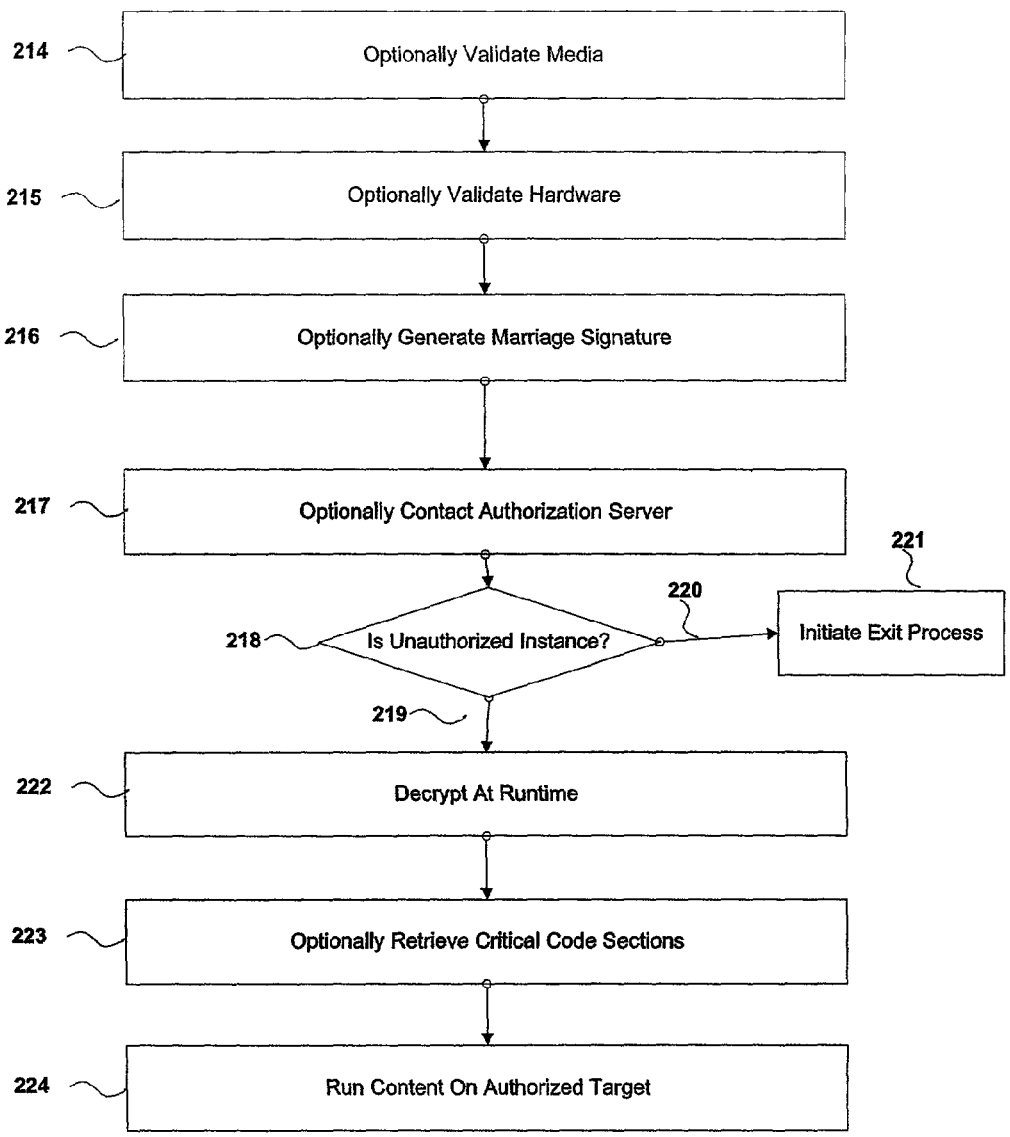
FIG. 19 is a flow diagram of a system and method that combine the approaches described herein into a client-side system that serves to enable secure post-installation usage of digital content, in accordance with the present invention.

FIG. 19 is a flow diagram of a system and method that combine many of the techniques above into a client-side system that serves to enable secure post-installation usage of securely installed digital content. This system supports all models, from single-user-single-disc to broad site license models. If initially distributed on hard media, the content may authenticate the media as a valid original installation medium 214 as described above. Otherwise if the original installation medium was the network 214, it may be validated by network means as described above. Optionally the system's hardware may also be validated (as in FIG. 2 and FIG. 14) 215 and a marriage signature 216 may also be optionally re-generated (see FIG. 15). An optional network connection may be initiated to a secure server 217 and a determination made 218 based on the combined validation results of any or all of the media test, hardware validations, marriage signature, and or registration information items. This authentication process may result in a determination of a non-authorized instance 220 of the use of this digital content, and an exit and or defensive process 221 may be initiated. Alternatively, this usage of this item of digital content may be authorized 219 and the usage may result in the optional decryption of certain sections of this content 222 using a key based on any or all of the media test, hardware validations, marriage signature, remote server authentication response data, and or registration information items. As part of this process, certain critical content data segments may be restored 223 to the content, whether the data is stored locally, or on the remote authentication server as part of the authentication transaction, with or without an encryption key based on any or all of the media test, hardware validations, marriage signature, remote server authentication response data, or registration information items. Once authenticated the content may be run 224 on the target system. This process is flexible and may or may not require a network connection to be considered complete.

Figure 20:
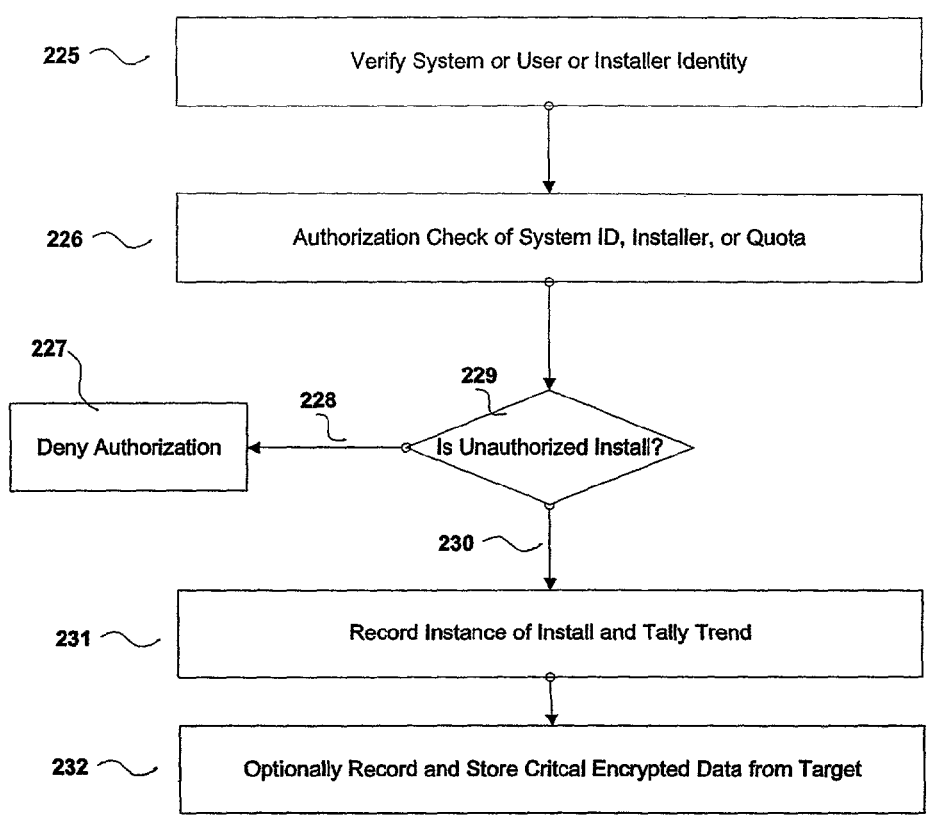
FIG. 20 is a flow diagram of a system and method that combine the approaches described herein into a server-side system that serves to support secure installation of digital content, in accordance with the present invention.

FIG. 20 is a flow diagram of a system and method that provide an aspect of the authentication process outlined in FIG. 18, step 207. This approach supports all models, from single-user-single-disc to broad site license models. It can exist locally in the instance where a network authentication is disallowed, or may exist on a remote server as part of a network authentication model. As shown in step 225 the data items related to system identity as derived from marriage or the data items related to registration and original media authenticity are examined 225 and their validity determined 226. In addition to the validity of the items, an overall installation quota (the maximum allowed number of permitted installations) is also considered. A decision regarding authorization for installation is rendered 229, for example factoring in all of these criteria, and if negative 228 then authorization is denied 227 and communicated back to the requesting entity. Otherwise, if the instance of installation is authenticated 230 then the instance is recorded and added to the quota value (and recorded in an archival and auditable fashion for later billing or charging). Optionally, if authenticated, in addition to returning a positive authenticating response, encryption information may be communicated to the requesting party, and in return certain critical sections of the target may be stored securely on the remote server 232.

Figure 21:
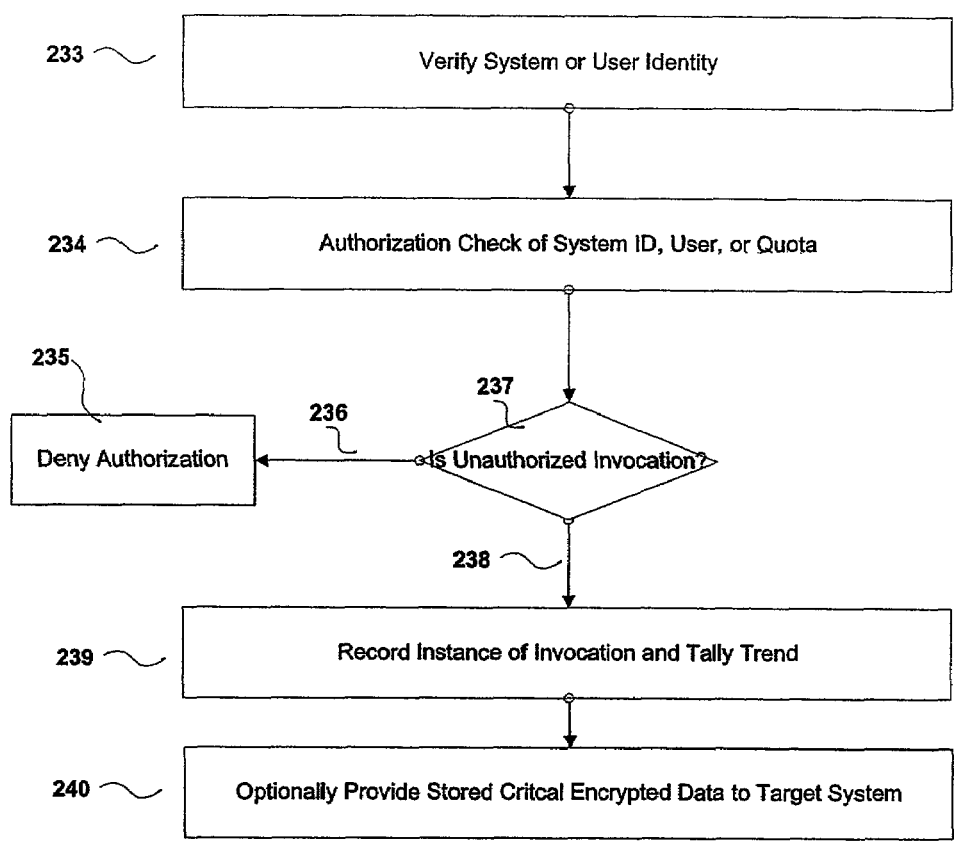
FIG. 21 is a flow diagram of a system and method that combine the approaches described herein into a server-side system that serves to enable secure post-installation usage of digital content system, in accordance with the present invention.

FIG. 21 is a flow diagram of a system and method that provide an important aspect of the authentication process outlined in FIG. 19, step 218. This system supports all models, from single-user-single-disc to broad site license models. It can exist locally in the instance where a network authentication is disallowed, or may exist on a remote server as part of a network authentication model. As shown in step 233 the data items regarding system identity as derived from marriage or the data items related to registration and original media authenticity are examined 233 and their validity determined 234. In addition to the validity of the items, an overall usage quota (the maximum allowed number of allowed simultaneous usages) is also considered. A decision is rendered 237, for example factoring in all of these criteria, and if negative 236 then authorization is denied 235 and communicated back to the requesting entity. Otherwise, if the instance of usage is authenticated 239 then the instance is recorded and added to the quota value (and recorded in an archival and auditable fashion for later billing or charging). Optionally if authenticated in addition to returning a positive authenticating response, encryption information may be communicated by the requesting party, and in return certain critical sections of the target may returned to the requesting party from the secure server 240.

Figure 22:
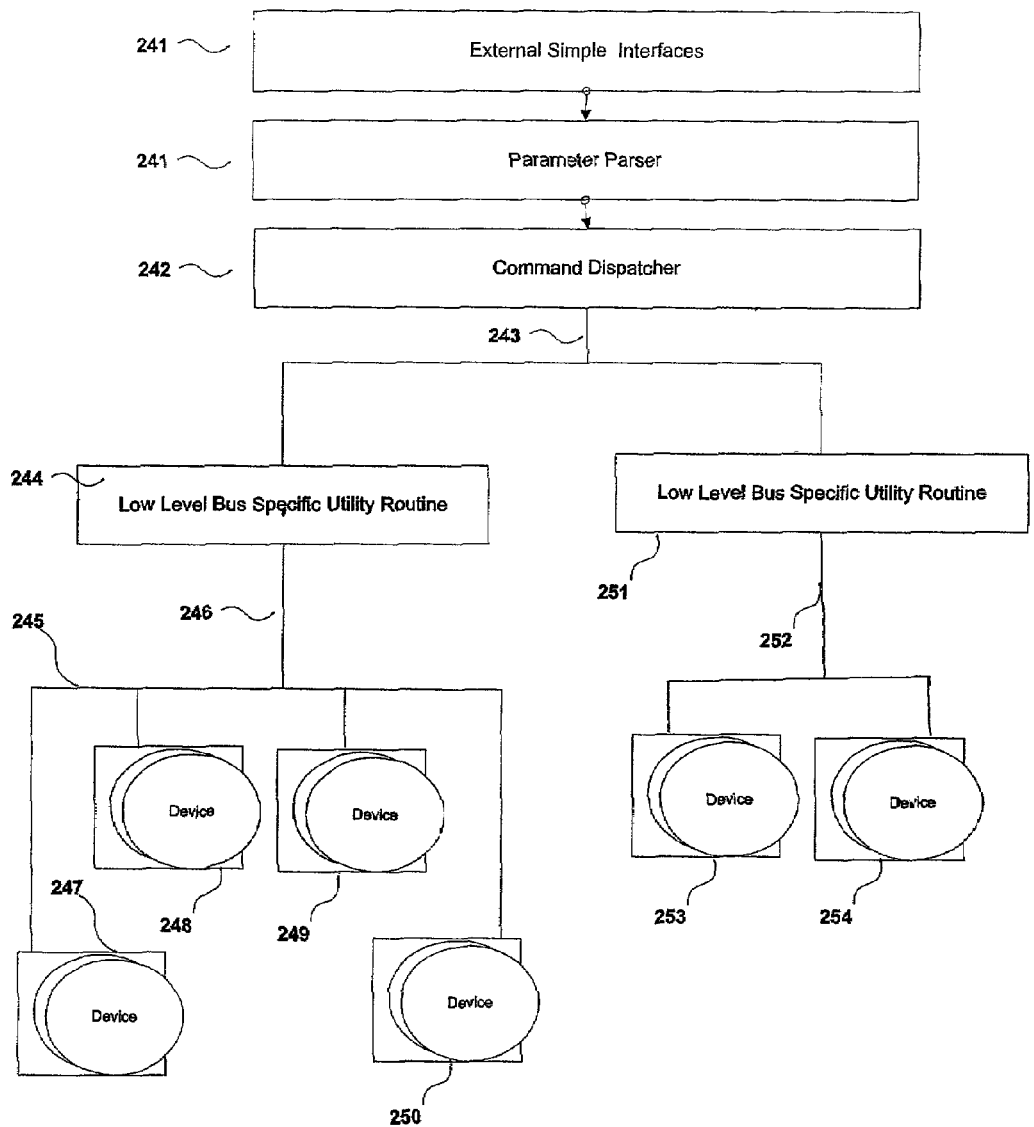
FIG. 22 is a flow diagram of a system and method that provide device specific, device class specific and device bus specific access through a generalized mechanism, which may also serve as a proxy mechanism between levels of operating system interface and function access and authorization, in accordance with the present invention.

FIG. 22 is a flow diagram of a system and method that provide device specific, device-class specific and device-bus specific access through a generalized interface mechanism, which may also serve as a proxy mechanism between privilege levels of operating system interface and function access and authorization. External interfaces are exposed, 241. In one example, these interfaces are intentionally simplistic interfaces allowing device control (such as shunting a device, or controlling the physical rotational maximum speed of a device, or turning error correction on or off within a device). These inputs 241 allow a variety of parameters which must be parsed for correctness 241 before submission to the lower level system. Once validated syntactically 241 the commands are passed to a dispatching routine 242 that determines which subsystem or bus on which the device in question is operating 243 and dispatches the commands appropriately via standard device bus interfaces and commands 244, 251. From there, the command is dispatched and routed by bus mechanisms 246, 252 to the device itself 245, 247, and obeyed by the device 247. Each device 247, 248, 249, 250, 253, 254 may be individually addressed, communicated with, and controlled under this approach. Each such system bus 244, 251 may be communicated with according to this mechanism.

An example of a high-level abstraction employed by this aspect of the invention is the ability to express complex device commands as a simple series of text parameters. These parameters allow control over device features not normally accessible to users and tightly controlled by drivers. The example parameters which may be set by any user and consumed by the device to produce "device driver expert" results or effects are as follows:

save_drive_state (TRUE, FALSE): TRUE set_speed_in_kb_per_sec (MAX,MIN, or number in kb/sec): MAX set_error_correction_off (TRUE, FALSE): TRUE set_block_size (eg 10, 2048, 2352, 2648, 2774): 2352 flush_amount_kb: 2048 start_of_search: 18944 blocks_to_search: 69120 upon_error_pass1_set_retry_method (HOP, UPTO): UPTO upon_error_pass_set_speed_in_kb_per_sec (MAX,MIN, or number in kb/sec): MIN upon_error_pass1_set_error_correction_off (TRUE, FALSE): TRUE upon_error_pass1_set_block_size (eg 10, 2048, 2352, 2648, 2774): 2352 upon_error_pass1_flush_amount_kb (0-9000): 2048 upon_error_pass1_retry_minimum_delay_milliseconds: 250 upon_error_pass1_retry_error_location_from_minus_N_blocks: 192 upon_error_pass2_set_retry_method (HOP, UPTO): UPTO upon_error_pass2_set_speed_in_kb_per_sec (MAX, MIN, or number in kb/sec): MAX upon_error_pass2_set_error_correction_off (TRUE, FALSE): TRUE upon_error_pass2_set_block_size (eg 10, 2048, 2352, 2648, 2774): 2352 upon_error_pass2_flush_amount_kb: 2048 upon_error_pass2_retry_minimum_delay_milliseconds: 250 upon_error_pass2_retry_error_location_from_minus_N_blocks: 192 reset_drive (low level) (TRUE, FALSE): FALSE restore_drive_state (TRUE, FALSE): TRUE An example of low level device code which is controlled by this approach is the setting of the device DCR bit:

```
if ((*initial_DCR_Bit_Field_Setting & k_DCR_FLAG_BIT) !=
    (desired_Bit_Field_For_DCR & k_DCR_FLAG_BIT)) {
    if (alter_DCR_Bit_Field == Safe_True) {
    write_Is_Useful = True;
    /* Clear the DCR bit field area. */
    mode_Page_Out[10] =
    (mode_Page_Out[10] & (~(k_DCR_FLAG_MASK)));
```

-continued

```
    /* Set the DCR bit */
    mode_Page_Out[10] |=
    (desired_Bit_Field_For_DCR & k_DCR_FLAG_BIT);
    }
}
```

Another example of low-level device code which is controlled by this approach is the setting of the device rotational speed for optical media devices like CD drives:

```
void Set_Rotation_Speed_1_X(void);
void Set_Rotation_Speed_Max(void);
// This function makes a call to the SCSI
BOOL Set_Media_Rotation_Speed(Shared_ASPI_Ptr scsi_Ptr
                , Selected_CD_Test_Ptr    device_Ptr
                , WORD read_Rotation
                , WORD write_Rotation
                , Safe_Boolean *set_Rotation_Speed_Good)
void Set_Rotation_Speed_1_X(void)
{
    Shared_ASPI_Ptr         scsi_Ptr;
    Selected_CD_Test_Ptr    device_Ptr;
    Safe_Boolean            media_Spun_Up;
    WORD                    read_Rotation;
    WORD                    write_Rotation;
    Safe_Boolean            set_Rotation_Speed_Good;
    scsi_Ptr = g_Globals.info_SCSI_Ptr;
    if (Select_ideal_CD_Drive(scsi_Ptr, &device_Ptr) == TRUE) {
        if (device_Ptr->device item_Vaild == Safe_True) {
            if (Determine_Media_Ready(scsi_Ptr, device_Ptr, &media_Spun_Up) != TRUE) {
                media_Spun_Up = Safe_False;
            }
            if (media_Spun_Up == Safe_True) {
                /* 172 K/sec is 2352 * 75, 1x audio data rate */
                read_Rotation = 172;
                write_Rotation = 0xFFFF;
                if (Set_Media_Rotation_Speed(scsi_Ptr, device_Ptr, read_Rotation,
                    write_Rotation, &set_Rotation_Speed_Good) != TRUE) {
                    set_Rotation_Speed_Good = Safe_False;
                }
            } /* if (media_Spun_Up == True) */
        }
    }
}
void Set_Rotation_Speed_Max(void)
{
    Shared_ASPI_Ptr       scsi_Ptr;
    Selected_CD_Test_Ptr  device_Ptr;
    Safe_Boolean          media_Spun_Up;
    WORD                  read_Rotation;
    WORD                  write_Rotation;
    Safe_Boolean          set_Rotation_Speed_Good;
    scsi_Ptr = g_Globals.info_SCSI_Ptr;
    if (Select_Ideal_CD_Drive(scsi_Ptr, &device_Ptr) == TRUE) {
        if (device_Ptr->device.item_Vaild == Safe_True) {
            if (Determine_Media_Ready(scsi_Ptr, device_Ptr, &media_Spun_Up) != TRUE) {
                media_Spun_Up = Safe_False;
            }
            if (media_Spun_Up == Safe_True) {
                /* 0xFFFF means set to max */
                read_Rotation = 0xFFFF;
                write_Rotation = 0xFFFF;
                if (Set_Media_Rotation_Speed(scsi_Ptr,
                            device_Ptr,
                            read_Rotation,
                            write_Rotation,
                            &set_Rotation_Speed_Good) != TRUE)
                {
                    set_Rotation_Speed_Good = Safe_False;
                }
            } /* if (media_Spun_Up == True) */
        }
```

```
    }
}
/* This demonstrates using a command that returns status after deleting its dynamically created command block.*/
/* It demonstrates using a SCSI command that may be reissued recursively once during its completion if desired due */
/* to a UNIT ATTENTION notification error, or other reason. A new parameter block is used auto-reissuing from within */
/* a completing command to prevent problems. It could be designed to use the small temporary RAM scratch area. */
/* The communication block is set by the final call in the reissue chain. */
BOOL Set_Media_Rotation_Speed(Shared_ASPI_Ptr scsi_Ptr
                , Selected_CD_Test_Ptr     device_Ptr
                , WORD read_Rotation
                , WORD write_Rotation
                , Safe_Boolean *set_Rotation_Speed_Good)
{
    DWORD    status;
    WORD     retry_Command_Stage;
    BYTE     adapter_Index;
    BYTE     target_Index;
    BYTE     device_LUN;
    BOOL     result;
    result = FALSE;
    *set_Rotation_Speed_Good = Safe_False;
    if (device_Ptr->device.direct_Path_Valid == Safe_True) {
ZeroMemory(&(device_Ptr->set_CD_Speed), sizeof(device_Ptr->set_CD_Speed));
device_Ptr->set_CD_Speed.set_CD_Speed_Completed = Safe_False;
device_Ptr->set_CD_Speed.set_CD_Speed_Valid = Safe_False;
adapter_Index = device_Ptr->device.host_Card_ID;
target_Index = device_Ptr->device.device_ID;
device_LUN = device_Ptr->device.device_LUN;
retry_Command_Stage = 0;
/* Set CD rotation rate. */
status = Set_CD_Rotation_Speed_SCSI_Call(scsi_Ptr
              , adapter_Index
              , target_Index
              , device_LUN
              , retry_Command_Stage
              , device_Ptr
              , read_Rotation
              , write_Rotation);
if ((status != SS_COMP) && (status != SS_PENDING)) {
    /* Serious error of some form. Device hung? */
    /* It is unimportant, actual status is recorded in completion call logic, */
    if (device_Ptr->set_CD_Speed.set_CD_Speed_Completed != Safe_True) {
    device_Ptr->set_CD_Speed.set_CD_Speed_Completed = Safe_True;
    device_Ptr->set_CD_Speed.set_CD_Speed_Valid = Safe_False;
    }
}
/* If the command was sent interrupt-async style it may not be finished. */
/* Wait for this IO to Complete (in case sent using async interrupt) */
if (device_Ptr->set_CD_Speed.set_CD_Speed_Completed != Safe_True) {
/* Dead loop using thread SLEEP until it is complete. */
Sleep_Until_Lazy_Completion_Flag_Set(&(device_Ptr->set_CD_Speed.set_CD_Speed_Completed)
                , k_18_SECOND_DELAY);
}
if (device_Ptr->set_CD_Speed.set_CD_Speed_Completed == Safe_True) {
/* Display optional diagnostic error results to display */
if (device_Ptr->set_CD_Speed.set_CD_Speed_Valid != Safe_True) {
if (scsi_Ptr->scrolling_Display_Window_Hdl != NULL) {
if (device_Ptr->set_CD_Speed.sense_Error_Valid == Safe_True) {
if (Display_Set_CD_Speed_Error_Info(scsi_Ptr >scrolling_Display_Window_Hdl
                , adapter_Index
                , target_Index
                    , device_Ptr->set_CD_Speed.sense_Key
                    , device_Ptr->set_CD_Speed sense_Code
                    , device_Ptr->set_CD_Speed.sense_Qualifier
                    , device_Ptr->set_CD_Speed.ms) != TRUE) {
                /* Ignore error. Display is unimportant. */
                }
            }
          }
        }
        if (device_Ptr->set_CD_Speed.set_CD_Speed_Valid == Safe_True) {
            *set_Rotation_Speed_Good = Safe_True;
        }
    }
    result = TRUE;
}
    /* Wait for this IO to Complete (in case sent using async interrupt) */
    return(result);
}
```

-continued

```
DWORD Set_CD_Rotation_Speed_SCSI_Call (Shared_ASPI_Ptr aspi_Ptr
                                     , BYTE adapter_Index
                                     , BYTE target_Id
                                     , BYTE lun_Id
                                     , WORD retry_Command_Stage
                                     , Selected_CD_Test_Ptr feedback_Ptr
                                     , WORD read_Rotation
                                     , WORD write_Rotation)
{
    Opaque_Command_Rec *param_Ptr;
    DWORD result;
    Private_SCSI_State_Ptr    state_Ptr;
    result = k_ASPI_ERROR_NO_RESOURCES;
    param_Ptr = (Opaque_Command_Rec *)Select_New_Command_Block(aspi_Ptr),
    if (param_Ptr != NULL) {
        ZeroMemory(param_Ptr, k_Opaque_Command_Size_To_Clear);
        if (Find_State_Ptr((PSRB_ExecSCSICmd) param_Ptr, &state_Ptr) == TRUE) {
            Initialize_SCSI_State(state_Ptr
                , k_VALIDATE_SEQUENCE
                , k_VALIDATE_CALL_SET_CD_SPEED);
            state_Ptr->minor_Command_Stage = retry_Command_Stage;
            state_Ptr->user_Specified_1 = (DWORD)feedback_Ptr;
        }
        else {
            result = k_ASPI_ERROR_NO_RESOURCES;
            goto Error_Handler;
        }
        state_Ptr->command_Block.technology_Desired = k_APSI_METHOD;
        state_Ptr->command_Block.command_Byte_Length = 12;
        state_Ptr->command_Block.command.scsi[0] = 0xBB;
        state_Ptr->command_Block.command.scsi[1] = 0;
        state_Ptr->command_Block.command.scsi[2] = HIBYTE(LOWORD(read_Rotation));
        state_Ptr->command_Block.command.scsi[3] = LOBYTE(LOWORD(read_Rotation));
        state_Ptr->command_Block.command.scsi[4] = HIBYTE(LOWORD(write_Rotation));
        state_Ptr->command_Block.command.scsi[5] = LOBYTE(LOWORD(write_Rotation));
        state_Ptr->command_Block.command.scsi[6] = 0;
        state_Ptr->command_Block.command.scsi[7] = 0;
        state_Ptr->command_Block.command.scsi[8] = 0;
        state_Ptr->command_Block.command.scsi[9] = 0;
        state_Ptr->command_Block.command.scsi[10] = 0;
        state_Ptr->command_Block.command.scsi[11] = 0;
        state_Ptr->command_Block.card_ID = adapter_Index;
        state_Ptr->command_Block.device_ID = target_Id;
        state_Ptr->command_Block.device_LUN = lun_Id;
        state_Ptr->command_Block.desired_Sense_Bytes = SENSE_LEN;
        state_Ptr->command_Block.send_To_Device = Safe_False;
        state_Ptr->command_Block.byte_Transfer_Total = 0;
        state_Ptr->command_Block.data_Buffer_Ptr = NULL;
        state_Ptr->command_Block.ignore_Data_Underrruns = Safe_False;
        state_Ptr->command_Block.timeout_Milliseconds = 0;
    } /* if (InqSRB != NULL) */
    else {
        result = k_ASPI_ERROR_NO_RESOURCES;
    }
    Error_Handler:
        return(result);
}
```

Embodied in many of the above concepts and associated figures are references to exit processes invoked in response to an intrusion. The responses are typically invoked by the entity itself, and are variable and may be tailored to the needs of the entity packaging the protective system. Instances include but are not limited to: a) immediate exit by killing all associated processes using system calls and then killing self using system exit calls; b) deferred exit by passing a self-destruct message through a message passing system as shown in FIG. 3; c) exit caused by intentionally corrupting memory of self or associated processes; and d) combinations of any of the above approaches.

Also embodied in many of the above inventions and associated diagrams are references to defensive processes invoked in response to an intrusion. The responses are invoked by the protected entity to act upon the intruding process or tool, or the system itself, to destabilize the attack. These responses are variable and may be tailored to the needs of the entity packaging the protective system. Instances include but are not limited to: a) manipulation of displays to make fonts illegible, font and screen colors inappropriate or unintelligible. In this example invention embodiment, under circumstances where undesired inputs cannot be suppressed it may be necessary to alter or limit or prohibit the ability of the threat or tool to display information to the user. In other words, the user can type but cannot see the typing and the tool's output. For instance, as illustrated in the code below, by making the display black fonts on a black background. This is done only under circumstances where a threat has been identified unequivocally (for instance as a running In Circuit Emulator or ICE):

```
// Change the colors to black on black
//
// First, knowing what the target threat application is, we
// make an effort to know what strings to look for. In this example
// we know to look for the "Colors are" string (the 10 is for the 10 bytes
//   we are searching for, we don't want to overflow off the end of
//   the segment when we are doing the compare)
for (pos = MemLocStart;
    pos < MemLocStart + MemLocLength - 10 + 1;
    pos++)
{
    if (CompareMemory((void *)pos, "SetScreenColors", 10) == 0)
    {
              // Done with the string search
              break;
    }
}
// If we found the "SetScreenColors" string, search for where
it is used
if (pos < MemLocStart + MemLocLength - 10 + 1)
{
    searchBytes[0] = 0xbe;
    searchBytes[1] = (pos     )    & 0xff;
    searchBytes[2] = (pos >> 8)    & 0xff;
    searchBytes[3] = (pos >> 16)   & 0xff;
    searchBytes[4] = (pos >> 24)   & 0xff;
    // Search for the use of this string
    for (pos2 = MemLocStart;
        pos2 < MemLocStart + MemLocLength - 5 + 1;
        pos2++)
    {
        if (CompareMemory((void *)pos2, searchBytes,
        5) == 0)
        {
              // Done with the secondary search
              break;
        }
    }
    // If we found where the string is used, search
    //    backwards for an
    //    opcode followed by an address-arl
    if (pos2 < MemLocStart + MemLocLength - 5 + 1)
    {
        for (pos3 = pos2; pos3 > (pos2 - 100); pos3--)
        {
            if ( (*((BYTE *)pos3 ) == 0xa0) && // opcode
                 (*((BYTE *)pos3 + 4) == 0xc0) )
                 // verify hi byte of address
            {
                  // Done with the tertiary search
                  break;
            }
        }
        //   Now save the address of the color
        //   values and change the colors to black on black
        if (pos3 > (pos2 - 100))
        {
            *( (BYTE *)(&s_dwColorAddr)    ) =
            *((BYTE *)pos3 + 1);
            *(((BYTE *)(&s_dwColorAddr)) + 1) =
            *((BYTE *)pos3 + 2);
            *(((BYTE *)(&s_dwColorAddr)) + 2) =
            *((BYTE *)pos3 + 3);
            *(((BYTE *)(&s_dwColorAddr)) + 3) =
            *((BYTE *)pos3 + 4);
            // Save the original color values
            memcpy(s_byColorVals1, (void *)s_
            dwColorAddr, 5);
            memcpy(s_byColorVals2, (void *)(s_
            dwColorAddr + 12), 5);
            // Change the color values to black on black
            memset((void *)s_dwColorAddr, 0, 5);
            memset((void *)(s_dwColorAddr + 12), 0, 5);
        }
    }
}   //  End if "Colors are" string found
```

Note that other alternative embodiments may also be used, such as modifying the displaying window's origin coordinates or dimensions so that it is either displayed off screen or displayed in a fashion that is too small to be useful. The fonts in the application can also be replaced by illegible fonts or corrupted fonts. This approach serves to reduce the effectiveness of attacks and attacking tools.

In another instance, b) the ability of a threat or opponent tool to process input is crippled, not by filtering or intercepting keystrokes and mouse clicks but instead by destroying the parts of the tool that understand how to process certain inputs in a very specific fashion. For instance if a certain tool had a powerful command keystroke that invoked a significant threat function of the tool, and the tool's ability to recognize that stroke is corrupted or destroyed by intrusive changes made to the running tool itself in memory, the tool is rendered much less effective.

In an example of this type, undesired inputs are suppressed not by intercepting keystrokes on the way through or to the input device driver, but rather by crippling the recipient application's ability to process them, by targeting a specific area of memory where the threat application is running and knocking out specific areas of threat functionality with surgical accuracy so that whether or not any keyboard or mouse filtering is done at the system level, certain keystrokes will not be seen by the threat application and cannot be acted upon.

```
// Search for App entry key
// Locate HOT_KEY
// Search through the whole segment (the 6 is for the 6 bytes we
//   are searching for, we don't want to overflow off the end of
//   the segment when we are doing the compare)
for (pos = MemLocStart;
    pos < MemLocStart + MemLocLength - 6 + 1;
    pos++)
{
    if ( (*((DWORD *)pos) == 0x000120cd) &&
         (*((WORD *) pos + 2) == 0x000d) )
    {
        posMin = pos - 100;
        if (posMin < (DWORD)MemLocStart)
        {
            posMin = (DWORD)MemLocStart;
        }
        for (pos2 = pos; pos2 > posMin; pos2--)
        {
            if ( (*((WORD *)pos2) == 0xb60f) &&
                 (*((BYTE *)pos2 + 2) == 0x5) &&
                 (*((BYTE *)pos2 + 6) == 0xc0) )
            {
                *( (BYTE *)(&s_dwHotKeyAddr)) =
                *((BYTE *) pos2 + 3);
                *(((BYTE *)(&s_dwHotKeyAddr)) + 1) =
                *((BYTE *) pos2 + 4);
                *(((BYTE *)(&s_dwHotKeyAddr)) + 2) =
                *((BYTE *) pos2 + 5);
                *(((BYTE *)(&s_dwHotKeyAddr)) + 3) =
                *((BYTE *) pos2 + 6);
                // Disable the AnyApp entry key
                s_byHotKeyVal = *((BYTE *)s_dwHotKeyAddr);
                *((BYTE *)s_dwHotKeyAddr) = 0;
                //   Break out of the backwards search now
                that we have
                //   found what we were looking for
                break;
            }
        }
        // Break out of the search through the whole segment once we
        //   have found the HOT_KEY call
        break;
    }
}
```

Other instances include: c) overt process killing of intruding process; d) overt immediate or deferred kill or reboot of the system; e) subtle destabilization of the system by memory corruption; f) provision of false information to the intruding process or tool; and g) introduction of spoof and saturation data (as in FIG. 12) to the system to hide or misdirect actual protective system functions.

While this invention has been particularly shown and described with references to preferred embodiments thereof, it will be understood by those skilled in the art that various changes in form and details may be made herein without departing from the spirit and scope of the invention as defined by the appended claims.

We claim:

1. A method for preventing unauthorized use of digital content data in a computer system comprising:
   executing protected digital content data;
   in response to the execution of the protected digital content data, examining system devices that are operational in the system;
   determining whether at least one of the operational system devices is a subversion device that subverts control mechanisms of the computer system that control the unauthorized use of the digital content data, wherein the subversion device performs at least one of unauthorized study, modification, monitoring, and reconstruction of the executed protected digital content data, wherein determining comprises:
      determining a performance parameter of the at least one operational system device. wherein determining a performance parameter comprises supplying test data to the at least one operational system device, and monitoring performance data of the at least one operational device; and
      comparing the performance data to actual data collected on a sample operational device, and if the comparison result is outside a predetermined range, then determining that the operational system device is a subversion device; and
   initiating a defensive action if it is determined that at least one of the operational system devices is a subversion device.

2. The method of claim 1 wherein examining comprises examining device-specific registration data for the system devices within an operating system operating on the computer system.

3. The method of claim 1 wherein examining further comprises examining system memory for the existence of system devices, determining whether the system device is a physical or virtual device, and if a determination is made that the system device is a virtual device, initiating the defensive action.

4. The method of claim 2 wherein determining further comprises comparing the device specific registration data to known data for each system device and if the data are not a match, initiating the defensive action.

5. The method of claim 1 wherein determining further comprises determining a memory latency value for the at least one system device and comparing the determined memory latency value to a known memory latency value.

6. The method of claim 5 wherein if the comparison indicates that the determined and known memory latency values are not a match, initiating the defensive action.

7. The method of claim 1 wherein the subversion device is a device selected from the group of devices consisting of: in circuit emulator and virtual emulator.

8. The method of claim 1 wherein determining further comprises dynamically loading at least one of a valid device-specific driver, device driver subcomponent, and device driver simulator component and determining whether the load was successful for that driver.

9. The method of claim 1 wherein the defensive action comprises a data saturation event.

10. The method of claim 1 wherein the defensive action comprises initiating a notification event for notifying other entities operating in the system of the presence of the subversion device.

11. The method of claim 1 wherein the defensive action comprises a defensive action selected from the group consisting of: deactivating the system devices, modifying a display coupled to the system to make information conveyed on the display unintelligible; modifying the display coupled to the system to change the position of windows on the display; suppressing undesired input signals from input devices; initiating a system reboot; invoking system destabilization through memory corruption; providing false information to the subversion device; and generating saturation data in the system.

12. A method for preventing unauthorized use of digital content data in a computer system comprising:
   executing protected digital content data
   in response to the execution of the protected digital content data, enumerating processes that are active on the computer system, wherein enumerating comprises at least one of examining processes registered in a taskbar of the computer system and inspecting memory partitioning signatures of the computer system;
   determining whether at least one of the processes is a subversion process that subverts control mechanisms of the computer system that control the unauthorized use of the digital content data, wherein the subversion process performs at least one of unauthorized study, modification, monitoring, and reconstruction of the executed protected digital content data; and initiating a defensive action if it is determined that at least one of the operational system processes is a subversion process.

13. The method of claim 12 wherein enumerating processes further comprises examining system memory for process signatures.

14. The method of claim 12 wherein enumerating processes further comprises examining incremental portions of system memory.

15. A method for preventing unauthorized use of digital content data in a computer system comprising:
   executing protected digital content data
   in response to the execution of the protected digital content data, enumerating processes that are active on the computer system, wherein enumerating comprises at least one of examining incremental portions of system memory and examining processes registered in a taskbar of the computer system;
   determining whether at least one of the processes is a subversion process by searching the computer system memory for a known signature of a subversion process that subverts control mechanisms of the computer system that control the unauthorized use of the digital content data, wherein the subversion process performs at least one of unauthorized study, modification, monitoring, and reconstruction of the executed protected digital content data; and initiating a defensive action if it is determined that at least one of the operational system processes is a subversion process.

16. The method of claim 15 wherein searching system memory comprises continuous searching of system memory.

17. A method for preventing unauthorized use of digital content data in a computer system comprising:
  executing protected digital content data;
  in response to the execution of the protected digital content data, enumerating processes that are active on the computer system, wherein enumerating comprises at least one of examining incremental portions of system memory and examining processes registered in a taskbar of the computer system;
  determining whether at least one of the processes is a subversion process by searching the computer system memory for a known memory partitioning signature of a subversion process that subverts control mechanisms of the computer system that control the unauthorized use of the digital content data, wherein the subversion process performs at least one of unauthorized study, modification, monitoring, and reconstruction of the executed protected digital content data; and initiating a defensive action if it is determined that at least one of the operational system processes is a subversion process.

18. The method of claim 17 wherein the known memory partitioning signature comprises at least one of: amount of memory used; memory allocation; and partitioning patterns.

19. A method for preventing unauthorized use of digital content data in a computer system comprising:
  executing protected digital content data;
  in response to the execution of the protected digital content data, examining system memory for the existence of system devices that are operational in the system;
  determining whether at least one of the operational system devices is a physical or virtual subversion device that subverts control mechanisms of the computer system that control the unauthorized use of the digital content data, by determining a memory latency value for the at least one system device and comparing the determined memory latency value to a known memory latency value, wherein the subversion device performs at least one of unauthorized study, modification, monitoring, and reconstruction of the executed protected digital content data; and
  initiating a defensive action if it is determined that at least one of the operational system devices is a virtual subversion device.

20. The method of claim 19 wherein if the comparison indicates that the determined and known memory latency values are not a match, initiating the defensive action.

21. The method of claim 19 wherein the subversion device is a device selected from the group of devices consisting of: in circuit emulator and virtual emulator.

22. The method of claim 19 wherein determining further comprises determining a performance parameter of the at least one operational system devices.

23. The method of claim 22 wherein determining a performance parameter comprises supplying test data to the at least one operational system device, and monitoring performance data of the at least one operational device.

24. The method of claim 23 further comprising comparing the performance data to actual data collected on a sample operational device, and if the comparison result is outside a predetermined range, then determining that the operational system device is a subversion device.

25. The method of claim 19 wherein determining further comprises dynamically loading at least one of a valid device-specific driver, device driver subcomponent, and device driver simulator component and determining whether the load was successful for that driver.

26. The method of claim 19 wherein the defensive action comprises a data saturation event.

27. The method of claim 19 wherein the defensive action comprises initiating a notification event for notifying other entities operating in the system of the presence of the subversion device.

28. The method of claim 19 wherein the defensive action comprises a defensive action selected from the group consisting of: deactivating the system devices, modifying a display coupled to the system to make information conveyed on the display unintelligible; modifying the display coupled to the system to change the position of windows on the display; suppressing undesired input signals from input devices; initiating a system reboot; invoking system destabilization through memory corruption; providing false information to the subversion device; and generating saturation data in the system.

* * * * *

UNITED STATES PATENT AND TRADEMARK OFFICE
CERTIFICATE OF CORRECTION

PATENT NO. : 7,328,453 B2  Page 1 of 1
APPLICATION NO. : 10/142366
DATED : February 5, 2008
INVENTOR(S) : James A Merkle, Jr. et al.

It is certified that error appears in the above-identified patent and that said Letters Patent is hereby corrected as shown below:

In Column 61, Line 31 after "device" delete "." and insert --,--

In Column 62, Line 25 after "data" insert --;--

In Column 62, Line 50 after "data" insert --;--

Signed and Sealed this

Fourth Day of November, 2008

JON W. DUDAS
*Director of the United States Patent and Trademark Office*